(12) United States Patent
Endo et al.

(10) Patent No.: US 10,525,814 B2
(45) Date of Patent: Jan. 7, 2020

(54) DRIVE SYSTEM FOR HYBRID VEHICLE

(71) Applicant: TOYOTA JIDOSHA KABUSHIKI KAISHA, Toyota-shi, Aichi-ken (JP)

(72) Inventors: Takahito Endo, Shizuoka-ken (JP); Hidekazu Nagai, Susono (JP); Kensei Hata, Shizuoka-ken (JP); Yuji Iwase, Mishima (JP); Akira Murakami, Gotemba (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 442 days.

(21) Appl. No.: 15/386,675

(22) Filed: Dec. 21, 2016

(65) Prior Publication Data
US 2017/0182995 A1 Jun. 29, 2017

(30) Foreign Application Priority Data

Dec. 25, 2015 (JP) ................................. 2015-253668
May 31, 2016 (JP) ................................. 2016-108189

(51) Int. Cl.
*B60K 6/365* (2007.10)
*B60K 6/445* (2007.10)
*F16H 3/72* (2006.01)
*F16H 37/08* (2006.01)
*B60K 6/387* (2007.10)
*B60K 6/38* (2007.10)

(52) U.S. Cl.
CPC .............. *B60K 6/365* (2013.01); *B60K 6/387* (2013.01); *B60K 6/445* (2013.01); *F16H 3/728* (2013.01);
(Continued)

(58) Field of Classification Search
None
See application file for complete search history.

(56) References Cited

U.S. PATENT DOCUMENTS

2010/0273595 A1  10/2010  Seo et al.
2012/0316021 A1  12/2012  Kim et al.
(Continued)

FOREIGN PATENT DOCUMENTS

EP    1707416 A1   10/2006
JP    2008126711 A  6/2008
(Continued)

*Primary Examiner* — Jacob S. Scott
(74) *Attorney, Agent, or Firm* — Hunton Andrews Kurth LLP

(57) ABSTRACT

A drive system is configured to split driving force produced by an engine to a first motor side and an output gear side, and add driving force produced by a second motor that is driven with electric power generated by the first motor, to the driving force delivered from the output gear. A first planetary gear mechanism performs differential operation, using a first input element that receives the driving force produced by the engine, a first reaction-force element coupled to the first motor, and a first output element. A second planetary gear mechanism performs differential operation, using a second input element coupled to the first output element, a second output element coupled to the output gear, and a second reaction-force element. A first clutch mechanism selectively couples the first input element with the second reaction-force element. A first brake mechanism selectively inhibits rotation of the second reaction-force element.

18 Claims, 34 Drawing Sheets

(52) U.S. Cl.
CPC ..... *B60K 2006/381* (2013.01); *B60Y 2200/92* (2013.01); *B60Y 2300/78* (2013.01); *F16H 2037/0873* (2013.01); *F16H 2200/2007* (2013.01); *F16H 2200/2035* (2013.01); *F16H 2200/2038* (2013.01); *F16H 2200/2041* (2013.01); *Y02T 10/6239* (2013.01); *Y10S 903/93* (2013.01)

(56) References Cited

U.S. PATENT DOCUMENTS

| | | | | |
|---|---|---|---|---|
| 2012/0322602 | A1* | 12/2012 | Kim | B60K 6/365 475/5 |
| 2014/0358349 | A1* | 12/2014 | Okuda | B60K 6/445 701/22 |
| 2015/0005125 | A1* | 1/2015 | Hayashi | B60K 6/365 475/2 |
| 2015/0021110 | A1 | 1/2015 | Ono et al. | |
| 2015/0239466 | A1* | 8/2015 | Harada | B60K 6/445 701/22 |
| 2015/0258978 | A1 | 9/2015 | Shiratori | |
| 2015/0258983 | A1 | 9/2015 | Kimura | |

FOREIGN PATENT DOCUMENTS

| | | |
|---|---|---|
| JP | 2014-051146 A | 3/2014 |
| JP | 2015174556 A | 10/2015 |
| WO | 2013/114594 A1 | 8/2013 |

* cited by examiner

| | BK1 | CL1 | POWER SPLITTING PART | DIRECTLY RECEIVING PART | TRAVELING MODE No. |
|---|---|---|---|---|---|
| HYBRID TRAVELING: INPUT SPLIT MODE 1 | – | ○ | SPLIT RATIO LARGE (Hi) | DIRECT COUPLING | 1 |
| HYBRID TRAVELING: INPUT SPLIT MODE 2 | ○ | – | SPLIT RATIO SMALL (Lo) | SPEED UP (Hi) | 2 |
| EV TRAVELING: DISCONNECTED | – | – | | | 3 |
| EV TRAVELING: DRIVEN BY MG1, MG2 | ○ | ○ | | | 4 |

|  | BK1 | CL1 | POWER SPLITTING PART | DIRECTLY RECEIVING PART | TRAVELING MODE No. |
|---|---|---|---|---|---|
| HYBRID TRAVELING: INPUT SPLIT MODE 1 | – | ○ | SPLIT RATIO LARGE (Hi) | DIRECT COUPLING | 1 |
| HYBRID TRAVELING: INPUT SPLIT MODE 2 | ○ | – | SPLIT RATIO SMALL (Lo) | SPEED UP (Hi) | 2 |
| EV TRAVELING: DISCONNECTED | – | – | | | 3 |
| EV TRAVELING: DRIVEN BY MG1, MG2 | ○ | ○ | | | 4 |

FIG. 19

|  | BK1 | CL1 | POWER SPLITTING PART | DIRECTLY RECEIVING PART | TRAVELING MODE No. |
|---|---|---|---|---|---|
| HYBRID TRAVELING: INPUT SPLIT MODE 1 | − | ○ | SPLIT RATIO SMALL (Lo) | DIRECT COUPLING | 1 |
| HYBRID TRAVELING: INPUT SPLIT MODE 2 | ○ | − | SPLIT RATIO LARGE (Hi) | SPEED DOWN (Lo) | 2 |
| EV TRAVELING: DISCONNECTED | − | − | | | 3 |
| EV TRAVELING: DRIVEN BY MG1, MG2 | ○ | ○ | | | 4 |

| | BK1 | CL1 | POWER SPLITTING PART | DIRECTLY RECEIVING PART | TRAVELING MODE No. |
|---|---|---|---|---|---|
| HYBRID TRAVELING: INPUT SPLIT MODE 1 (FORWARD) | – | ○ | SPLIT RATIO LARGE (Hi) | DIRECT COUPLING | 1 |
| HYBRID TRAVELING: INPUT SPLIT MODE 2 (BACKWARD) | ○ | – | SPLIT RATIO SMALL (Lo) | REVERSE (Rev) | 2 |
| EV TRAVELING: DISCONNECTED | – | – | | | 3 |
| EV TRAVELING: DRIVEN BY MG1, MG2 | ○ | ○ | | | 4 |

FIG. 32

| | BK1 | CL1 | CL2 | POWER SPLITTING PART | DIRECTLY RECEIVING PART | TRAVELING MODE No. |
|---|---|---|---|---|---|---|
| HYBRID TRAVELING: INPUT SPLIT MODE 1 | − | ○ | − | SPLIT RATIO SMALL (Lo) | DIRECT COUPLING | 1 |
| HYBRID TRAVELING: INPUT SPLIT MODE 2 | ○ | − | − | SPLIT RATIO LARGE (Hi) | SPEED DOWN (Lo) | 2 |
| EV TRAVELING: DISCONNECTED | − | − | − | | | 3 |
| EV TRAVELING: DRIVEN BY MG1, MG2 | ○ | ○ | − | | | 4 |
| PARKING | ○ | − | ○ | | | 5 |
| HYBRID TRAVELING: FIXED POSITION (DIRECT COUPLING) | − | ○ | ○ | | | 6 |
| HYBRID TRAVELING: INPUT SPLIT MODE 3 | − | − | ○ | SPLIT RATIO LARGE (Hi) | DIRECT COUPLING | 7 |

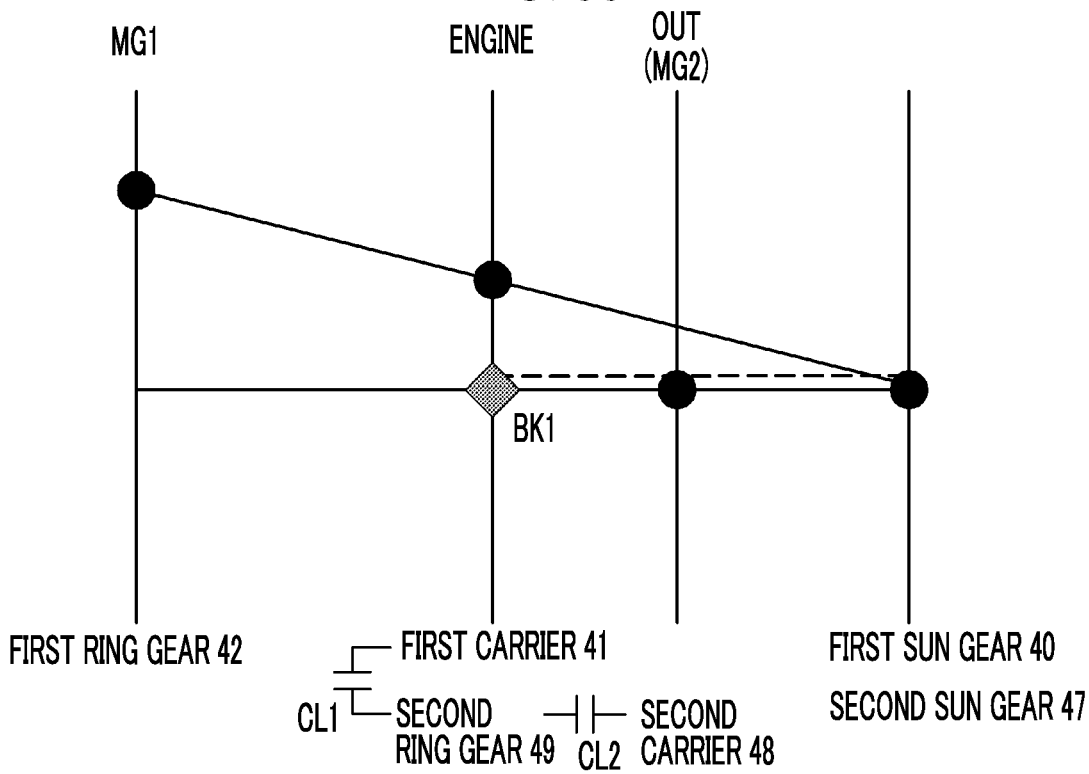

FIG. 33

|  | BK1 | CL1 | BK2 | TRAVELING MODE No. |
|---|---|---|---|---|
| HYBRID TRAVELING: INPUT SPLIT MODE 1 | – | ○ | – | 1 |
| HYBRID TRAVELING: INPUT SPLIT MODE 2 | ○ | – | – | 2 |
| EV TRAVELING: DISCONNECTED | – | – | – | 3 |
| EV TRAVELING: DRIVEN BY MG1, MG2 | ○ | ○ | – | 4 |
| PARKING | ○ | – | ○ | 5 |
| HYBRID TRAVELING: FIXED POSITION | – | ○ | ○ | 6 |
| HYBRID TRAVELING: SERIES HYBRID MODE | – | – | ○ | 7 |

|  | BK1 | CL1 | CL3 | TRAVELING MODE No. |
|---|---|---|---|---|
| HYBRID TRAVELING: INPUT SPLIT MODE 1 | – | O | – | 1 |
| HYBRID TRAVELING: INPUT SPLIT MODE 2 | O | – | – | 2 |
| EV TRAVELING: DISCONNECTED | – | – | – | 3 |
| EV TRAVELING: DRIVEN BY MG1, MG2 1 | O | O | – | 4 |
| HYBRID TRAVELING: FIXED POSITION 1 | O | – | O | 5 |
| HYBRID TRAVELING: FIXED POSITION 2 | – | O | O | 6 |
| EV TRAVELING: DRIVEN BY MG1, MG2 2 | – | – | O | 7 |

FIG. 50

| | BK1 | CL1 | BK2 | CL3 | ENG SPEED RATIO | MG1 SPEED RATIO | TRAVELING MODE No. |
|---|---|---|---|---|---|---|---|
| HYBRID TRAVELING: INPUT SPLIT MODE 1 | – | ○ | – | – | | | 1 |
| HYBRID TRAVELING: INPUT SPLIT MODE 2 | ○ | – | – | – | | | 2 |
| EV TRAVELING: DISCONNECTED | – | – | – | – | | | 3 |
| EV TRAVELING: DRIVEN BY MG1, MG2 1 | ○ | ○ | – | – | | | 4 |
| PARKING | ○ | – | ○ | – | | | 5 |
| HYBRID TRAVELING: FIXED POSITION 1 | – | ○ | ○ | – | SPEED DOWN | SPEED DOWN | 6 |
| HYBRID TRAVELING: SERIES HYBRID MODE | – | – | ○ | – | | | 7 |
| HYBRID TRAVELING: FIXED POSITION 2 | ○ | – | – | ○ | SPEED UP | DIRECT COUPLING | 8 |
| HYBRID TRAVELING: FIXED POSITION 3 | – | ○ | – | ○ | DIRECT COUPLING | DIRECT COUPLING | 9 |
| EV TRAVELING: DRIVEN BY MG1, MG2 2 | – | – | – | ○ | | | 10 |
| HYBRID TRAVELING: FIXED POSITION 4 | – | – | ○ | ○ | SPEED UP | DIRECT COUPLING | 11 |

FIG. 58

| | BK1 | CL1 | BK2 | CL3 | ENG SPEED RATIO | MG1 SPEED RATIO | TRAVELING MODE No. |
|---|---|---|---|---|---|---|---|
| HYBRID TRAVELING: INPUT SPLIT MODE 1 | − | ○ | − | − | | | 1 |
| HYBRID TRAVELING: INPUT SPLIT MODE 2 | ○ | − | − | − | | | 2 |
| EV TRAVELING: DISCONNECTED | − | − | − | − | | | 3 |
| EV TRAVELING: DRIVEN BY MG1, MG2 1 | ○ | ○ | − | − | | | 4 |
| PARKING | ○ | − | ○ | − | | | 5 |
| HYBRID TRAVELING: FIXED POSITION 1 | − | ○ | ○ | − | SPEED DOWN | SPEED DOWN | 6 |
| HYBRID TRAVELING: SERIES HYBRID MODE | − | − | ○ | − | | | 7 |
| HYBRID TRAVELING: FIXED POSITION 2 | ○ | − | − | ○ | SPEED DOWN | DIRECT COUPLING | 8 |
| HYBRID TRAVELING: FIXED POSITION 3 | − | ○ | − | ○ | DIRECT COUPLING | DIRECT COUPLING | 9 |
| EV TRAVELING: DRIVEN BY MG1, MG2 2 | − | − | − | ○ | | | 10 |
| HYBRID TRAVELING: FIXED POSITION 4 | − | − | ○ | ○ | SPEED UP | DIRECT COUPLING | 11 |

DRIVE SYSTEM FOR HYBRID VEHICLE

INCORPORATION BY REFERENCE

The disclosure of Japanese Patent Applications Nos. 2015-253668 and 2016-108189 filed on Dec. 25, 2015 and May 31, 2016, each including the specification, drawings and abstract, is incorporated herein by reference in its entirety.

BACKGROUND

1. Technical Field

The present disclosure relates to a drive system for a hybrid vehicle including an engine and motors as driving force sources, and more particularly to a drive system for a hybrid vehicle including two motors or motor-generators in addition to the engine.

2. Description of Related Art

A drive system for a hybrid vehicle is known which includes an engine, first motor, second motor, speed change mechanism, and a power split mechanism coupled between a speed change part and an output part located closer to drive wheels (see, for example, Internal Publication No. 2013/114594 (WO 2013/114594)). The speed change mechanism includes a clutch mechanism, a brake mechanism, and a first planetary gear mechanism, for example, and increases or reduces and delivers torque generated in the engine. The power split mechanism includes a second planetary gear mechanism, for example, and splits driving force received from the speed change mechanism, to the first motor side and the output side.

The drive system can be placed in an HV (Hybrid Vehicle) mode and an EV (Electric Vehicle) mode, by changing engagement states of the clutch mechanism and the brake mechanism. In the HV mode, the vehicle travels using driving force of both of the engine and the motor(s). The HV mode includes a "HIGH" mode and a "LOW" mode as "differential" modes. In the "HIGH" mode, a high-speed gear position is set in which the speed ratio as the ratio of the rotational speeds of the engine and an output element of the speed change mechanism is smaller than the speed ratio of "1:1" representing direct coupling. In the "LOW" mode, a low-speed gear position, which is a direct-coupling position, is set. The EV mode includes a single-motor mode in which the vehicle travels using driving force produced by the second motor, and a both-motor mode in which the vehicle travels using driving force of both of the first motor and the second motor.

Another example of drive system is known in which a speed change part is coupled between a power split mechanism and an output part, and the speed change part increases or reduces driving force obtained by splitting driving force produced by an engine, at a given speed ratio, and directly delivers it to the output part (see, for example, Japanese Patent Application Publication No. 2014-51146 (JP 2014-51146 A)). A first motor included in this type of drive system is a motor that controls the engine speed, and the engine and the first motor are respectively coupled to certain rotating elements of a planetary gear mechanism that constitutes the power split mechanism. The driving force split by the power split mechanism and distributed to the output side is delivered to the speed change part. The speed change part, which changes torque delivered from an output element of the power split mechanism, is provided by a planetary gear mechanism having an input element to which the output element of the power split mechanism is coupled, a reaction-force element, and an output element. The speed change part also includes a brake that selectively fixes the reaction-force element, and a clutch that couples the reaction-force element with the input element, so as to selectively integrate the whole speed change unit.

However, in the drive system in which the power split mechanism is coupled between the speed change part and the output part, it is impossible to set a traveling mode for increasing or reducing and delivering the driving force split by the power split mechanism and distributed to the output side (driving force directly transmitted from the engine toward drive wheels), at different speed ratios. Thus, there is room for improvement in terms of the variety of traveling modes.

Also, in the drive system in which the speed change part is coupled between the power split mechanism and the output part, it is necessary for the first motor to generate reaction-force torque when the engine produces driving force; therefore, the first motor cannot function as a motor that produces torque for traveling the vehicle. Namely, in this type of drive system, a both-motor drive mode cannot be set in which both of the first motor and the second motor deliver driving force for traveling the vehicle, to the output part.

SUMMARY

The present disclosure has been developed in view of the above-described technical problems, and provides a drive system for a hybrid vehicle, which makes it possible to enhance the variety of traveling modes with a reduced number of constituent elements.

According to one aspect of the present disclosure, a drive system for a hybrid vehicle, including an internal combustion engine, a first motor, a second motor, an output part, a first planetary gear mechanism a second planetary gear mechanism a first clutch mechanism, and a first brake mechanism, is provided. The first motor is configured to generate electric power, using power produced by the internal combustion engine. The second motor is configured to operate with electric power generated by the first motor, so as to produce driving force. The output part is configured to deliver driving force for driving the hybrid vehicle to which the driving force produced by the second motor is added. The power produced by the internal combustion engine is split into a first portion directed to the first motor and a second portion directed to the output part. The first planetary gear mechanism includes a first input element, a first reaction-force element, and a first output element, and is configured to perform differential operation by the first input element, the first reaction-force element, and the first output element. The first input element is configured to receive driving force produced by the internal combustion engine. The first reaction-force element is coupled to the first motor. The second planetary gear mechanism includes a second input element, a second output element, and a second reaction-force element. The second planetary gear mechanism is configured to perform differential operation by the second input element, the second output element, and the second reaction-force element. The second input element is coupled to the first output element. The second output element is coupled to the output part. The first clutch mechanism is configured to selectively couple the first input element with the second reaction-force element. The first brake mechanism is provided between the second reaction-force element and a fixed member, and is configured to selectively inhibit rotation of the second reaction-force element.

In the drive system for the hybrid vehicle according to the above aspect of the present disclosure, the first planetary gear mechanism may be a single pinion planetary gear mechanism including a first sun gear, a first ring gear, and a first carrier, and the second planetary gear mechanism may be a single pinion planetary gear mechanism including a second sun gear, a second ring gear, and a second carrier. The first ring gear may be disposed concentrically with the first sun gear. The first carrier may be configured to rotate while holding a first pinion that meshes with the first sun gear and the first ring gear. The second ring gear may be disposed concentrically with the second sun gear. The second carrier may be configured to rotate while holding a second pinion that meshes with the second sun gear and the second ring gear. The first sun gear may provide the first output element. The first carrier may provide the first input element. The first ring gear may provide the first reaction-force element. The second sun gear may provide the second reaction-force element. The second carrier may provide the second input element. The second ring gear may provide the second output element.

In the drive system for the hybrid vehicle according to the above aspect of the present disclosure, the first planetary gear mechanism may be a double pinion planetary gear mechanism including a first sun gear, a first ring gear, and a first carrier. The second planetary gear mechanism may be a single pinion planetary gear mechanism including a second sun gear, a second ring gear, and a second carrier. The first ring gear may be disposed concentrically with the first sun gear. The first carrier may be configured to rotate while holding a first pinion that meshes with the first sun gear, and a second pinion that meshes with the first pinion and the first ring gear. The second ring gear may be disposed concentrically with the second sun gear. The second carrier may be configured to rotate while holding a third pinion that meshes with the second sun gear and the second ring gear. The first sun gear may provide the first output element. The first carrier may provide the first reaction-force element. The first ring gear may provide the first input element. The second sun gear may provide the second reaction-force element. The second carrier may provide the second input element. The second ring gear may provide the second output element.

In the drive system for the hybrid vehicle according to the above aspect of the present disclosure, the first planetary gear mechanism may be a single pinion planetary gear mechanism including a first sun gear, a first ring gear, and a first carrier. The second planetary gear mechanism may be a double pinion planetary gear mechanism including a second sun gear, a second ring gear, and a second carrier. The first ring gear may be disposed concentrically with the first sun gear. The first carrier may be configured to rotate while holding a first pinion that meshes with the first sun gear and the first ring gear. The second ring gear may be disposed concentrically with the second sun gear. The second carrier may be configured to rotate while holding a second pinion that meshes with the second sun gear, and a third pinion that meshes with the second pinion and the second ring gear. The first sun gear may provide the first output element. The first carrier may provide the first input element. The first ring gear may provide the first reaction-force element. The second sun gear may provide the second reaction-force element. The second carrier may provide the second output element. The second ring gear may provide the second input element.

In the drive system for the hybrid vehicle according to the above aspect of the present disclosure, the first planetary gear mechanism may be a double pinion planetary gear mechanism including a first sun gear, a first ring gear, and a first carrier, and the second planetary gear mechanism may be a double pinion planetary gear mechanism including a second sun gear, a second ring gear, and a second carrier. The first ring gear may be disposed concentrically with the first sun gear. The first carrier may be configured to rotate while holding a first pinion that meshes with the first sun gear, and a second pinion that meshes with the first pinion and the first ring gear. The second ring gear may be disposed concentrically with the second sun gear. The second carrier may be configured to rotate while holding a third pinion that meshes with the second sun gear, and a fourth pinion that meshes with the third pinion and the second ring gear. The first sun gear may provide the first output element. The first carrier may provide the first reaction-force element. The first ring gear may provide the first input element. The second sun gear may provide the second reaction-force element. The second carrier may provide the second output element. The second ring gear may provide the second input element.

In the drive system for the hybrid vehicle according to the above aspect of the present disclosure, the first planetary gear mechanism may be a single pinion planetary gear mechanism including a first sun gear, a first ring gear, and a first carrier, and the second planetary gear mechanism may be a single pinion planetary gear mechanism including a second sun gear, a second ring gear, and a second carrier. The first ring gear may be disposed concentrically with the first sun gear. The first carrier may be configured to rotate while holding a first pinion that meshes with the first sun gear and the first ring gear. The second ring gear may be disposed concentrically with the second sun gear. The second carrier may be configured to rotate while holding a second pinion that meshes with the second sun gear and the second ring gear. The first sun gear may provide the first output element. The first carrier may provide the first input element. The first ring gear may provide the first reaction-force element. The second carrier may provide the second input element. The second sun gear may provide the second output element. The second ring gear may provide the second reaction-force element.

In the drive system for the hybrid vehicle according to the above aspect of the present disclosure, the first planetary gear mechanism may be a single pinion planetary gear mechanism including a first sun gear, a first ring gear, and a first carrier, and the second planetary gear mechanism may be a single pinion planetary gear mechanism including a second sun gear, a second ring gear, and a second carrier. The first ring gear may be disposed concentrically with the first sun gear. The first carrier may be configured to rotate while holding a first pinion that meshes with the first sun gear and the first ring gear. The second ring gear may be disposed concentrically with the second sun gear. The second carrier may be configured to rotate while holding a second pinion that meshes with the second sun gear and the second ring gear. The first sun gear may provide the first output element. The first carrier may provide the first input element. The first ring gear may provide the first reaction-force element. The second ring gear may provide the second reaction-force element. The second sun gear may provide the second input element. The second carrier may provide the second output element.

In the drive system for the hybrid vehicle according to the above aspect of the present disclosure, the first planetary gear mechanism may be a single pinion planetary gear mechanism including a first sun gear, a first ring gear, and a first carrier, and the second planetary gear mechanism may be a single pinion planetary gear mechanism including a second sun gear, a second ring gear, and a second carrier. The first ring gear may be disposed concentrically with the first sun gear. The first carrier may be configured to rotate while holding a first pinion that meshes with the first sun gear and the first ring gear. The second ring gear may be disposed concentrically with the second sun gear. The second carrier may be configured to rotate while holding a second pinion that meshes with the second sun gear and the second ring gear. The first carrier may provide the first output element. The first ring gear may provide the first input element. The first sun gear may provide the first reaction-force element. The second carrier may provide the second reaction-force element. The second sun gear may provide the second input element. The second ring gear may provide the second output element.

In the drive system for the hybrid vehicle according to the above aspect of the present disclosure, the first planetary gear mechanism may be a single pinion planetary gear mechanism including a first sun gear, a first ring gear, and a first carrier, and the second planetary gear mechanism may be a double pinion planetary gear mechanism including a second sun gear, a second ring gear, and a second carrier. The first ring gear may be disposed concentrically with the first sun gear. The first carrier may be configured to rotate while holding a first pinion that meshes with the first sun gear and the first ring gear. The second ring gear may be disposed concentrically with the second sun gear. The second carrier may be configured to rotate while holding a second pinion that meshes with the second sun gear and a third pinion that meshes with the second pinion and the second ring gear. The first sun gear may provide the first output element. The first carrier may provide the first input element. The first ring gear may provide the first reaction-force element. The second sun gear may provide the second reaction-force element. The second carrier may provide the second input element. The second ring gear may provide the second output element.

The drive system for the hybrid vehicle according to the above aspect of the present disclosure may further include a second clutch mechanism configured to selectively couple the second output element with the second reaction-force element. Also, the drive system for the hybrid vehicle of the present disclosure may further include a second brake mechanism configured to selectively fix the first output element to the fixed member. Also, the drive system for the hybrid vehicle of the present disclosure may further include a third clutch mechanism configured to selectively couple the first reaction-force element with the second output element.

The drive system for the hybrid vehicle according to the above aspect of the present disclosure may further include a controller that controls the internal combustion engine, the first motor, the second motor, the first clutch mechanism, and the first brake mechanism. The controller may be configured to engage the first clutch mechanism and the first brake mechanism, and further stop operation of the internal combustion engine so as to cause the first motor and the second motor to produce driving force for traveling the hybrid vehicle forward.

The drive system for the hybrid vehicle according to the above aspect of the present disclosure may further include a controller that controls the internal combustion engine, the first motor, the second motor, the first clutch mechanism, the first brake mechanism, and the second clutch mechanism. The controller may be configured to engage the first brake mechanism and the second clutch mechanism so as to inhibit rotation of drive wheels of the hybrid vehicle.

The drive system for the hybrid vehicle as described above may further include a controller that controls the internal combustion engine, the first motor, the second motor, the first clutch mechanism, and the first brake mechanism. The controller may be configured to engage the first brake mechanism, and further cause the internal combustion engine and the second motor to produce driving force for traveling the hybrid vehicle backward.

The drive system for the hybrid vehicle as described above may further include a controller that controls the internal combustion engine, the first motor, the second motor, the first clutch mechanism, the first brake mechanism, and the second brake mechanism. The controller may be configured to engage the first brake mechanism and the second brake mechanism so as to inhibit rotation of drive wheels of the hybrid vehicle.

The drive system for the hybrid vehicle as described above may further include a controller that controls the internal combustion engine, the first motor, the second motor, the first clutch mechanism, the first brake mechanism, the second brake mechanism, and the third clutch mechanism. The controller may be configured to engage the first brake mechanism and the second brake mechanism so as to inhibit rotation of drive wheels of the hybrid vehicle.

The drive system for the hybrid vehicle according to the present disclosure has the first planetary gear mechanism, second planetary gear mechanism, first clutch mechanism that selectively couples the first input element with the second reaction-force element, and a first brake mechanism that is provided between the second reaction-force element and the fixed member and selectively inhibits rotation of the second reaction-force element. With the reduced number of constituent elements, it is possible to set a traveling mode in which, after the driving force produced by the internal combustion engine is split by the first planetary gear mechanism, the second planetary gear mechanism increases or reduces the received driving force and delivers it to the output part. Accordingly, the variety of traveling modes can be enhanced with the reduced number of constituent elements.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 19 is a view indicating traveling modes that can be set for the drive system shown in FIG. 18;

FIG. 32 is a view indicating traveling modes that can be set for the drive system shown in FIG. 31;

FIG. 33 is a nomographic chart showing operating conditions of a fifth traveling mode indicated in FIG. 32;

FIG. 50 is a view indicating traveling modes that can be set for the drive system shown in FIG. 49;

FIG. 58 is a view indicating traveling modes that can be set for the drive system shown in FIG. 57.

DETAILED DESCRIPTION OF EMBODIMENTS

Figure 1:
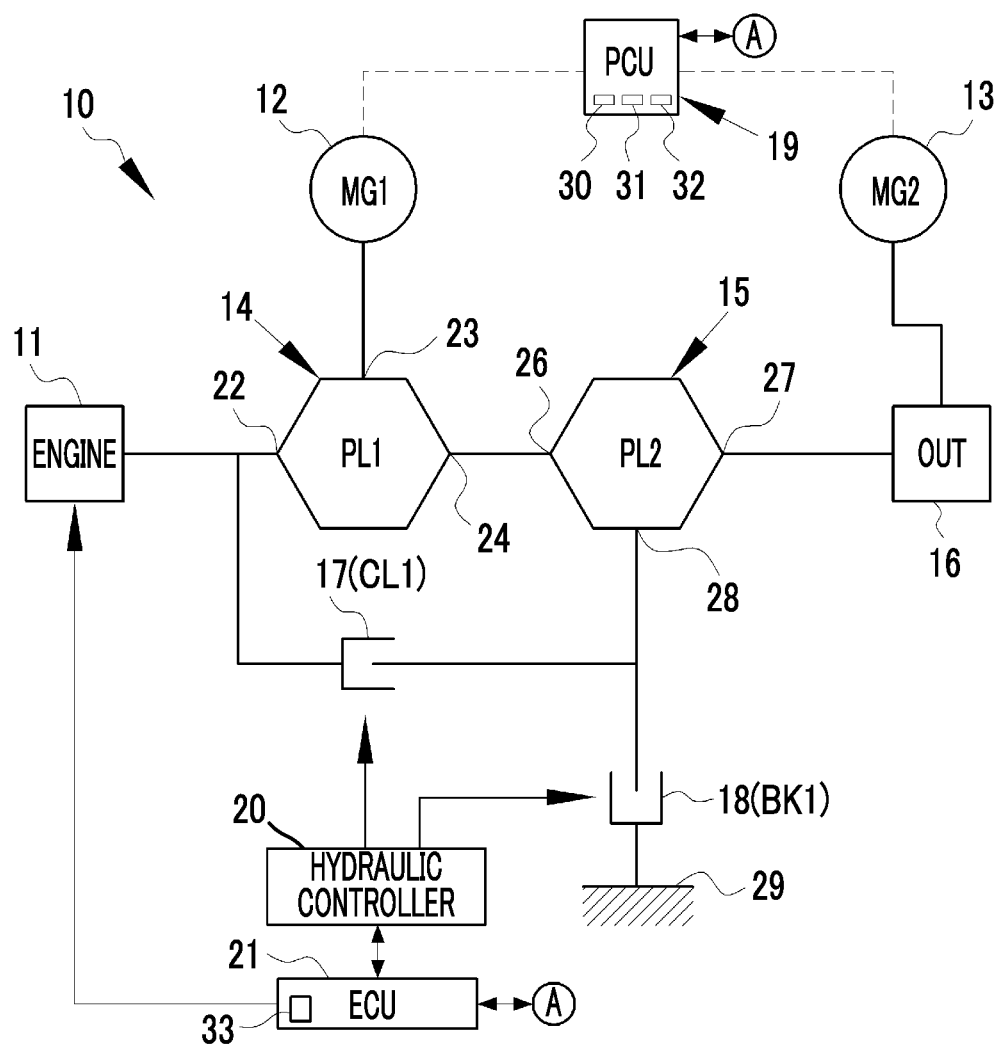
FIG. 1 is a block diagram showing a drive system for a hybrid vehicle according to a first embodiment of the present disclosure.

Some embodiments of the present disclosure will be described with reference to the drawings. The block diagram of FIG. 1 schematically illustrates one example of drive system used in a hybrid vehicle (which will be referred to as "vehicle") according to a first embodiment of the present disclosure. As shown in FIG. 1, the drive system 10 includes an engine 11, first motor (MG(Motor-Generator)1) 12, second motor (MG2) 13, first planetary gear mechanism (PL1) 14, second planetary gear mechanism (PS2) 15, output gear (OUT) 16, first clutch mechanism (CL1) 17, first brake mechanism (BK1) 18, PCU (Power Control Unit) 19, hydraulic controller 20, and ECU (Electronic Control Unit) 21. The vehicle may be a plug-in hybrid vehicle that can be charged by means of an external power supply. The engine 11 is one example of the above-mentioned internal combustion engine. The output gear 16 is one example of the output part.

The first motor 12 is provided by a motor (motor-generator) having a function of generating electric power. The drive system 10 is arranged to drive the second motor 13 using electric power generated by the first motor 12, and add driving force produced by the second motor 13 to driving force for traveling the vehicle. The second motor 13 is provided by a motor (motor-generator) having a function of generating electric power.

The first planetary gear mechanism 14 has a first input element 22 that receives output torque of the engine 11, a first reaction-force element 23 coupled to the first motor 12, and a first output element 24, and performs differential operation using these elements 22, 23, 24. The second planetary gear mechanism 15 has a second input element 26 coupled to the first output element 24, a second output element 27 coupled to the output gear 16, and a second reaction-force element 28, and performs differential operation using these elements 26, 27, 28. The first clutch mechanism 17 selectively couples the first input element 22 with the second reaction-force element 28. The first brake mechanism 18 is provided between the second reaction-force element 28 and a fixed member 29, and selectively inhibits rotation of the second reaction-force element 28.

The first clutch mechanism 17 may be a friction type clutch mechanism, such as a wet multiple disc clutch, or a mesh-type clutch mechanism, such as a dog clutch. The first clutch mechanism 17 is hydraulically controlled, for example, to be engaged or released. The first brake mechanism 18 may be a friction engagement type clutch device similar to the first clutch mechanism 17, but is not limited to this. For example, a mesh-type clutch mechanism may be used as the brake mechanism. The first brake mechanism 18 is hydraulically controlled, for example, to be engaged or released. The hydraulic controller 20 individually controls supply of hydraulic pressure to the first clutch mechanism 17 and the first brake mechanism 18, according to command values from the ECU 21.

The PCU 19 includes an inverter 30, a battery 31, and an MG ECU 32. The inverter 30 and the battery 31 are connected to the first motor 12 and the second motor 13. The PCU 19 performs control for supplying electric power for driving the first motor 12 and the second motor 13, and storing electric power generated by the first motor 12 and the second motor 13. The ECU 21 includes an engine-ECU 33 that controls operation of the engine 11, and comprehensively controls the engine-ECU 33, PCU 19, and the hydraulic controller 20. The PCU 19, hydraulic controller 20, ECU 21, and the engine-ECU 33 are examples of controllers.

Figures 2, 3:
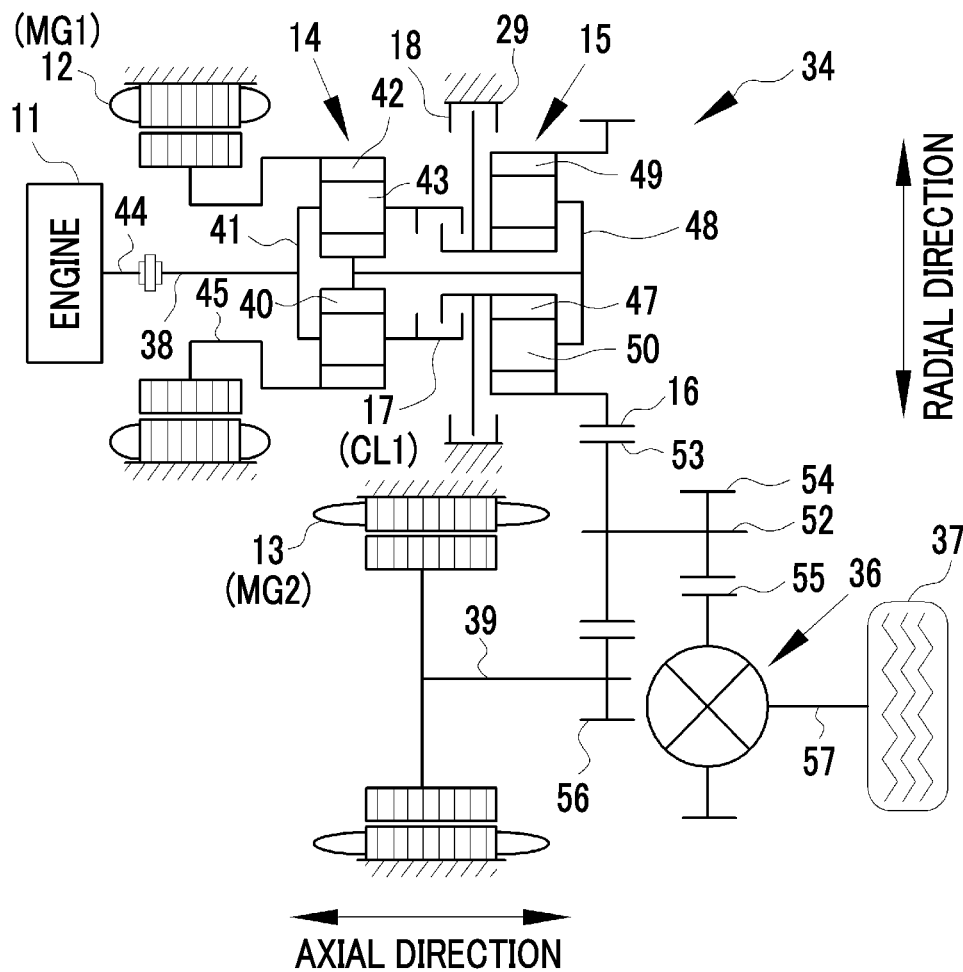
FIG. 2 is a skeleton diagram showing one example of the drive system shown in FIG. 1.
FIG. 3 is a view indicating traveling modes that can be set for the drive system shown in FIG. 2.

FIG. 2 is a skeleton diagram that specifically illustrates one example of the drive system 10 shown in FIG. 1. As shown in FIG. 2, the drive system 34 includes the engine 11, first motor 12, second motor 13, first planetary gear mechanism 14, second planetary gear mechanism 15, differential gear set 36, drive wheels 37, and so forth, and is of a double-axis type, namely, an input shaft 38 of the first planetary gear mechanism 14 and a rotor 39 of the second motor 13 are disposed on different axes.

The first planetary gear mechanism 14 provides a power split mechanism that splits output torque of the engine 11 to the first motor 12 side and the output gear 16 side, and performs differential operation, using three rotating elements, i.e., input element, output element and reaction-force element. The first planetary gear mechanism 14 is in the form of a single pinion planetary gear mechanism including a first sun gear 40, a first carrier 41, and a first ring gear 42. The first sun gear 40 is an externally-toothed gear. The first ring gear 42 is an internally-toothed gear that is disposed concentrically with the first sun gear 40. The first carrier 41 rotates while holding first pinions 43 that mesh with the first sun gear 40 and the first ring gear 42. The first carrier 41 is one example of the first input element 22, and the first ring gear 42 is one example of the first reaction-force element 23, while the first sun gear 40 is one example of the first output element 24.

The driving force produced by the engine 11 is applied to the first carrier 41. More specifically, the input shaft 38 coupled to an output shaft 44 of the engine 11 is coupled to the first carrier 41. The arrangement in which the first carrier 41 and the input shaft 38 are directly coupled to each other may be replaced by an arrangement in which the first carrier 41 and the input shaft 38 are coupled via a power transmission mechanism, such as a gear mechanism. Also, a damper mechanism, or a mechanism, such as a torque converter, may be disposed between the output shaft 44 and the input shaft 38. A rotor 45 of the first motor 12 is coupled to the first ring gear 42. In the first embodiment shown in FIG. 2, the first planetary gear mechanism 14 and the first motor 12 are disposed on the same axis as the center axis of rotation of the engine 11, and the first motor 12 is disposed between the engine 11 and the first planetary gear mechanism 14.

The second planetary gear mechanism 15 is located on one side of the first planetary gear mechanism 14 opposite to the engine 11, and is arranged on the same axis with the engine 11 and the first planetary gear mechanism 14. The second planetary gear mechanism 15 is in the form of a single pinion planetary gear mechanism, which is a differential mechanism that performs differential operation using three rotating elements, i.e., a second sun gear 47, a second carrier 48, and a second ring gear 49. The second sun gear 47 is an externally-toothed gear, and is coupled to the first carrier 41 of the first planetary gear mechanism 14 via the first clutch mechanism 17. The second ring gear 49 is an internally-toothed gear disposed concentrically with the second sun gear 47, and rotates as a unit with the output gear 16. The second carrier 48 rotates while holding second pinions 50 that mesh with the second sun gear 47 and the second ring gear 49, and is coupled to the first sun gear 40 of the first planetary gear mechanism 14. The second sun gear 47 is one example of the second reaction-force element 28, and the second carrier 48 is one example of the second input element 26, while the second ring gear 49 is one example of the second output element 27.

The first clutch mechanism 17 is arranged to selectively couple the second sun gear 47 with the first carrier 41. A composite planetary gear mechanism is formed such that the first carrier 41 and the second sun gear 47 coupled by engagement of the first clutch mechanism 17 provide an input element, and the first sun gear 40 an the second carrier 48 provide a reaction-force element, while the first ring gear 42 and the second ring gear 49 provide an output element.

The first brake mechanism 18 is arranged to selectively fix the second sun gear 47 to the fixed member 29. The first brake mechanism 18 is engaged when the output torque of the engine 11 is transmitted to the output gear 16, so that reaction force is applied to the second sun gear 47 and the second planetary gear mechanism 15 functions as a speed-up gear. Also, the first brake mechanism 18 is engaged in a condition where the first clutch mechanism 17 is engaged, so that the first carrier 41 and the output shaft 44 of the engine 11, and the second sun gear 47, are fixed. As a result, the driving force produced by the first motor 12 can be transmitted to the second ring gear 49 of the second planetary gear mechanism 15.

The first clutch mechanism 17 and the first brake mechanism 18 may be arranged on the radially inner side and radially outer side, to be aligned with each other in radial directions. In this case, the axial length of the drive system 34 as a whole can be shortened. The first clutch mechanism 17 and the first brake mechanism 18 may also be arranged in the axial direction. In this case, restrictions on the outer diameters of the first clutch mechanism 17 and the first brake mechanism 18 are reduced; therefore, when a friction type clutch mechanism is employed, the number of friction plates can be reduced.

The drive system 34 includes a countershaft 52 and a driven gear 53. The countershaft 52 is disposed in parallel with the center axis of rotation of the engine 11 and the first planetary gear mechanism 14 or the second planetary gear mechanism 15. The driven gear 53 is mounted on the countershaft 52, and meshes with the output gear 16. Also, a first drive gear 54 is mounted on the countershaft 52, and the first drive gear 54 meshes with a ring gear 55 of the differential gear set 36 as a final reduction gear. A second drive gear 56 is mounted on the rotor 39 of the second motor 13. The second drive gear 56 meshes with the driven gear 53. Accordingly, the drive system 34 is arranged to add output torque of the second motor 13, to torque delivered from the output gear 16, at the driven gear 53. The torque thus combined at the driven gear 53 is transmitted from the differential gear set 36 to right and left drive shafts 57. The drive wheels 37 are rotated with the torque transmitted to the drive shafts 57.

FIG. 3 indicates four different traveling modes that can be set for the drive system 34 described above with reference to FIG. 2. As shown in FIG. 3, the drive system 34 can be set in any one of first traveling mode through fourth traveling mode, by changing the engagement states of the first clutch mechanism (CL1) 17 and the first brake mechanism (BK1) 18. The ECU 21 controls the first clutch mechanism 17, first brake mechanism 18, engine 11, first motor 12, and the second motor 13, so as to set each of the first traveling mode through the fourth traveling mode, which is one example of forward traveling modes. In FIG. 3, the engagement states of the first clutch mechanism 17 and the first brake mechanism 18 in each traveling mode are denoted as "-" representing released state, or "O" representing engaged or fixed state. In the table of FIG. 3, "POWER SPLITTING PART" denotes the first planetary gear mechanism 14, and "DIRECTLY RECEIVING PART" denotes the second planetary gear mechanism 15.

The first traveling mode and the second traveling mode are examples of hybrid traveling modes in which the vehicle travels with driving force corresponding to the driving force produced by the engine 11 and the driving force produced by the second motor 13. The first traveling mode is set by engaging the first clutch mechanism 17. When the drive system 34 is placed in the first traveling mode, the first clutch mechanism 17 is engaged so as to couple the first carrier 41 with the second sun gear 47, so that the first planetary gear mechanism 14 and the second planetary gear mechanism 15 cooperate to form a composite planetary gear mechanism.

In the first traveling mode, the first clutch mechanism 17 is engaged so that the first carrier 41 and the second sun gear 47 are coupled to each other. Therefore, output torque of the engine 11 is transmitted to the first pinions 43 and the second sun gear 47 via the first carrier 41. Accordingly, in the first planetary gear mechanism 14, the first motor 12 functions as a generator, and applies negative torque (torque in a direction opposite to toque produced by the engine 11) to the first ring gear 42, so that the first sun gear 40 rotates in the positive direction (rotates in the same direction as the engine 11). Namely, the output torque of the engine 11 is split, and a part of the torque is transmitted to the first motor 12. In the second planetary gear mechanism 15, the second carrier 48 rotates in the same direction as the first sun gear 40 of the first planetary gear mechanism 14, in a condition where the second sun gear 47 rotates together with the output shaft 44 of the engine 11. Therefore, the second ring gear 49 rotates in the same direction as the output shaft 44, at a rotational speed that depends on the rotational speeds of the second sun gear 47 and the second carrier 48 and the gear ratio (the ratio of the number of teeth of the second sun gear 47 to that of the second ring gear 49) of the second planetary gear mechanism 15. Namely, another part of the output torque of the engine 11 is transmitted to the second ring gear 49. In other words, the first planetary gear mechanism 14 and the second planetary gear mechanism 15 form a composite planetary gear mechanism, and the output torque of the engine 11 is split by the composite planetary gear mechanism to the first motor 12 side and the output gear 16 side. The second motor 13 is driven as a motor, using electric power generated by the first motor 12, for example.

The second traveling mode is set by engaging the first brake mechanism 18. Accordingly, the first planetary gear mechanism 14 and the second planetary gear mechanism 15 function independently of each other, since only the first sun gear 40 and the second carrier 48 are coupled to each other.

Namely, in the first planetary gear mechanism 14, the output torque of the engine 11 is split to the first motor 12 side and the first sun gear 40 side. In this case, the first motor 12 functions as a generator. The output torque of the engine 11 is transmitted from the first sun gear 40 to the second carrier 48 of the second planetary gear mechanism 15. At this time, the second sun gear 47 is fixed by the first brake mechanism 18. Therefore, the second planetary gear mechanism 15 functions as a speed-up gear, and the second ring gear 49 rotates at a higher rotational speed than the second carrier 48 (and the first sun gear 40). The second motor 13 is driven as a motor, using electric power generated by the first motor 12, for example.

The third traveling mode and the fourth traveling mode are examples of EV traveling modes in which operation of the engine 11 is stopped, and the vehicle travels as an electric vehicle.

The third traveling mode is set by releasing the first clutch mechanism 17 and the first brake mechanism 18. When the third traveling mode is set, operation of the engine 11 is stopped. Accordingly, in the third traveling mode, the first carrier 41 of the first planetary gear mechanism 14 and the second sun gear 47 of the second planetary gear mechanism 15 idle. Therefore, the first planetary gear mechanism 14 and the second planetary gear mechanism 15 do not function to transmit torque. Thus, when the third traveling mode is set, the ECU 21 controls the second motor 13 so that it functions as a motor, and controls the first motor 12 so that it does not function as a motor that produces torque. This condition is the same as or similar to a condition where the first planetary gear mechanism 14 is disconnected from a power transmission path through which driving force delivered from the second motor 13 is transmitted. Therefore, in FIG. 3, "EV MODE: DISCONNECTED" appears in the column of the third traveling mode.

The fourth traveling mode is set by engaging the first clutch mechanism 17, and engaging the first brake mechanism 18. In the fourth traveling mode, the vehicle travels using driving force delivered from both the first motor 12 and the second motor 13. When the fourth traveling mode is set, operation of the engine 11 is stopped. Since the first clutch mechanism 17 is engaged, and the first brake mechanism 18 is engaged to fix the second sun gear 47 to the fixed member 29, the first carrier 41, output shaft 44 of the engine 11, and the second sun gear 47 are inhibited from rotating.

When the fourth traveling mode is set, the driving force produced by the first motor 12 is applied to the first ring gear 42, and is transmitted from the first sun gear 40 to the second carrier 48, under reaction force of the first carrier 41 that is inhibited from rotating due to stop of operation of the engine 11. The driving force transmitted to the second carrier 48 is transmitted to the second ring gear 49, under reaction force of the second sun gear 47 that is inhibited from rotating due to engagement of the first brake mechanism 18. The driving force transmitted to the second ring gear 49 is transmitted to the driven gear 53. In the meantime, the driving force produced by the second motor 13 is transmitted to the driven gear 53. As a result, the driving force produced by the second motor 13 is added to the driving force produced by the first motor 12, and the resulting driving force is transmitted to the drive wheels 37.

Figure 4:
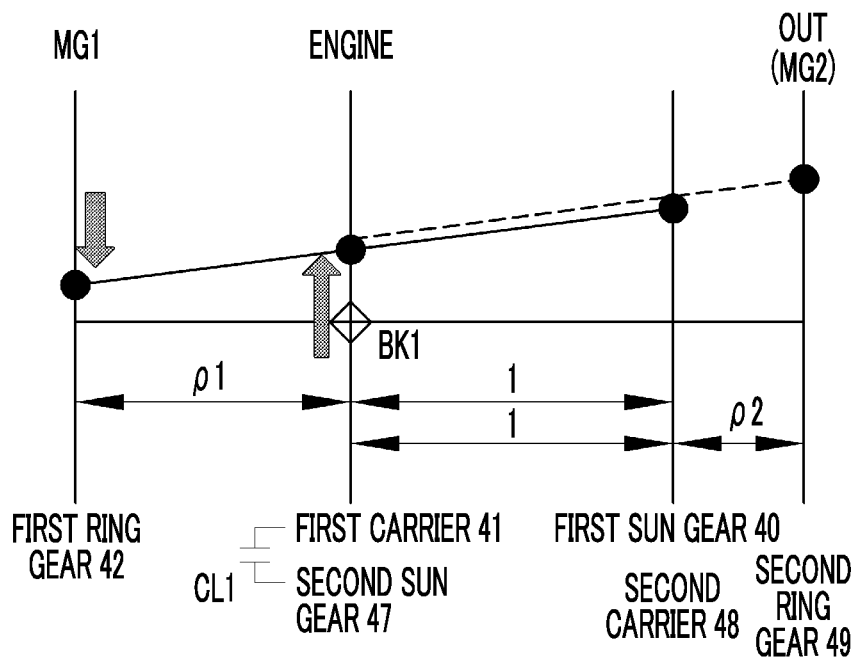
FIG. 4 is a nomographic chart showing operating conditions of a first traveling mode indicated in FIG. 3.

FIG. 4 is a nomographic chart showing operating conditions of the first traveling mode shown in FIG. 3. As shown in the nomographic chart of FIG. 4, straight lines (vertical lines) indicating respective rotating elements of the composite planetary gear mechanism are drawn in parallel with each other with intervals representing the gear ratios, and distances from a base line that intersects with these straight lines at right angles represent the rotational speeds of the respective rotating elements. Each cross line in the nomographic chart indicates the relationship of the rotational speeds of the respective rotating elements that are placed in different coupling states depending on the respective engagement states of the first clutch mechanism 17 and the first brake mechanism 18. A solid cross line shown in FIG. 4 indicates relative rotational speeds of the three rotating elements of the first planetary gear mechanism 14, and a dotted cross line shown in FIG. 4 indicates relative rotational speeds of the three rotating elements of the second planetary gear mechanism 15.

In the first traveling mode, the first clutch mechanism 17 is engaged so that the first carrier 41 and the second sun gear 47 are coupled to each other. Therefore, the composite planetary gear mechanism is formed by the first planetary gear mechanism 14 and the second planetary gear mechanism 15. The first carrier 41 and the second sun gear 47, which are coupled to each other, function as an input element of the composite planetary gear mechanism. In the first planetary gear mechanism 14, the output torque of the engine 11 is applied to the first carrier 41, and negative torque produced when the first motor 12 functions as a generator is applied to the first ring gear 42. Accordingly, the first sun gear 40 receives positive torque (torque in the direction of rotation of the engine 11) and rotates, and the torque of the first sun gear 40 is transmitted to the second carrier 48 of the second planetary gear mechanism 15. In the second planetary gear mechanism 15, the second sun gear 47 is coupled to the output shaft 44 of the engine 11 and rotates along with the output shaft 44, through engagement of the first clutch mechanism 17, and the second carrier 48 rotates in the positive direction (rotates in the same direction as the engine 11) with torque transmitted from the first sun gear 40. Therefore, the second ring gear 49 rotates in the positive direction. Namely, a part of the output torque of the engine 11 is distributed to the first motor 12 in the first planetary gear mechanism 14, and another part of the same torque is distributed to the second ring gear 49 of the second planetary gear mechanism 15 and delivered from the output gear 16. Namely, the above-described composite planetary gear mechanism functions as a power split mechanism that splits the torque of the engine 11 to the first motor 12 side and the output gear 16 side, and its power split ratio is "$(1+\rho 2)/\rho 1$" where the split ratio for the output gear 16 is "1". Here, "$\rho 1$" is the gear ratio (the ratio of the number of teeth of the first sun gear 40 and the number of teeth of the first ring gear 42) in the first planetary gear mechanism 14, and "$\rho 2$" is the gear ratio (the ratio of the number of teeth of the second ring gear 49 and the number of teeth of the second sun gear 47). In the following description, the proportion or ratio at which the torque of the engine 11 is split to the output side of the power split mechanism and the first motor 12 side will be called "power split ratio".

Figure 5:
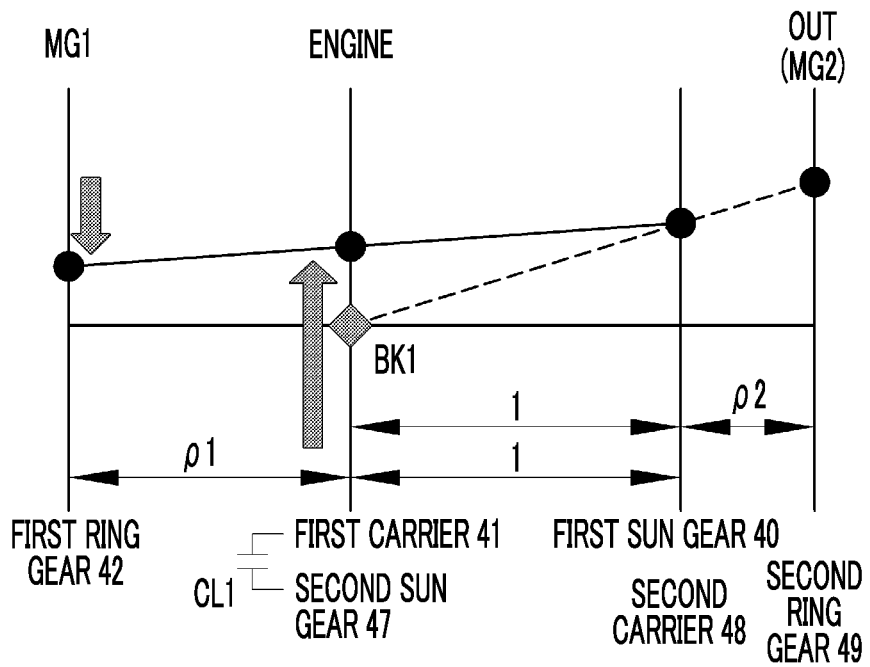
FIG. 5 is a nomographic chart showing operating conditions of a second traveling mode indicated in FIG. 3.

FIG. 5 is a nomographic chart showing operating conditions of the second traveling mode shown in FIG. 3. In the second traveling mode, the first clutch mechanism 17 is released, as described above. Therefore, only the first sun gear 40 of the first planetary gear mechanism 14 and the second carrier 48 of the second planetary gear mechanism 15 are coupled to each other. In addition, the first brake mechanism 18 is engaged so that the second sun gear 47 is fixed. Thus, the first planetary gear mechanism 14 and the second planetary gear mechanism 15 function independently of each other. Namely, in the first planetary gear mechanism 14, the output torque of the engine 11 is transmitted to the first carrier 41 so that the first carrier 41 rotates in the positive direction, and negative torque produced by the first motor 12 that functions as a generator is applied to the first ring gear 42, in the same manner as the operating conditions of the above-described first traveling mode. Accordingly, the first sun gear 40 rotates in the positive direction. Thus, the output torque of the engine 11 is split by the first planetary gear mechanism 14 to the first motor 12 side and the first sun gear 40 side. In this case, the split ratio of the power to the first motor 12 side is "$1/\rho 1$" where the split ratio of the power to the first sun gear 40 is "1". Accordingly, the torque split to the first motor 12 side is smaller than that in the case of the above-described first traveling mode. Thus, "SPLIT RATIO SMALL (Lo)" is written in the column of the power splitting part of the second traveling mode shown in FIG. 3. In the second planetary gear mechanism 15, positive torque is transmitted from the first sun gear 40 to the second carrier 48, in a condition where the second sun gear 47 is fixed by the first brake mechanism 18. Therefore, the second planetary gear mechanism 15 functions as a speed-up gear, and the second ring gear 49 and the output gear 16 integral with the second ring gear 49 rotate at a higher rotational speed than the second carrier 48. In the column of the directly receiving part of the second traveling mode shown in FIG. 3, "SPEED UP (Hi)" is written.

In the second traveling mode, when the engine 11 is required to produce high torque, as in the case where a supercharger included in the engine 11 is activated, or control, such as cylinder deactivation, is performed, for example, the first motor 12 is controlled to be driven so as to increase the torque of the engine 11 (lower the rotational speed). In this case, by setting the split ratio of the power from the engine 11 to the first motor 12 side to be smaller than that in the case of the first traveling mode, it is possible to completely remove reaction force that acts on the output shaft 44 of the engine 11 without increasing reaction-force torque that acts on the rotor 45 of the first motor 12. However, if only the power split ratio is simply reduced, a difference in the rotational speed between the first motor 12 and the drive wheels 37 is increased, and power circulation may occur, namely, the first motor 12 may be driven with electric power generated by the second motor 13. When the second traveling mode as described above is set, the power split ratio is set to be smaller than that in the case of the first traveling mode, and, furthermore, the second planetary gear mechanism 15 functions as a speed-up transmission. Therefore, even if the engine 11 is required to provide high torque, the first motor 12 can be controlled so that it operates in a rotating state (positive rotation and negative torque) for generating electric power, whereby the power circulation can be prevented from occurring.

The drive system 34 consists solely of the first planetary gear mechanism 14, second planetary gear mechanism 15, first clutch mechanism 17, and the first brake mechanism 18. Even with the simple arrangement, the drive system 34 is able to set the first traveling mode and the second traveling mode in which so-called directly transmitted engine torque, which is delivered from the output gear 16 after being split by the first planetary gear mechanism 14, is increased or reduced by the second planetary gear mechanism 15. Thus, the variety of traveling modes can be enhanced.

Figure 6:
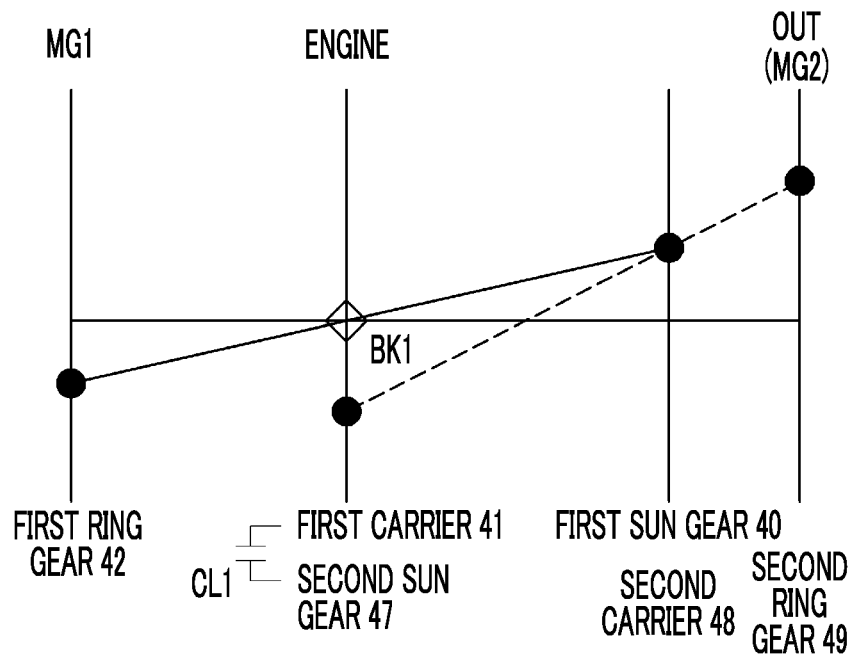
FIG. 6 is a nomographic chart showing operating conditions of a third traveling mode indicated in FIG. 3.

FIG. 6 is a nomographic chart showing operating conditions of the third traveling mode shown in FIG. 3. In the third traveling mode, operation of the engine 11 is stopped, and the vehicle travels only with driving force produced by the second motor 13. When the third traveling mode is set, operation of the engine 11 is stopped. The driving force produced by the second motor 13 is transmitted to the drive wheels 37 via the second drive gear 56 and the driven gear 53. On the other hand, the output gear 16 that meshes with the driven gear 53, and the second ring gear 49 integral with the output gear 16, rotate in the positive direction. Resisting force caused by stop of rotation of the output shaft 44 of the engine 11 acts on the second carrier 48, and the first clutch mechanism 17 is released; therefore, the second sun gear 47 rotates in the negative direction. Namely, since the second sun gear 47 idles, no torque is transmitted via the second planetary gear mechanism 15. Also, in the first planetary gear mechanism 14, the first carrier 41 is coupled to the output shaft 44, and receives resisting force. Further, electric current is passed through the first motor 12 so as to rotate it in the negative direction. Therefore, the first sun gear 40 rotates in accordance with rotation of the first ring gear 42. When current is passed through the first motor 12 to cause the motor 12 to generate drive torque, negative torque is applied to the engine 11 and the first carrier 41, and the output shaft 44 and the first carrier 41 idle in the negative direction, such that no reaction-force torque is generated. Therefore, the first sun gear 40 does not rotate in the positive direction with the torque of the first motor 12. After all, when the third traveling mode is set, the first motor 12 cannot function as a driving force source.

Thus, when the third traveling mode is set, the engine 11 is less likely or unlikely to be forced to rotate (dragged) during traveling, for example, so that an energy loss corresponding to the drag can be avoided, and the energy efficiency can be enhanced. Also, with an attempt to curb damage, seizure, or the like, of bearings included in the second planetary gear mechanism 15, for example, the maximum vehicle speed may be limited in EV traveling. However, when the third traveling mode is set, the second planetary gear mechanism 15 is placed in a neutral state, namely, large torque is not applied to the mechanism 15, and contact pressures at rotating and sliding portions, such as bearings, are not increased; therefore, the limitation on the maximum vehicle speed can be relaxed or reduced.

Figure 7:
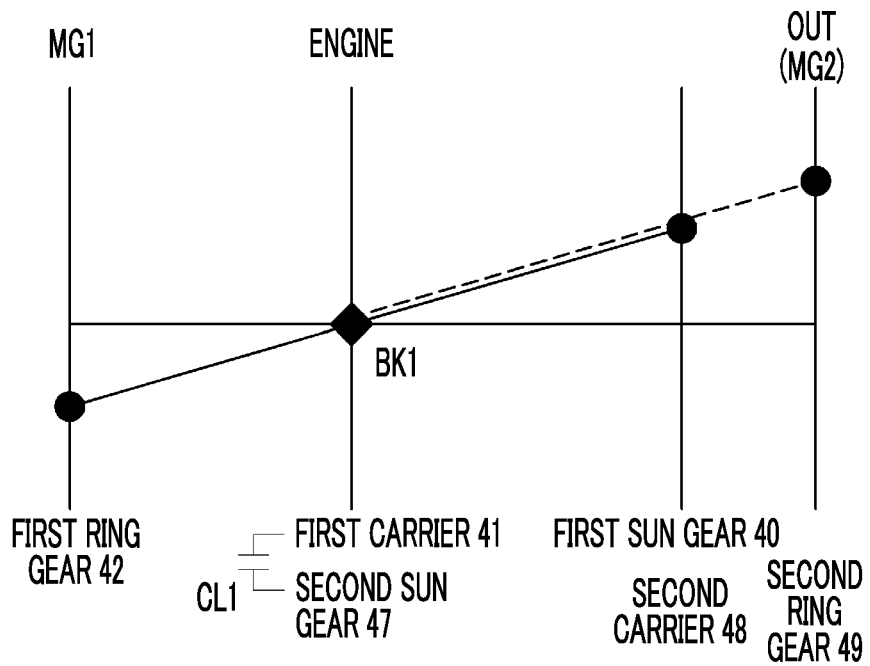
FIG. 7 is a nomographic chart showing operating conditions of a fourth traveling mode indicated in FIG. 3.

FIG. 7 is a nomographic chart showing operating conditions of the fourth traveling mode shown in FIG. 3. The fourth traveling mode is a both-motor drive mode in which operation of the engine 11 is stopped, and both of the first motor 12 and the second motor 13 are driven to travel the vehicle. The first motor 12 is controlled to be driven so as to generate negative torque and rotate in the negative direction, so that the first motor 12 functions as a motor. The fourth traveling mode is set by engaging the first clutch mechanism 17, and engaging the first brake mechanism 18. Therefore, the first carrier 41 and the second sun gear 47 are fixed. The driving force produced by the first motor 12 is transmitted to the first ring gear 42, first sun gear 40, second carrier 48, and the second ring gear 49 in the order of description. As a result, the second ring gear 49 rotates in the positive direction. Also, the second motor 13 is controlled to be driven so as to function as a motor. Accordingly, when the fourth traveling mode is set, the driving force corresponding to the driving force produced by the first motor 12 and the driving force produced by the second motor 13 is transmitted to the drive wheels 37. With this arrangement, when the fourth traveling mode is set, the driving force of the first motor 12 can be used as driving force for traveling the vehicle.

In the manner as described above, the drive system 34 changes the power split ratio by selectively coupling the first input element 22 of the first planetary gear mechanism 14 shown in FIG. 1 with the second reaction-force element 28 of the second planetary gear mechanism 15 by use of the first clutch mechanism 17, and selectively fixing the second reaction-force element 28 of the second planetary gear mechanism 15 by use of the first brake mechanism 18. As will be described below, the composite planetary gear mechanism may be constructed in other fashions than that as described above with reference to FIG. 2.

For example, a double pinion planetary gear mechanism may be used for the first planetary gear mechanism 14, in place of the single pinion planetary gear mechanism. In this case, the sun gear of the single pinion planetary gear mechanism may be replaced with a sun gear of the double pinion planetary gear mechanism, and the carrier of the single pinion planetary gear mechanism may be replaced with a ring gear of the double pinion type planetary gear mechanism, while the ring gear of the single pinion planetary gear mechanism may be replaced with a carrier of the double pinion planetary gear mechanism.

Figures 8, 9:
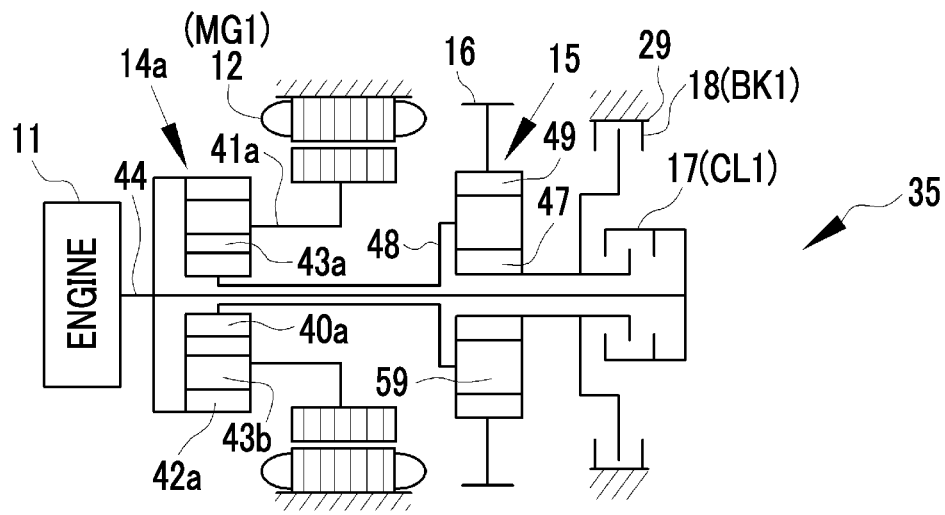
FIG. 8 is a skeleton diagram showing a drive system as a second embodiment of the present disclosure, in which a first planetary gear mechanism of the drive system of the first embodiment shown in FIG. 1 is provided by a double pinion planetary gear mechanism.
FIG. 9 is a view indicating traveling modes that can be set for the drive system shown in FIG. 8.

Next, a drive system of a second embodiment will be described. FIG. 8 is a skeleton diagram illustrating a drive system 35 that uses a double pinion planetary gear mechanism for the first planetary gear mechanism 14 shown in FIG. 2. As shown in FIG. 8, the first planetary gear mechanism 14a of double pinion type has first pinions 43a that mesh with a first sun gear 40a, second pinions 43b that mesh with the first pinions 43a and a first ring gear 42a, and a first carrier 41a that rotates while holding the first pinions 43a and the second pinions 43b. The first planetary gear mechanism 14a consists of the first ring gear 42a as one example of the first input element 22, first carrier 41a as one example of the first reaction-force element 23, and the first sun gear 40a as one example of the first output element 24. The second carrier 48 of the second planetary gear mechanism 15 rotates while holding third pinions 59 that mesh with the second sun gear 47 and the second ring gear 49. The first clutch mechanism 17 selectively couples the first ring gear 42a with the second sun gear 47 as one example of the second reaction-force element. The first brake mechanism 18 selectively fixes the second sun gear 47 to the fixed member 29. The third pinions 59 are the same or similar members as the second pinions 50 shown in FIG. 2. In FIG. 8, the same reference numerals are assigned to the same or similar members as those described above with reference to FIG. 2, and detailed description of these members will not be provided. Further, in FIG. 8 and other skeleton diagrams that will be described below, the driven gear 53, first drive gear 54, ring gear 55, second motor 13, second drive gear 56, etc., which are present on a power transmission path from the output gear 16 to the drive wheels 37 shown in FIG. 2, are not illustrated.

FIG. 9 indicates traveling modes that can be set for the drive system 35 described above with reference to FIG. 8. As shown in FIG. 9, the drive system 35 can be placed in any one of first traveling mode through fourth traveling mode, by changing the engagement states of the first clutch mechanism (CL1) 17 and the first brake mechanism (BK1) 18. The operating conditions of the first traveling mode through the fourth traveling mode shown in FIG. 9 are the same as or similar to the operating conditions of the first traveling mode through the fourth traveling mode as described above with reference to FIG. 3, and therefore, will not be described in detail.

Figure 10:
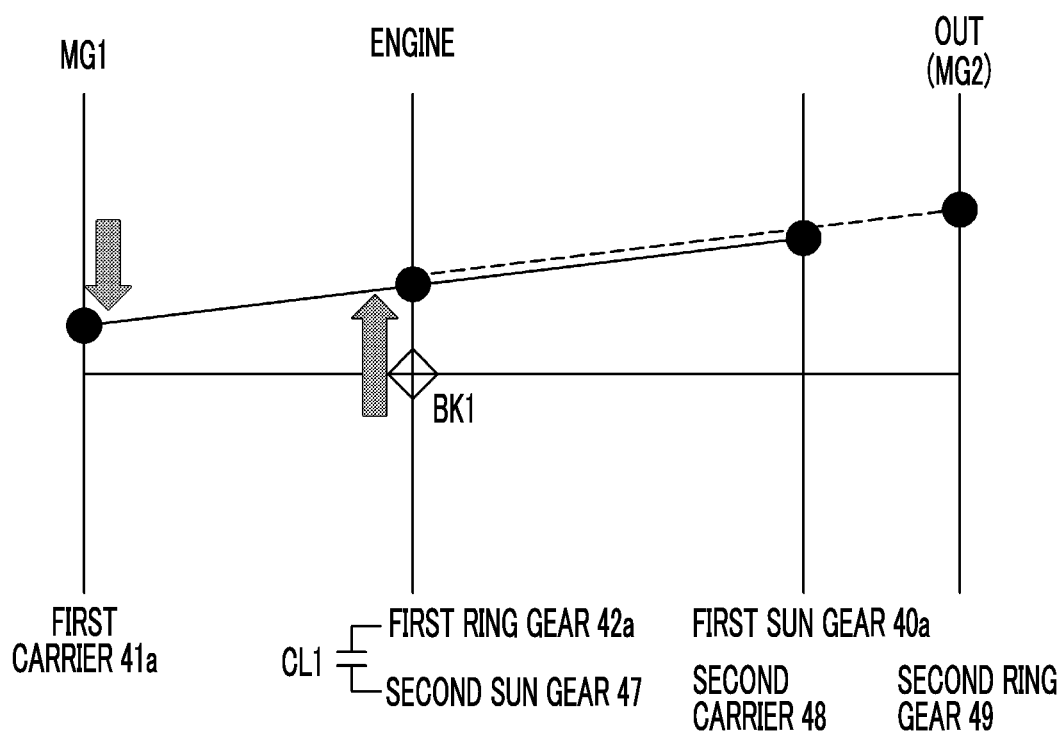
FIG. 10 is a nomographic chart showing operating conditions of a first traveling mode indicated in FIG. 9.

FIG. 10 is a nomographic chart showing operating conditions of the first traveling mode indicated in FIG. 9. The nomographic chart of FIG. 10 indicating the operating conditions of the first traveling mode is the same as or similar to the nomographic chart of FIG. 4 indicating the operating conditions of the first traveling mode, and therefore, will not be described in detail.

Figure 11:
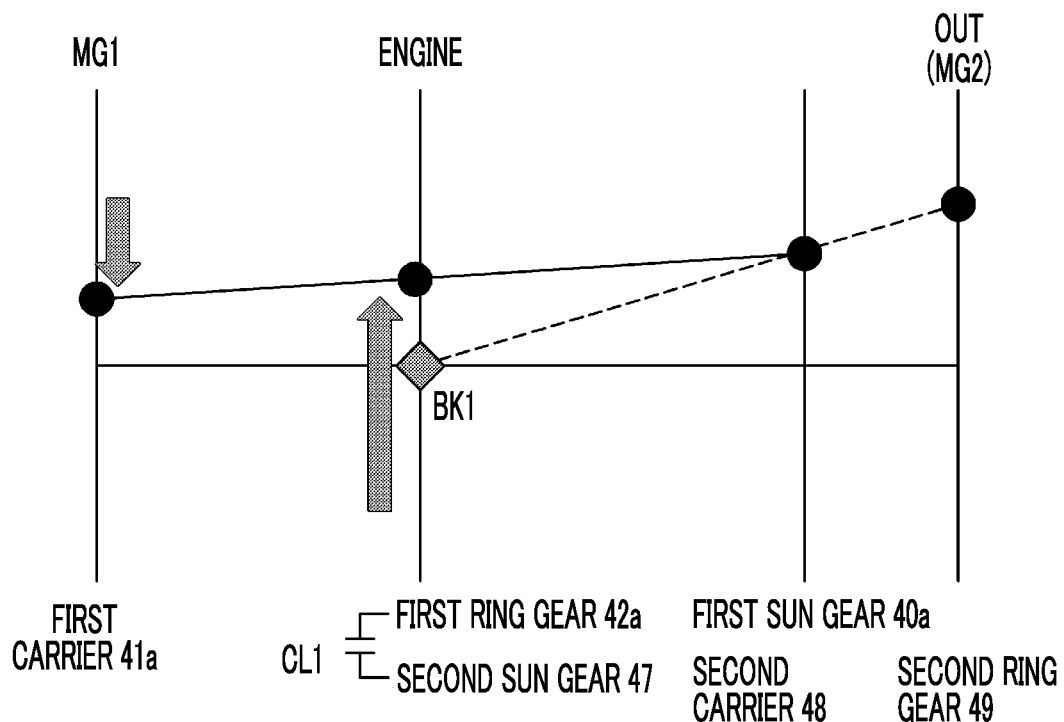
FIG. 11 is a nomographic chart showing operating conditions of a second traveling mode indicated in FIG. 9.

FIG. 11 is a nomographic chart showing operating conditions of the second traveling mode indicated in FIG. 9. The nomographic chart of FIG. 11 indicating the operating conditions of the second traveling mode is the same as or similar to the nomographic chart of FIG. 5 indicating the operating conditions of the second traveling mode, and therefore, will not be described in detail.

Figure 12:
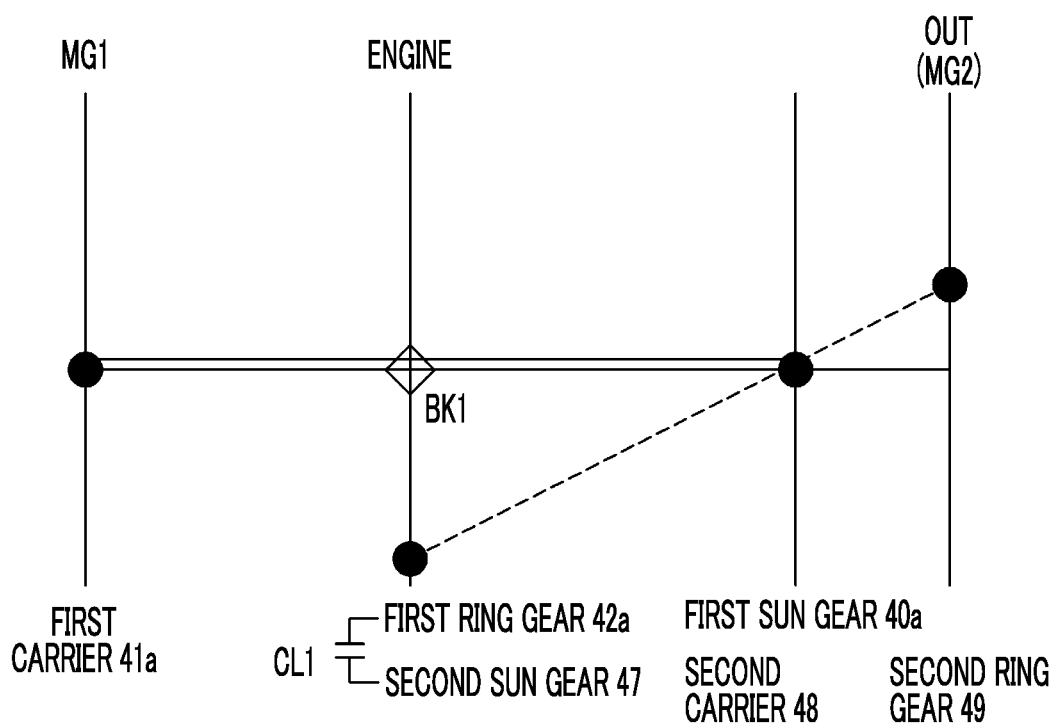
FIG. 12 is a nomographic chart showing operating conditions of a third traveling mode indicated in FIG. 9.

FIG. 12 is a nomographic chart showing operating conditions of the third traveling mode indicated in FIG. 9. The nomographic chart of FIG. 12 indicating the operating conditions of the third traveling mode is the same as or similar to the nomographic chart of FIG. 6 indicating the operating conditions of the third traveling mode, and therefore, will not be described in detail. It is, however, to be noted that, in the operating conditions shown in FIG. 12, no current is applied to the first motor 12, and cogging torque is generated, as compared with the operating conditions of the third traveling mode described above with reference to FIG. 6.

Figure 13:
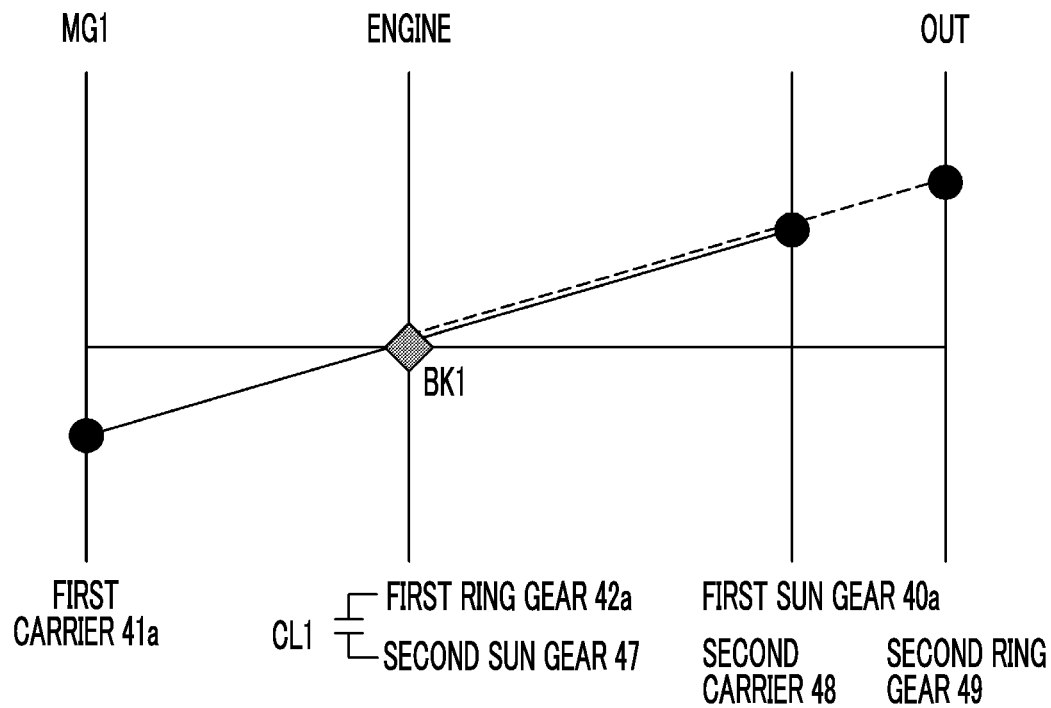
FIG. 13 is a nomographic chart showing operating conditions of a fourth traveling mode indicated in FIG. 9.

FIG. 13 is a nomographic chart showing operating conditions of the fourth traveling mode indicated in FIG. 9. The nomographic chart of FIG. 13 indicating the operating conditions of the fourth traveling mode is the same as or similar to the nomographic chart of FIG. 7 indicating the operating conditions of the fourth traveling mode, and therefore, will not be described in detail.

Figure 14:
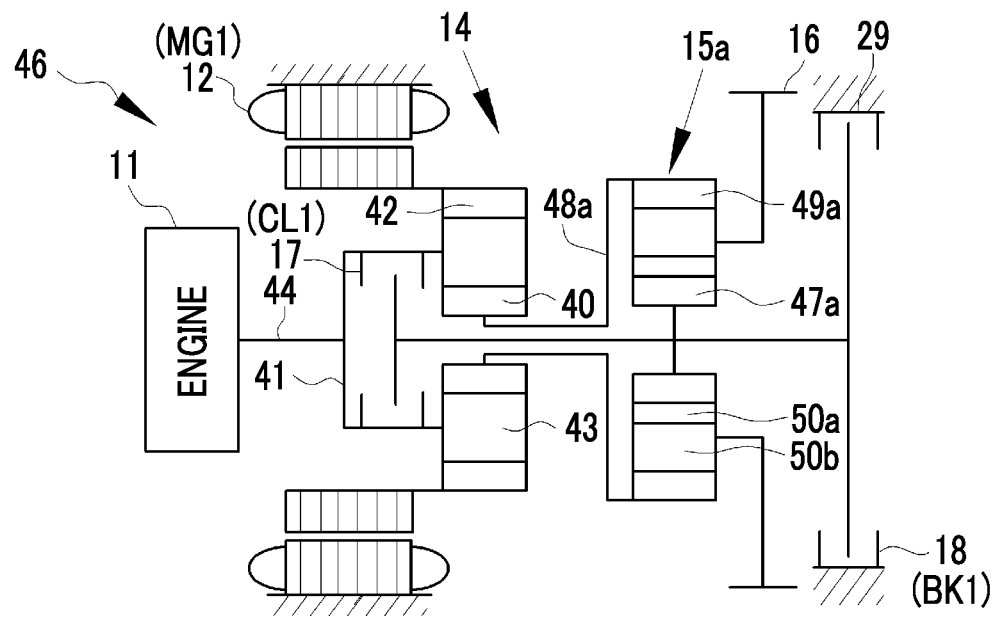
FIG. 14 is a skeleton diagram showing a drive system as a third embodiment of the present disclosure, in which a second planetary gear mechanism of the drive system of the first embodiment shown in FIG. 1 is provided by a double pinion planetary gear mechanism.

Next, a drive system of a third embodiment will be described. FIG. 14 is a skeleton diagram illustrating a drive system 46 that uses a double pinion planetary gear mechanism for the second planetary gear mechanism 15 described above with reference to FIG. 2. As shown in FIG. 14, a second planetary gear mechanism 15a of double pinion type has second pinions 50a that mesh with a second sun gear 47a, third pinions 50b that mesh with the second pinions 50a and a second ring gear 49a, and a second carrier 48a that rotates while holding the second pinions 50a and the third pinions 50b. The second planetary gear mechanism 15a consists of the second ring gear 49a as one example of the second input element 26, second carrier 48a as one example of the second output element 27, and the second sun gear 47a as one example of the second reaction-force element 28. The first carrier 41 of the first planetary gear mechanism 14 rotates while holding the first pinions 43 that mesh with the first sun gear 40 and the first ring gear 42. The first clutch mechanism 17 selectively couples the first carrier 41 as one example of the first input element 22 with the second sun gear 47a. The first brake mechanism 18 selectively fixes the second sun gear 47a to the fixed member 29. In FIG. 14, the same reference numerals are assigned to the same or similar members as those described above with reference to FIG. 2, and detailed description of these members will not be provided. Also, the traveling modes set for the drive system 46 described above with reference to FIG. 14 are the same as or similar to the first traveling mode through the fourth traveling mode as described above with reference to FIG. 3; therefore, these traveling modes will not be described in detail.

Figure 15:
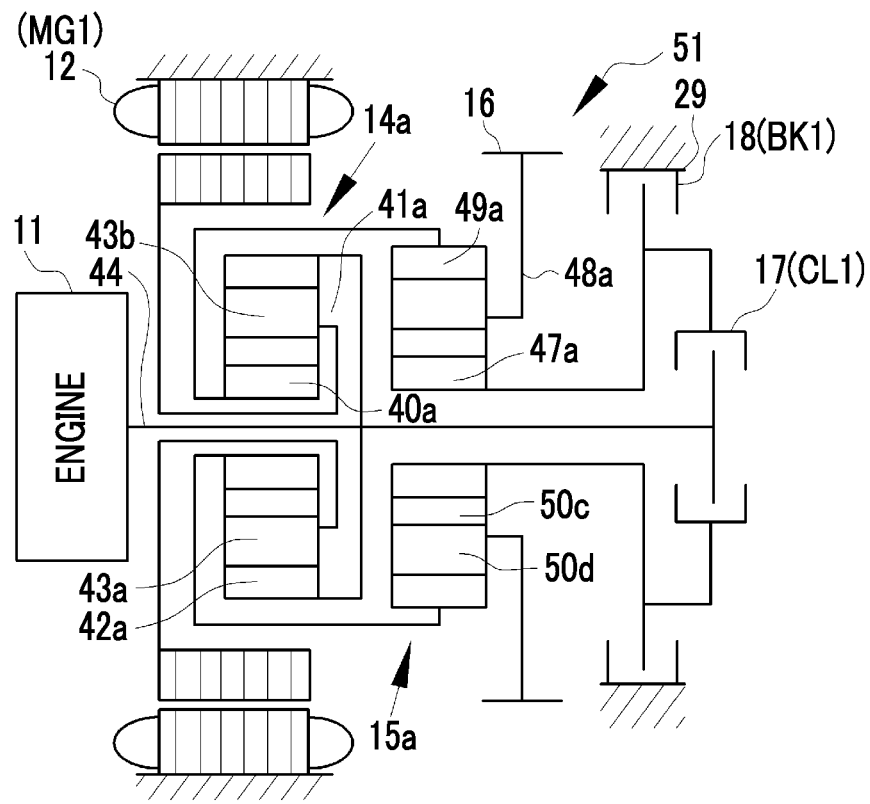
FIG. 15 is a skeleton diagram showing a drive system as a fourth embodiment of the present disclosure, in which the first planetary gear mechanism and second planetary gear mechanism of the drive system of the first embodiment shown in FIG. 1 are respectively provided by double pinion planetary gear mechanisms.

Next, a drive system of a fourth embodiment will be described. FIG. 15 is a skeleton diagram illustrating a drive system 51 that uses double pinion planetary gear mechanisms for the first planetary gear mechanism 14 and the second planetary gear mechanism 15 described above with reference to FIG. 2. As shown in FIG. 15, a first planetary gear mechanism 14a of double pinion type consists of a first ring gear 42a as one example of the first input element 22, first carrier 41a as one example of the first reaction-force element 23, and a first sun gear 40a as one example of the first output element 24. The first carrier 41a of the first planetary gear mechanism 14 rotates while holding first pinions 43a that mesh with the first sun gear 40a, and second pinions 43b that mesh with the first pinions 43a and the first ring gear 42a. A second planetary gear mechanism 15a of double pinion type consists of a second ring gear 49a as one example of the second input element 26, second carrier 48a as one example of the second output element 27, and a second sun gear 47a as one example of the second reaction-force element 28. The second carrier 48a of the second planetary gear mechanism 15 rotates while holding third pinions 50c that mesh with the second sun gear 47a, and fourth pinions 50d that mesh with the third pinions 50c and the second ring gear 49a. The first clutch mechanism 17 selectively couples the first ring gear 42a with the second sun gear 47a. The first brake mechanism 18 selectively fixes the second sun gear 47a to the fixed member 29. In FIG. 15, the same reference numerals are assigned to the same or similar members as those described above with reference to FIG. 2, FIG. 8 and FIG. 14, and detailed description of these members will not be provided. The traveling modes set for the drive system 51 as described above with reference to FIG. 15 are the same as or similar to the first traveling mode through the fourth traveling mode as described above with reference to FIG. 3 and FIG. 9; therefore, detailed description of these traveling modes will not be provided.

With regard to the drive system 34 shown in FIG. 2, the second reaction-force element 28 and the second output element 27, which constitute the second planetary gear mechanism 15, may be switched with each other.

Figure 16:
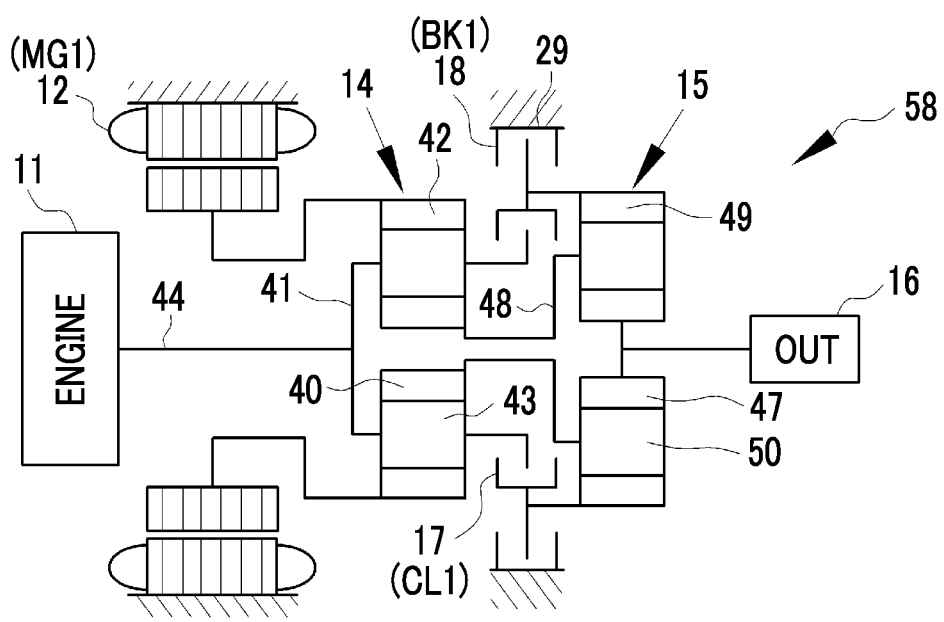
FIG. 16 is a skeleton diagram showing a drive system according to a fifth embodiment of the present disclosure.

Next, a drive system of a fifth embodiment will be described. FIG. 16 is a skeleton diagram illustrating one example of drive system 58 in which the second reaction-force element 28 shown in FIG. 1 is switched or replaced with the second output element 27. In the drive system 10 shown in FIG. 2, for example, the second sun gear 47 is one example of the second reaction-force element 28, and the second ring gear 49 is one example of the second output element 27. On the other hand, in the drive system 58 shown in FIG. 16, the second ring gear 49 is one example of the second reaction-force element 28, and the second sun gear 47 is one example of the second output element 27. In the case of the drive system 58 shown in FIG. 16, the first clutch mechanism 17 selectively engages the first carrier 41 as one example of the first input element 22 with the second ring gear 49 as one example of the second reaction-force element 28. The first brake mechanism 18 selectively fixes the second ring gear 49 to the fixed member 29. The second planetary gear mechanism 15 is not limited to the single pinion planetary gear mechanism, but may be provided by a double pinion planetary gear mechanism. The traveling modes set for the drive system 58 described with reference to FIG. 16 are the same as or similar to the first traveling mode through the fourth traveling mode shown in FIG. 3; therefore, detailed description of these traveling modes will not be provided.

Figure 17:
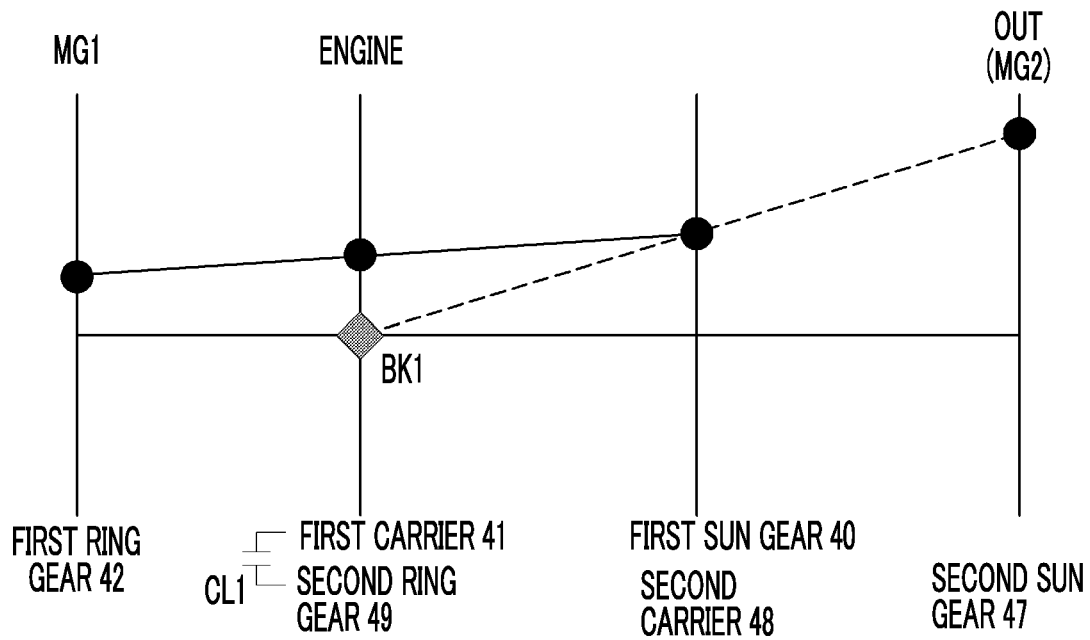
FIG. 17 is a nomographic chart showing operating conditions of a second traveling mode set for the drive system shown in FIG. 16.

FIG. 17 is a nomographic chart showing operating conditions of the drive system 58 shown in FIG. 16 when it is placed in the second traveling mode. As shown in FIG. 17, the second traveling mode is set by engaging the first brake mechanism 18. The operating conditions of the second traveling mode shown in FIG. 17 are the same as or similar to the operating conditions of the second traveling mode as described above with reference to FIG. 5, and therefore, will not be described in detail.

Figure 18:
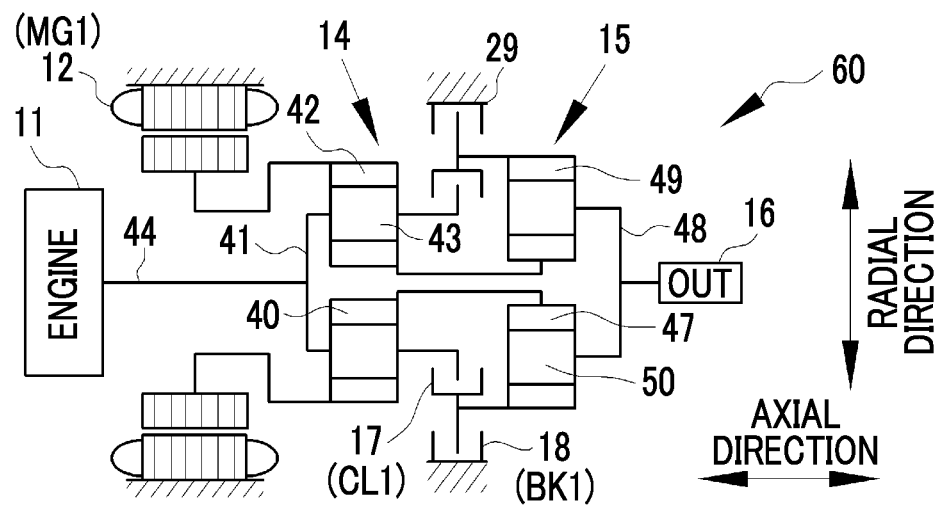
FIG. 18 is a skeleton diagram showing a drive system of a sixth embodiment of the present disclosure, as another example of the drive system of the first embodiment shown in FIG. 1.

Next, a drive system of a sixth embodiment will be described. FIG. 18 is a skeleton diagram that specifically illustrates one example of the drive system 10 as described above with reference to FIG. 1. A drive system 60 shown in FIG. 18 is provided by changing a coupling condition of the first planetary gear mechanism 14 and the second planetary gear mechanism 15 in the drive system 34 shown in FIG. 2, and the arrangement of the first clutch mechanism (CL1) 17 and the first brake mechanism (BK1) 18. In FIG. 18, the same reference numerals are assigned to the same or similar members as those described above with reference to FIG. 2.

As shown in FIG. 18, the first planetary gear mechanism 14 includes the sun gear 40 as one example of the first output element 24, first carrier 41 as one example of the first input element 22, and the first ring gear 42 as one example of the first reaction-force element 23. The second planetary gear mechanism 15 includes the second sun gear 47 as one example of the second input element 26, second carrier 48 as one example of the second output element 27, and the second ring gear 49 as one example of the second reaction-force element 28.

The first clutch mechanism 17 is disposed between the first carrier 41 and the second ring gear 49, and is arranged to selectively couple the first carrier 41 with the second ring gear 49. The first brake mechanism 18 is disposed between the second ring gear 49 and the fixed member 29, and is arranged to selectively fix the second ring gear 49 to the fixed member 29. The first sun gear 40 is coupled to the second sun gear 47. The output gear (OUT) 16 is coupled to the second carrier 48. Also, the first clutch mechanism 17 and the first brake mechanism 18 are disposed between the first planetary gear mechanism 14 and the second planetary gear mechanism 15, such that the first clutch mechanism 17 and the first brake mechanism 18 are arranged in alignment on the radially inner side and the radially outer side. Thus, the axial length of the drive system 60 as a whole as measured in the axial direction can be shortened.

FIG. 19 indicates traveling modes that can be set for the drive system 60 shown in FIG. 18. As shown in FIG. 19, it is possible to place the drive system 60 in any one of first traveling mode through fourth traveling mode, by changing the engagement states of the first clutch mechanism (CL1) 17 and the first brake mechanism (BK1) 18. The first traveling mode and the second traveling mode are examples of hybrid traveling modes in which the vehicle travels with driving force produced by the engine 11.

When the drive system 60 is placed in the first traveling mode, the first carrier 41 and the second ring gear 49 are coupled via the first clutch mechanism 17, so that the first planetary gear mechanism 14 and the second planetary gear mechanism 15 form a composite planetary gear mechanism. In the first traveling mode, the first carrier 41 and the second ring gear 49 are coupled, so that the output shaft 44 of the engine 11 is coupled to the first carrier 41 and the second ring gear 49. Accordingly, in the first planetary gear mechanism 14, the first motor 12 functions as a generator, and applies negative torque to the first ring gear 42, so that the first sun gear 40 rotates in the positive direction. Namely, the output torque of the engine 11 is split, and a part of the output torque is provided to the first motor 12. In the second planetary gear mechanism 15, the second sun gear 47 rotates in the same direction as the first sun gear 40 of the first planetary gear mechanism 14, in a condition where the second ring gear 49 rotates along with the output shaft 44 of the engine 11, so that the second carrier 48 rotates at a rotational speed that depends on the rotational speeds of the second ring gear 49 and the second sun gear 47 and the gear ratio (the ratio of the number of teeth of the second ring gear 49 and that of the second sun gear 47) of the second planetary gear mechanism 15. Namely, another part of the output torque of the engine 11 is transmitted to the second carrier 48. The second motor 13 is driven as a motor, using electric power generated by the first motor 12, for example.

The second traveling mode is set by engaging first brake mechanism 18 so as to fix the second ring gear 49 to the fixed member 29. Accordingly, the first planetary gear mechanism 14 and the second planetary gear mechanism 15 function independently of each other, since only the first sun gear 40 and the second sun gear 47 are coupled to each other.

When the second traveling mode is set, the output torque of the engine 11 is split to the first motor 12 side and the first sun gear 40 side in the first planetary gear mechanism 14. In this case, the first motor 12 functions as a generator. The torque is then transmitted from the first sun gear 40 to the second sun gear 47 of the second planetary gear mechanism 15. Since the second ring gear 49 is fixed by the first brake mechanism 18, and the output torque of the engine 11 is applied to the second sun gear 47, the second planetary gear mechanism 15 functions as a speed reducer. As a result, the second carrier 48 rotates at a lower rotational speed than that of the second sun gear 47. The second motor 13 is driven as a motor, using electric power generated by the first motor 12, for example.

The third traveling mode and the fourth traveling mode are examples of EV traveling modes in which the vehicle travels as an electric vehicle while stopping operation of the engine 11. The third traveling mode is set by releasing the first clutch mechanism 17 and the first brake mechanism 18, respectively.

If the third traveling mode is set, operation of the engine 11 is stopped. When the third traveling mode is set, the first carrier 41 and the second ring gear 49 idle, in the same or similar manner as the operating conditions of the third traveling mode of the drive system 34 shown in FIG. 3. Therefore, the first planetary gear mechanism 14 and the second planetary gear mechanism 15 do not function to transmit torque. Thus, when the third traveling mode is set, the ECU 21 controls the first motor 12 so that it does not function as a motor that produces torque, and controls the second motor 13 so that it functions as a motor.

The fourth traveling mode is set by stopping operation of the engine 11, and engaging the first clutch mechanism 17 and the first brake mechanism 18. In the fourth traveling mode, the vehicle travels with driving force delivered from both the first motor 12 and the second motor 13. When the fourth traveling mode is set, operation of the engine 11 is stopped, and the output shaft 44 is inhibited from rotating by the first brake mechanism 18.

When the fourth traveling mode is set, the driving force produced by the first motor 12 is applied to the first ring gear 42, transmitted as reaction force of the first pinions 43 to the first sun gear 40 sine the first carrier 41 is fixed, and then transmitted from the first sun gear 40 to the second sun gear 47. Since the second ring gear 49 is fixed, the driving force transmitted to the second sun gear 47 is transmitted as reaction force of the second pinions 50 to the second carrier 48, and transmitted from the second carrier 48 to the drive wheels 37 via the output gear 16 and the driven gear 53. In the meantime, the driving force produced by the second motor 13 is transmitted to the drive wheels 37 via the driven gear 53. As a result, the drive wheels 37 are driven with driving force corresponding to the driving force produced by the first motor 12 and the driving force produced by the second motor 13.

Figure 20:
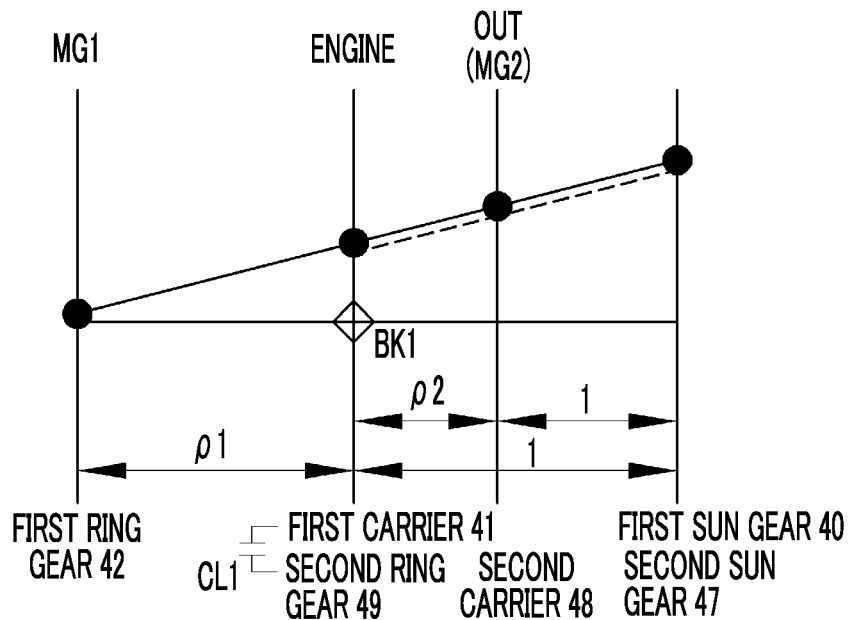
FIG. 20 is a nomographic chart showing operating conditions of a first traveling mode indicated in FIG. 19.

FIG. 20 is a nomographic chart showing operating conditions of the first traveling mode indicated in FIG. 19. In the composite planetary gear mechanism of the first traveling mode, the first carrier 41 and second ring gear 49 coupled by the first clutch mechanism 17 form an input element.

In the first traveling mode, the first clutch mechanism 17 is engaged so as to couple the first carrier 41 with the second ring gear 49, so that the first planetary gear mechanism 14 and the second planetary gear mechanism 15 form the composite planetary gear mechanism. The first carrier 41 and the second ring gear 49 coupled to each other function as the input element of the composite planetary gear mechanism. In the first planetary gear mechanism 14, the output torque of the engine 11 is received by the first carrier 41, and negative torque produced by the first motor 12 is applied to the first ring gear 42. Accordingly, the first sun gear 40 receives positive torque and rotates, and the torque is transmitted to the second sun gear 47. In the second planetary gear mechanism 15, the second ring gear 49 is coupled to the engine 11 via the first clutch mechanism 17 and rotates along with the engine 11, and the second sun gear 47 rotates in the positive direction with the torque transmitted from the first sun gear 40, so that the second carrier 48 rotates in the positive direction. Namely, when the drive system 60 is placed in the first traveling mode, a part of the output torque of the engine 11 is distributed to the first motor 12, and another part of the output torque is distributed to the second carrier 48, in the same or similar manner as the operating conditions of the first traveling mode as described above with reference to FIG. 4. Namely, the power split ratio of the power delivered to the first ring gear 42 side is "ρ2/(ρ1+(ρ1×ρ2))" where the split ratio of the power to the output gear 16 side is "1".

Figure 21:
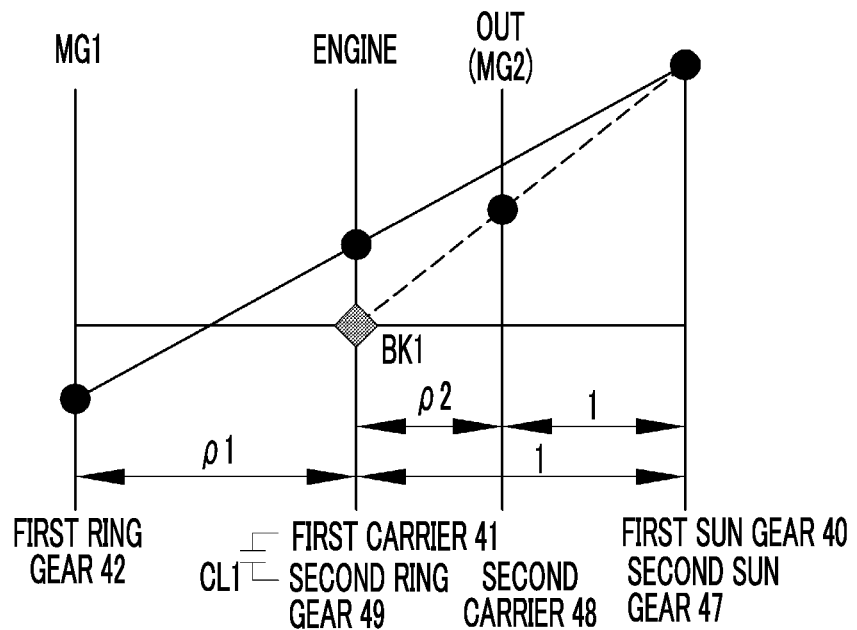
FIG. 21 is a nomographic chart showing operating conditions of a second traveling mode indicated in FIG. 19.

FIG. 21 is a nomographic chart showing operating conditions of the second traveling mode indicated in FIG. 19. As shown in FIG. 21, in the second traveling mode, the first clutch mechanism 17 is released, so that only the first sun gear 40 and the second sun gear 47 are coupled to each other, and rotation of the second ring gear 49 is inhibited by the first brake mechanism 18; therefore, the first planetary gear mechanism 14 and the second planetary gear mechanism 15 function independently of each other. Namely, in the first planetary gear mechanism 14, the output torque of the engine 11 is transmitted to the first carrier 41 so that the first carrier 41 rotates in the positive direction, and negative torque produced by the first motor 12 that functions as a generator is applied to the first ring gear 42, so that the first sun gear 40 rotates in the positive direction, in the same or similar manner as the operating conditions of the first traveling mode as described above with reference to FIG. 20. Thus, when the drive system 60 is placed in the second traveling mode, the output torque of the engine 11 is split to the first motor 12 side and the first sun gear 40 side by the first planetary gear mechanism 14. In the second planetary gear mechanism 15, rotation of the second ring gear 49 is inhibited by the first brake mechanism 18, so that the positive torque delivered from the first sun gear 40 is transmitted to the second sun gear 47. Therefore, the second planetary gear mechanism 15 functions as a speed reducer, and the second carrier 48 and the output gear 16 integral with the second carrier 48 rotate at a lower rotational speed than that of the second sun gear 47. In this case, the torque of the second carrier 48 or the output gear 16 is larger than that in the case of the first traveling mode as described above with reference to FIG. 20. In this case, the power split ratio of the power delivered to the first motor 12 side is "1/ρ1" where the split ratio of the power to the first sun gear 40 is "1". Since the power split ratio for the first motor 12 is larger than the power split ratio in the first traveling mode as described above with reference to FIG. 20, "SPLIT RATIO LARGE (Hi)" is written in the column of the power splitting part of the second traveling mode shown in FIG. 19. Also, since the second carrier 48 as one example of the second output element 27 is rotated at a lower rotational speed than the second sun gear 47 as one example of the second input element 26, the second planetary gear mechanism 15 that provides the directly receiving part functions as a speed-reducing transmission.

In the meantime, when the output torque of the second motor 13 is close to zero, the rotor 39 of the second motor 13 is brought into a floating condition. In this case, if the driving force produced by the engine 11 is transmitted to the rotor 39 side, rattle of gears provided in a power transmission system including the rotor 39 may be produced. Even in this case, when the second traveling mode is set, the second sun gear 47 as one example of the second input element 26 rotates at a higher rotational speed than the first carrier 41 and the second ring gear 49. As a result, the inertial mass changes to the higher inertia side, and the inertia can be increased without increasing the rotational speed of the engine 11. Therefore, the gear rattle as described above can be reduced or prevented, and, consequently, NV (Noise and Vibration) performance can be enhanced.

Figure 22:
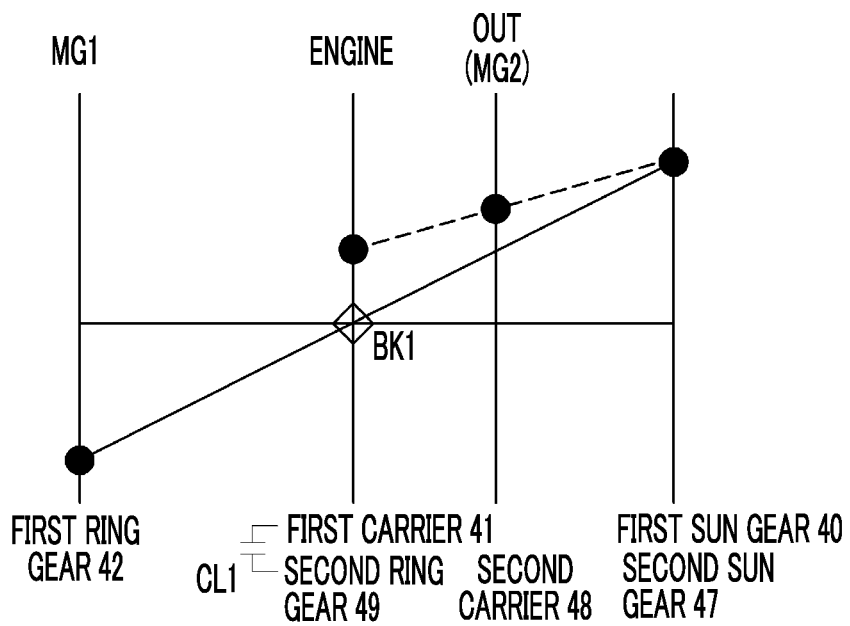
FIG. 22 is a nomographic chart showing operating conditions of a third traveling mode indicated in FIG. 19.

FIG. 22 is a nomographic chart showing operating conditions of the third traveling mode indicated in FIG. 19. As shown in FIG. 22, in the third traveling mode, operation of the engine 11 is stopped, and the vehicle travels only with the driving force of the second motor 13. The driving force produced by the second motor 13 causes the output gear 16 that meshes with the driven gear 53 and the second carrier 48 integral with the output gear 16 to rotate in the positive direction. The second sun gear 47 of the second planetary gear mechanism 15 receives resisting force produced due to stop of the engine 11, and the first clutch mechanism 17 is released, so that the second ring gear 49 rotates in the positive direction. Namely, since the second ring gear 49 idles, no torque is transmitted via the second planetary gear mechanism 15. Also, in the first planetary gear mechanism 14, the first carrier 41 coupled to the output shaft 44 of the engine 11 that is stopped from operating receives resisting force, and the first sun gear 40 rotates in the positive direction along with the second sun gear 47; therefore, the first ring gear 42 and the first motor 12 coupled to the first ring gear 42 rotate in the negative direction. The rotation of the first motor 12 is merely idling, and produces no electric power nor drive torque, in the same or similar manner as operation of the third traveling mode as described above with reference to FIG. 6.

Figure 23:
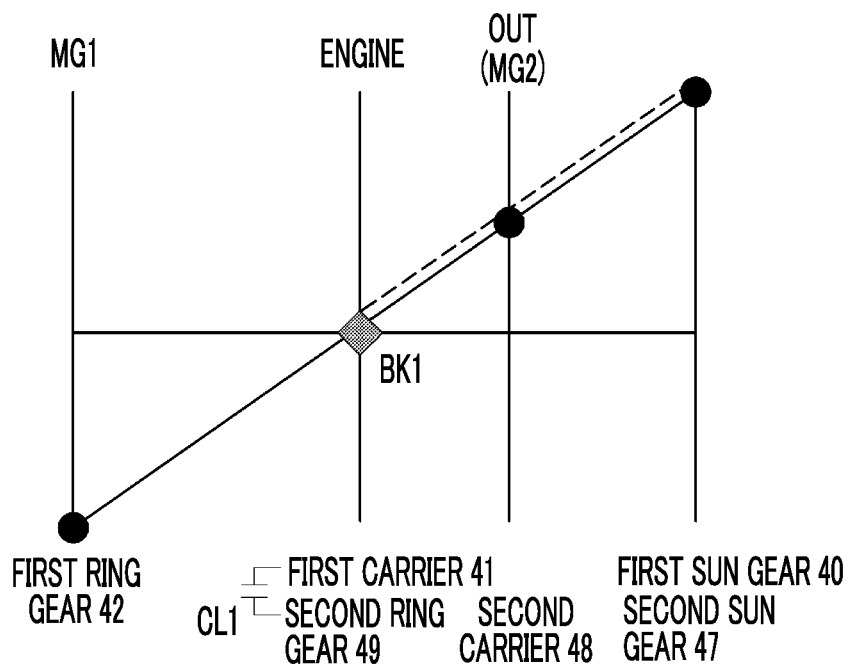
FIG. 23 is a nomographic chart showing operating conditions of a fourth traveling mode indicated in FIG. 19.

FIG. 23 is a nomographic chart showing operating conditions of the fourth traveling mode indicated in FIG. 19. As shown in FIG. 23, in the fourth traveling mode, which is a both-motor drive mode, operation of the engine 11 is stopped, and the first motor 12 is rotated as a motor in the negative direction. When the fourth traveling mode is set, the first clutch mechanism 17 is engaged, and the first brake mechanism 18 is engaged, so that the first carrier 41 and the second ring gear 49 are fixed. The driving force produced by the first motor 12 is transmitted to the second carrier 48 via the first sun gear 40 (the second sun gear 47), and delivered. The torque produced by the first motor 12 acts to rotate the second carrier 48 in the positive direction (the direction of rotation of the engine 11). Accordingly, in the fourth traveling mode, the driving force delivered from the second motor 13 is added to the driving force delivered from the second carrier 48 at the driven gear 53, and the resulting driving force is transmitted to the drive wheels 37. The second sun gear 47 and the first sun gear 40 are rotated at a higher rotational speed than the output shaft 44 of the engine 11 and the second carrier 48.

Figures 24, 25:
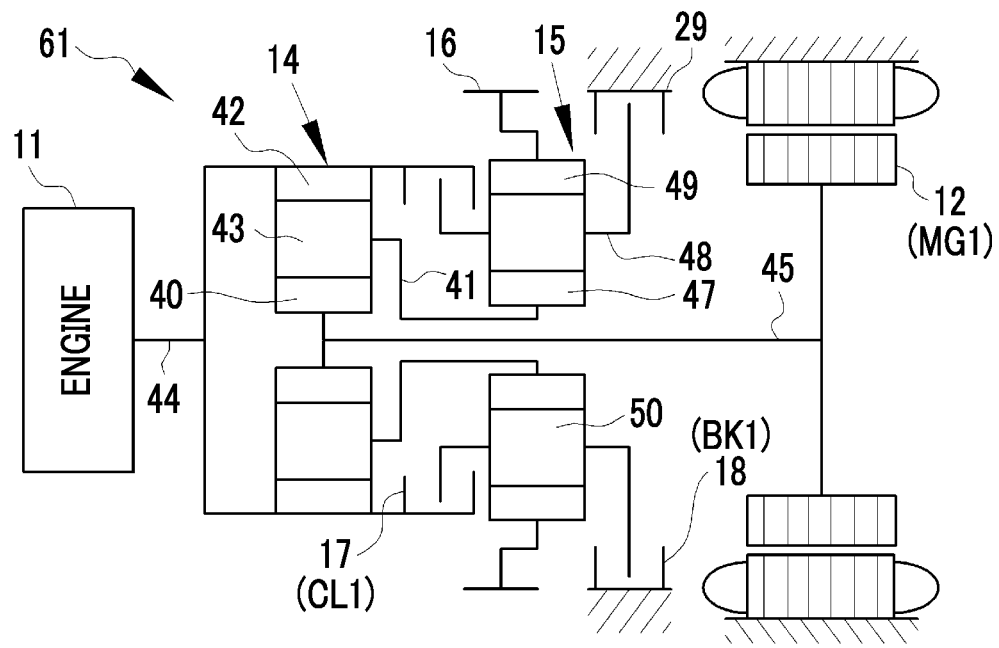
FIG. 24 is a drive system of a seventh embodiment of the present disclosure, as another example of the drive system of the first embodiment shown in FIG. 1.
FIG. 25 is a view showing traveling modes that can be set for the drive system shown in FIG. 24.

Next, a drive system of a seventh embodiment will be described. FIG. 24 is a skeleton diagram specifically illustrating one example of the drive system 10 described above with reference to FIG. 1. A drive system 61 shown in FIG. 24 is provided by changing a coupling condition of the first planetary gear mechanism 14 and the second planetary gear mechanism 15 in the first embodiment shown in FIG. 2, and the arrangement of the first clutch mechanism 17 and the first brake mechanism 18. In FIG. 24, the same reference numerals are assigned to the same or similar members as those described above with reference to FIG. 2.

As shown in FIG. 24, the first clutch mechanism 17 is disposed between the first ring gear 42 and the second carrier 48, and is arranged to selectively couple the first ring gear 42 as the first input element 22 with the second carrier 48. The first brake mechanism 18 is disposed between the second carrier 48 and the fixed member 29, and is arranged to selectively fix the second carrier 48 to the fixed member 29. The first carrier 41 as one example of the first output element 24 is coupled to the second sun gear 47. Accordingly, in the second planetary gear mechanism 15, the second sun gear 47 is one example of the second input element 26. The output gear 16 is coupled to the second ring gear 49 of the second planetary gear mechanism 15, and the second ring gear 49 is one example of the second output element 27. Further, the second carrier 48 of the second planetary gear mechanism 15 is one example of the second reaction-force element 28. In the drive system 61, the first clutch mechanism 17 is disposed between the first planetary gear mechanism 14 and the second planetary gear mechanism 15, and the first brake mechanism 18 is disposed between the second planetary gear mechanism 15 and the first motor 12.

FIG. 25 indicates traveling modes that can be set for the drive system 61 shown in FIG. 24. As shown in FIG. 25, it is possible to place the drive system 61 in any one of the first traveling mode through the fourth traveling mode, by changing the engagement states of the first clutch mechanism (CL1) 17 and the first brake mechanism (BK1) 18. The first traveling mode and the second traveling mode are examples of hybrid traveling modes in which the vehicle travels with driving force produced by the engine 11. The first traveling mode is set by engaging the first clutch mechanism 17. In this case, the split ratio of the power to the first motor 12 side is larger than that in the case of the second traveling mode. The second traveling mode is set by engaging the first brake mechanism 18. In this case, the split ratio of the power to the first motor 12 side is smaller than that in the case of the first traveling mode, and the second planetary gear mechanism 15 functions as a reversing (reverse rotation) mechanism. The third traveling mode and the fourth traveling mode are examples of EV modes in which operation of the engine 11 is stopped, and the vehicle travels as an electric vehicle. The third traveling mode is set by releasing the first brake mechanism 18 and the first clutch mechanism 17, and the vehicle travels using the driving force of the second motor 13. The fourth traveling mode is set by engaging the first brake mechanism 18 and engaging the first clutch mechanism 17. In the fourth traveling mode, the vehicle travels, using the driving force of both of the first motor 12 and the second motor 13.

Figure 26:
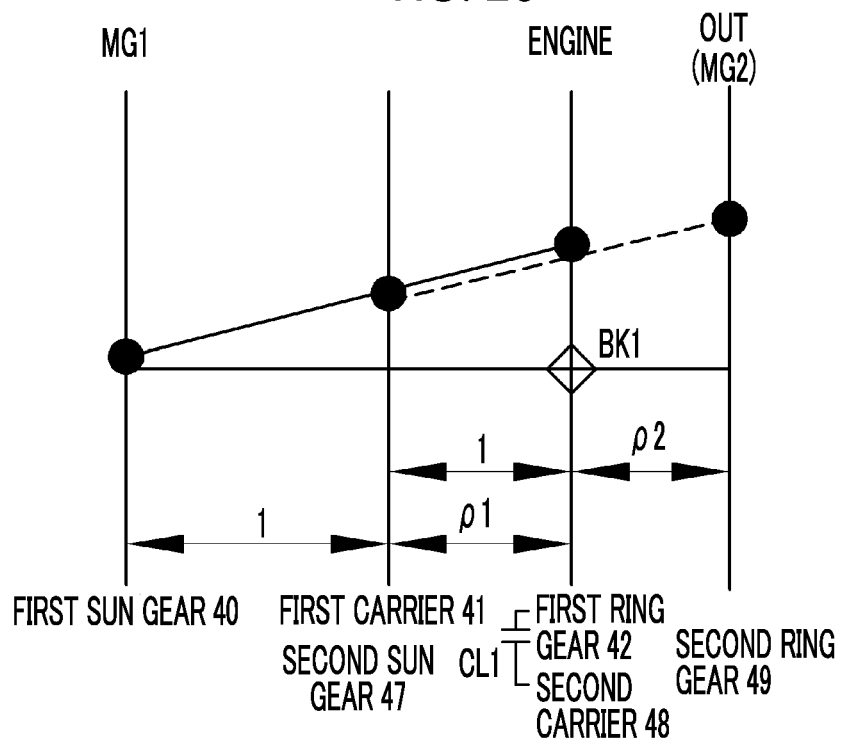
FIG. 26 is a nomographic chart showing operating conditions of a first traveling mode indicated in FIG. 25.

FIG. 26 is a nomographic chart showing operating conditions of the first traveling mode indicated in FIG. 25. As shown in FIG. 26, in the first traveling mode, the first clutch mechanism 17 is engaged, so that the first ring gear 42 and the second carrier 48 are coupled to each other; therefore, the first planetary gear mechanism 14 and the second planetary gear mechanism 15 form a composite planetary gear mechanism. Then, the first ring gear 42 and the second carrier 48 that are coupled to each other function as an input element of the composite planetary gear mechanism. In the first planetary gear mechanism 14, the output torque of the engine 11 is received by the first ring gear 42, and negative torque produced by the first motor 12 is applied to the first sun gear 40. Accordingly, the first carrier 41 receives positive torque and rotates, and the torque is transmitted to the second sun gear 47 of the second planetary gear mechanism 15. In the second planetary gear mechanism 15, the second carrier 48 is coupled to the output shaft 44 via the first clutch mechanism 17, and rotates along with the engine 11, and the second sun gear 47 rotates in the positive direction with the torque transmitted from the first carrier 41, so that the second ring gear 49 rotates in the positive direction. Namely, a part of the output torque of the engine 11 is distributed to the first motor 12 in the first planetary gear mechanism 14, and another part of the output torque is distributed to the second ring gear 49 of the second planetary gear mechanism 15, and delivered from the output gear 16. Namely, the split ratio of the power to the first sun gear 40 side is "$(\rho 1 \times \rho 2)/(1+\rho 1)$" where the split ratio for the output gear 16 side is "1". When the first traveling mode, which is a hybrid traveling mode, is set, the second motor 13 is driven as a motor, using electric power generated by the first motor 12, for example.

Figure 27:
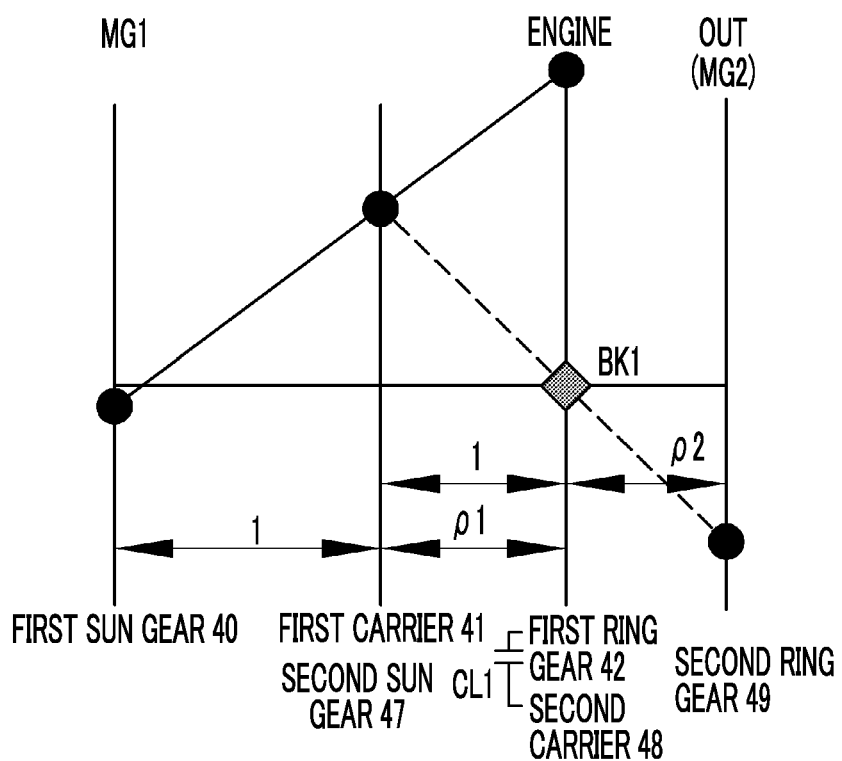
FIG. 27 is a nomographic chart showing operating conditions of a second traveling mode indicated in FIG. 25.

FIG. 27 is a nomographic chart showing operating conditions of the second traveling mode indicated in FIG. 25. As shown in FIG. 27, the second traveling mode is set by releasing the first clutch mechanism 17. In the first planetary gear mechanism 14 and the second planetary gear mechanism 15, only the first carrier 41 and the second sun gear 47 are coupled to each other, and rotation of the second carrier 48 is inhibited by the first brake mechanism 18. Therefore, the first planetary gear mechanism 14 and the second planetary gear mechanism 15 function independently of each other. Namely, in the first planetary gear mechanism 14, the output torque of the engine 11 is transmitted to the first ring gear 42, so that the first ring gear 42 rotates in the positive direction, and positive torque produced by the first motor 12 that functions as a generator is applied to the first sun gear 40, so that the first carrier 41 rotates in the positive direction. Thus, the output torque of the engine 11 is split to the first motor 12 side and the first carrier 41 side by the first planetary gear mechanism 14. In the second planetary gear mechanism 15, positive torque is transmitted from the first carrier 41 to the second sun gear 47, in a condition where the second carrier 48 is fixed by the first brake mechanism 18. Therefore, the second planetary gear mechanism 15 functions as a reversing (reverse rotation) mechanism, and the second ring gear 49 and the output gear 16 integral with the second ring gear 49 rotate in the negative direction. The torque of the second ring gear 49 assumes a higher absolute value of torque, as compared with that in the case of the first traveling mode indicated in FIG. 25 where the torque of the engine 11 is equal. In this case, the split ratio of the power to the output gear 16 side is "$-\rho 1/(1+\rho 1)$", where the split ratio of the power to the first carrier 41 side is "1".

In the meantime, the second motor 13 is driven as a motor, using electric power generated by the first motor 12, for example. In this case, the second motor 13 is driven in a rotational direction corresponding to reverse traveling. With the drive system 61 thus constructed, it is possible, by engaging the first brake mechanism 18, to set a reverse traveling mode in which the vehicle travels backward, using driving force produced by the engine 11, and driving force produced by the second motor 13 that is driven as a motor using electric power generated by the first motor 12.

Figure 28:
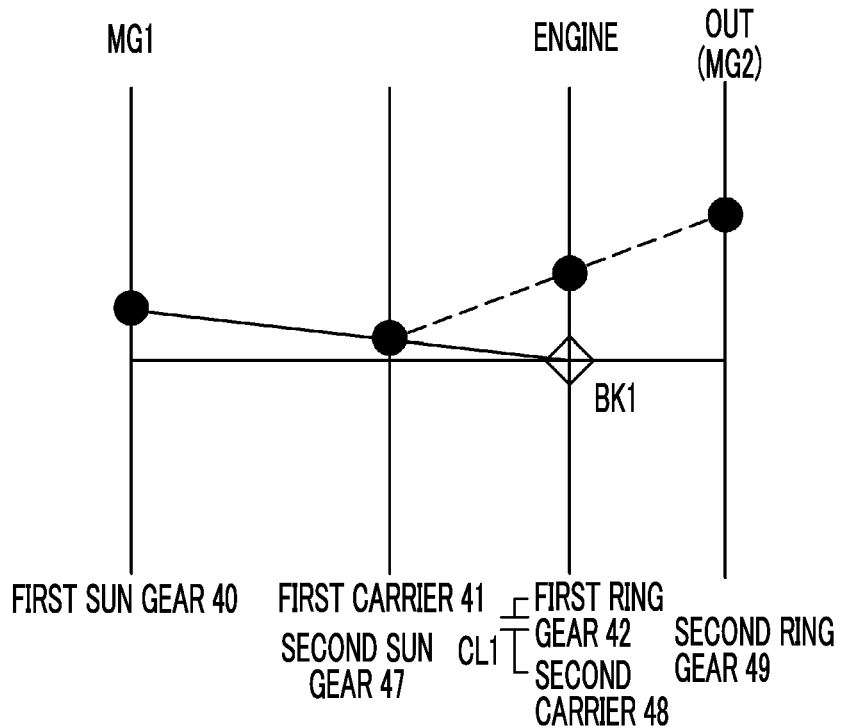
FIG. 28 is a nomographic chart showing operating conditions of a third traveling mode indicated in FIG. 25.

FIG. 28 is a nomographic chart showing operating conditions of the third traveling mode indicated in FIG. 25. As shown in FIG. 28, the third traveling mode is set by releasing the first clutch mechanism 17 and the first brake mechanism 18. When the third traveling mode is set, operation of the engine 11 is stopped. Accordingly, in the third traveling mode, the first ring gear 42 of the first planetary gear mechanism 14 and the second carrier 48 of the second planetary gear mechanism 15 idle, so that the first planetary gear mechanism 14 and the second planetary gear mechanism 15 do not function to transmit torque. Therefore, when the third traveling mode is set, the ECU 21 controls the first motor 12 so that it does not function as a motor that produces torque, and controls the second motor 13 so that it functions as a motor.

More specifically, the driving force produced by the second motor 13 is transmitted from the second drive gear 56 to the drive wheels 37 via the driven gear 53. Meanwhile, the output gear 16 that meshes with the driven gear 53 and the second ring gear 49 integral with the output gear 16 rotate in the positive direction. Since resisting force produced by the stopping engine 11 is applied to the second sun gear 47 of the second planetary gear mechanism 15, and the first clutch mechanism 17 is released, the second carrier 48 rotates in the positive direction. Namely, the second carrier 48 idles, and the second planetary gear mechanism 15 transmits no torque. Also, in the first planetary gear mechanism 14, the first ring gear 42 is coupled to the stopping engine 11 and receives resisting force from the engine 11; therefore, the first carrier 41 and the second sun gear 47 both rotate in the positive direction, so that the first sun gear 40 and the first motor 12 coupled to the sun gear 40 rotate in the positive direction. In this case, the first motor 12 merely idles, and does not generate electric power nor generate drive torque.

Figure 29:
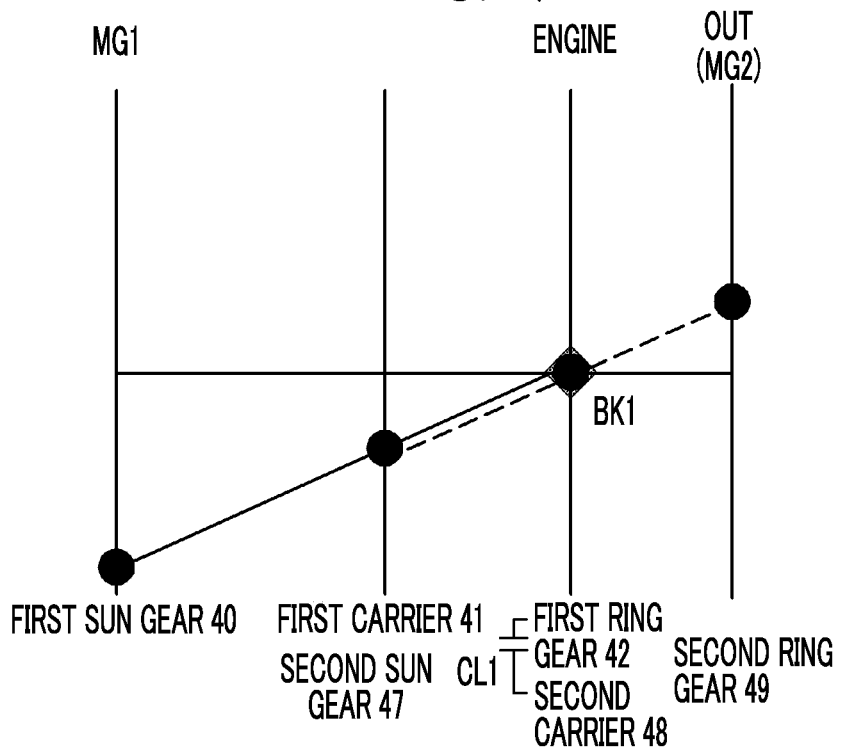
FIG. 29 is a nomographic chart showing operating conditions of a fourth traveling mode indicated in FIG. 25.

FIG. 29 is a nomographic chart showing operating conditions of the fourth traveling mode indicated in FIG. 25. As shown in FIG. 29, in the fourth traveling mode that is set by engaging the first clutch mechanism 17 and the first brake mechanism 18, the vehicle travels using driving force produced by both the first motor 12 and the second motor 13. When the fourth traveling mode is set, operation of the engine 11 is stopped, and rotation of the output shaft 44 is stopped by the first brake mechanism 18. More specifically, the driving force produced by the first motor 12 is received by the first sun gear 40, and transmitted to the second ring gear 49 via the first carrier 41 and the second sun gear 47. The torque generated by the first motor 12 acts to rotate the second ring gear 49 in the positive direction. Accordingly, when the fourth traveling mode is set, the vehicle travels using driving force corresponding to the driving force delivered from the second ring gear 49 and the driving force produced by the second motor 13. The structure and functions peculiar to the seventh embodiment as described above with reference to FIG. 24 through FIG. 29, for example, the structure and functions to set the second traveling mode for reverse traveling, may also be applied to other embodiments.

Figure 30:
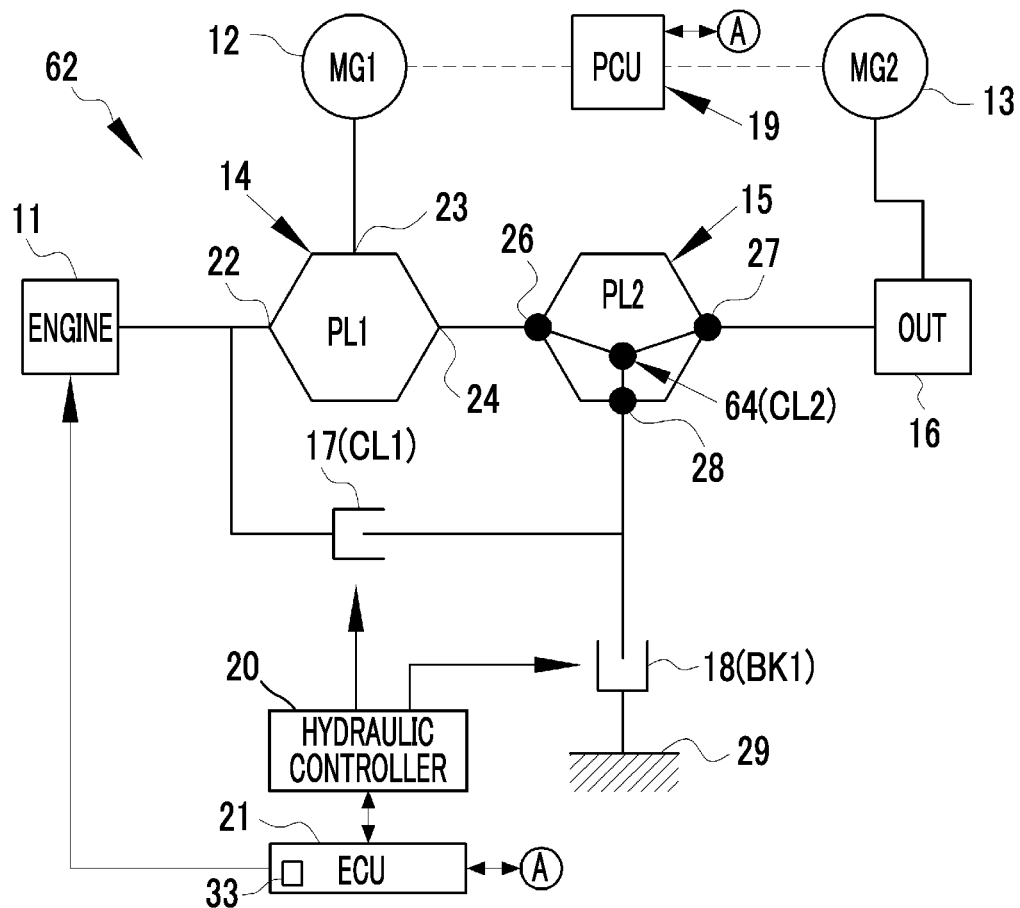
FIG. 30 is a block diagram showing a drive system according to an eighth embodiment of the present disclosure.

Next, a drive system of an eighth embodiment of the present disclosure will be described. FIG. 30 is a block diagram schematically illustrating the drive system 62 of the eighth embodiment. In the drive system 62 as shown in FIG. 30, the second planetary gear mechanism 15 includes a second clutch mechanism 64, as compared with the drive system 10 shown in FIG. 1. The second clutch mechanism 64 selectively couples the second reaction-force element 28 with the second output element 27. In FIG. 30, the same reference numerals are assigned to the same or similar members as those described above with reference to FIG. 1, and detailed description of these members will not be provided. The hydraulic controller 20 of the eighth embodiment shown in FIG. 30 individually controls supply of hydraulic pressures to the first clutch mechanism 17, first brake mechanism 18, and the second clutch mechanism 64, in response to command values generated from the ECU 21. The PCU 19, hydraulic controller 20, ECU 21, engine-ECU 33, etc. are examples of controllers.

Figure 31:
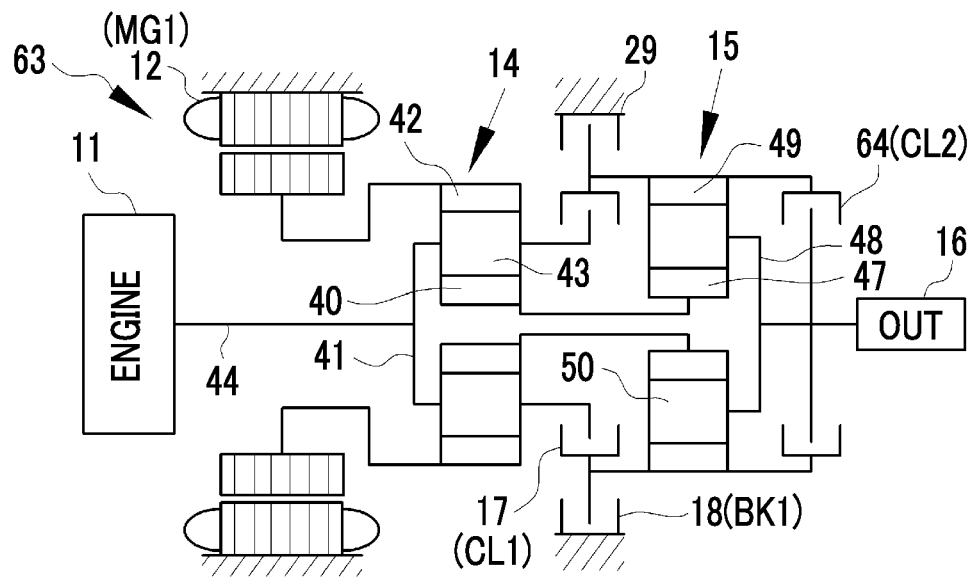
FIG. 31 is a skeleton diagram showing one example of the drive system shown in FIG. 30.

FIG. 31 is a skeleton diagram specifically illustrating one example of the drive system 62 described with reference to FIG. 30. A drive system 63 shown in FIG. 31 is an example provided by changing a coupling condition of the first planetary gear mechanism 14 and the second planetary gear mechanism 15 in the drive system 34 shown in FIG. 2, and the arrangement of the first clutch mechanism 17 and the first brake mechanism 18, and further adding the second clutch mechanism (CL2) 64 to the system. In FIG. 31, the same reference numerals are assigned to the same or similar members as those described above with reference to FIG. 2, and detailed description of these members will not be provided.

For example, as shown in FIG. 31, the driving force produced by the engine 11 is transmitted to the first carrier 41. The first clutch mechanism 17 is disposed between the first carrier 41 and the second ring gear 49, and selectively couples the first carrier 41 as one example of the first input element 22 with the second ring gear 49 as one example of the second reaction-force element 28. The first brake mechanism 18 is disposed between the second ring gear 49 and the fixed member 29, and selectively fixes the second ring gear 49 to the fixed member 29. The first sun gear 40 as one example of the first output element 24 is coupled to the second sun gear 47. Accordingly, in the second planetary gear mechanism 15, the second sun gear 47 is one example of the second input element 26. The output gear 16 is coupled to the second carrier 48 of the second planetary gear mechanism 15. Thus, the second carrier 48 is one example of the second output element 27. Further, the second ring gear 49 of the second planetary gear mechanism 15 is one example of the second reaction-force element 28. Also, the second clutch mechanism 64 is disposed between the second ring gear 49 and the second carrier 48, and selectively couples the second ring gear 49 with the second carrier 48.

FIG. 32 indicates traveling modes that can be set for the drive system 63 shown in FIG. 31. As shown in FIG. 32, the drive system 63 can be placed in any one of the first traveling mode through the seventh traveling mode, by changing the engagement states of the first clutch mechanism (CL1) 17, second clutch mechanism (CL2) 64, and the first brake mechanism (BK1) 18. Each of the first traveling mode through the seventh traveling mode is set by causing the ECU 21 to control the first clutch mechanism 17, second clutch mechanism 64, first brake mechanism 18, engine 11, first motor 12, and the second motor 13. The first traveling mode, second traveling mode, sixth traveling mode and the seventh traveling mode are examples of hybrid traveling modes. The third traveling mode in which the vehicle travels using driving force produced by the second motor 13 while operation of the engine 11 is stopped, and the fourth traveling mode in which the vehicle travels using driving force produced by both the first motor 12 and the second motor 13, are examples of EV modes. The fifth traveling mode is one example of parking mode. The first traveling mode through the fourth traveling mode shown in FIG. 32 are the same as or similar to the first traveling mode through the fourth traveling mode described above with reference to FIG. 19, and therefore, detailed description of these modes will not be provided.

FIG. 33 is a nomographic chart showing operating conditions of the fifth traveling mode shown in FIG. 32. As shown in FIG. 33, the fifth traveling mode is set by engaging the second clutch mechanism 64, and engaging the first brake mechanism 18. When the drive system 63 is placed in the fifth traveling mode, the second ring gear 49 and the second carrier 48 are coupled to each other by the second clutch mechanism 64, and rotation of the second ring gear 49 and the second carrier 48 is inhibited by the first brake mechanism 18. Namely, when the fifth traveling mode is set, the second carrier 48 as one example of the second output element 27 is inhibited from rotating, so as to inhibit rotation of the output gear 16; thus, the second planetary gear mechanism 15 functions as a parking mechanism. In the first planetary gear mechanism 14, the first sun gear 40 is inhibited from rotating, along with the second sun gear 47, and the output torque of the engine 11 is transmitted to the first carrier 41, so as to rotate the first carrier 41 in the positive direction. Against the torque applied to the first carrier 41, negative torque produced when the first motor 12 functions as a generator is applied to the first ring gear 42.

Figure 34:
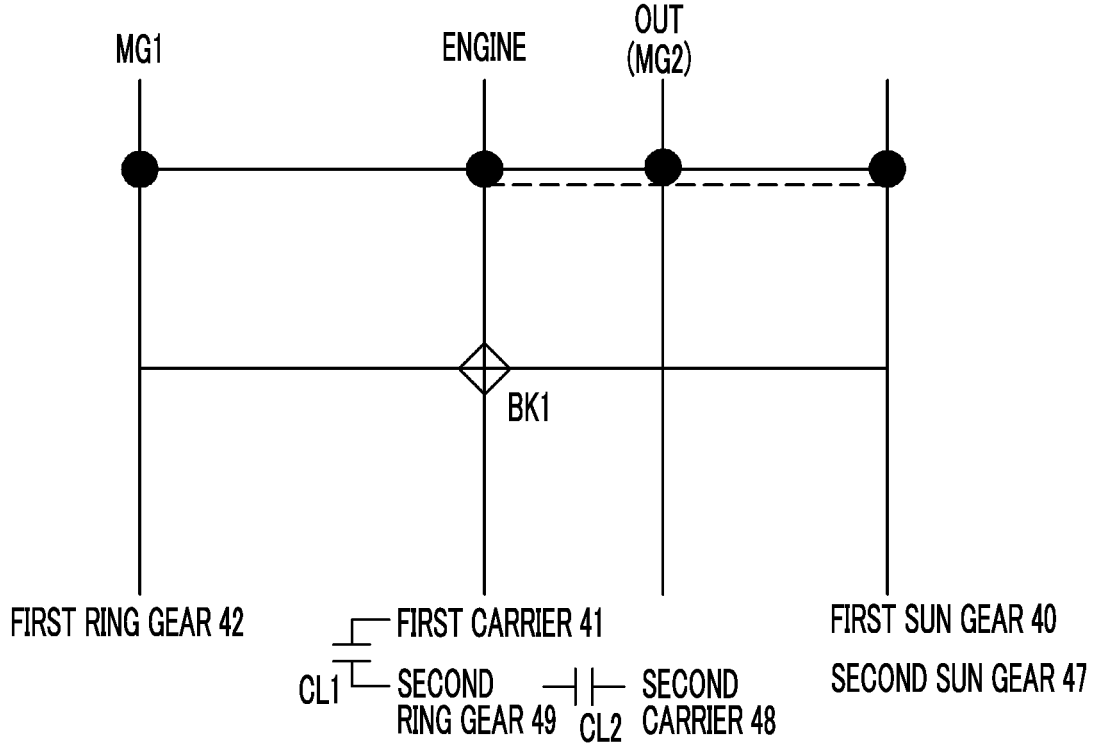
FIG. 34 is a nomographic chart showing operating conditions of a sixth traveling mode indicated in FIG. 32.

FIG. 34 is a nomographic chart showing operating conditions of the sixth traveling mode shown in FIG. 32. As shown in FIG. 34, the sixth traveling mode, which is a hybrid mode, is set by engaging the first clutch mechanism 17 and the second clutch mechanism 64. Namely, when the second clutch mechanism 64 is engaged, the whole second planetary gear mechanism 15 rotates as a unit. Also, when the first clutch mechanism 17 is engaged, the output shaft 44 of the engine 11 is coupled to the second ring gear 49. Accordingly, the driving force produced by the engine 11 is directly transmitted to the output gear 16 via the second planetary gear mechanism 15. Also, in the first planetary gear mechanism 14, the first carrier 41 is coupled to the engine 11, and the first sun gear 40 is coupled to the engine 11 via the second planetary gear mechanism 15 and the first clutch mechanism 17, so that the whole first planetary gear mechanism 14 rotates as a unit, and does not perform differential operation. Accordingly, the output torque produced when the first motor 12 functions as a motor is transmitted to the output gear 16 without being increased or reduced via the first planetary gear mechanism 14 and the second planetary gear mechanism 15. Thus, the driving forces of the engine 11 and the first motor 12 are combined and delivered from the output gear 16. Also, the driving force produced by the second motor 13 that functions as a motor is added to the driving force of the engine 11 and the first motor 12 at the driven gear 53. Namely, all of the engine 11, first motor 12 and the second motor 13 generate driving force for traveling the vehicle, and the driving force is transmitted to the drive wheels 37. Accordingly, when the sixth traveling mode is set, driving force is generated utilizing chemical energy stored in the form of fuel and electric energy of the power supply unit; therefore the maximum driving force that can be generated by vehicles can be generated. In particular, since the respective rotating elements of the first planetary gear mechanism 14 and the second planetary gear mechanism 15 do not rotate relative to each other, as shown in FIG. 34, the energy loss can be reduced, and the energy efficiency can be improved.

Figure 35:
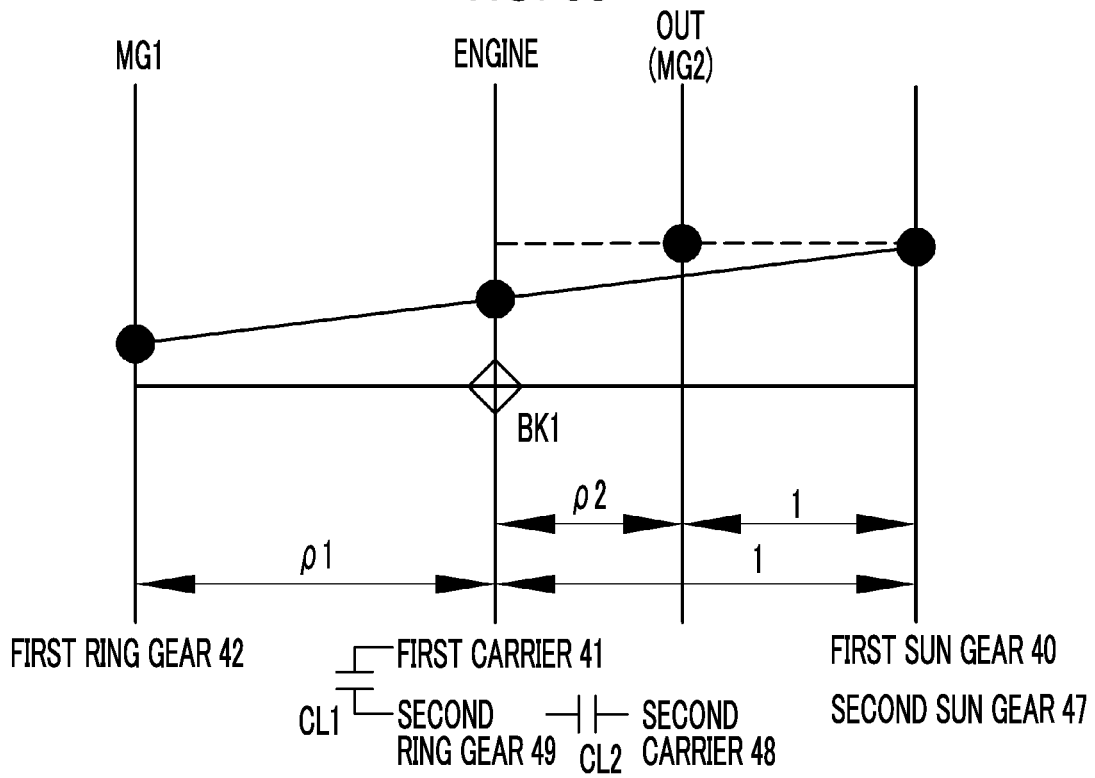
FIG. 35 is a nomographic chart showing operating conditions of a seventh traveling mode indicated in FIG. 32.

FIG. 35 is a nomographic chart showing operating conditions of the seventh traveling mode shown in FIG. 32. As shown in FIG. 35, the seventh traveling mode is set by releasing the first brake mechanism 18 and the first clutch mechanism 17, and engaging the second clutch mechanism 64. If the first clutch mechanism 17 is released, only the first sun gear 40 and the second sun gear 47 are coupled to each other, between the first planetary gear mechanism 14 and the second planetary gear mechanism 15. Therefore, a part of the output torque of the engine 11, which is distributed to the first sun gear 40, is transmitted to the second sun gear 47 of the second planetary gear mechanism 15. Since the second clutch mechanism 64 is engaged, and its two rotating elements, i.e., the second carrier 48 and the second ring gear 49, are coupled to each other, the whole second planetary gear mechanism 15 rotates as a unit, Accordingly, the second planetary gear mechanism 15 does not operate to change the speed, and therefore, the driving force of the first sun gear 40 of the first planetary gear mechanism 14 is transmitted to the output gear 16, without being increased or reduced by the second planetary gear mechanism 15. Then, the driving force is transmitted from the output gear 16 to the drive wheels 37.

In the meantime, the second motor 13 functions as a motor, using electric power generated by the first motor 12, and driving force produced by the second motor 13 is transmitted to the drive wheels 37. Namely, the driving force once converted into electric power is converted again into mechanical driving force by means of the second motor 13, and is added to the driving force delivered from the output gear 16. When the seventh traveling mode is set, the output gear 16 rotates at a higher rotational speed, as compared with the case of the second traveling mode shown in FIG. 27. The speed ratio is reduced by an amount corresponding to the increase in the rotational speed. Also, the split ratio of the power to the first motor 12 side is "1/ρ1" where the split ratio of the power to the output gear 16 side is "1". This ratio is larger than the power split ratio in the first traveling mode shown in FIG. 32.

Thus, the drive system 63 is additionally provided with the second clutch mechanism 64, as compared with the drive system 60 shown in FIG. 18, so that three traveling modes, i.e., the fifth traveling mode through the seventh traveling mode, can be additionally set. The structure and functions peculiar to the eighth embodiment as described above with reference to FIG. 30 through FIG. 35, for example, the structure further including the second clutch mechanism 64 that selectively couples the second output element 27 with the second reaction-force element 28, and its functions, can also be applied to other embodiments.

Figure 36:
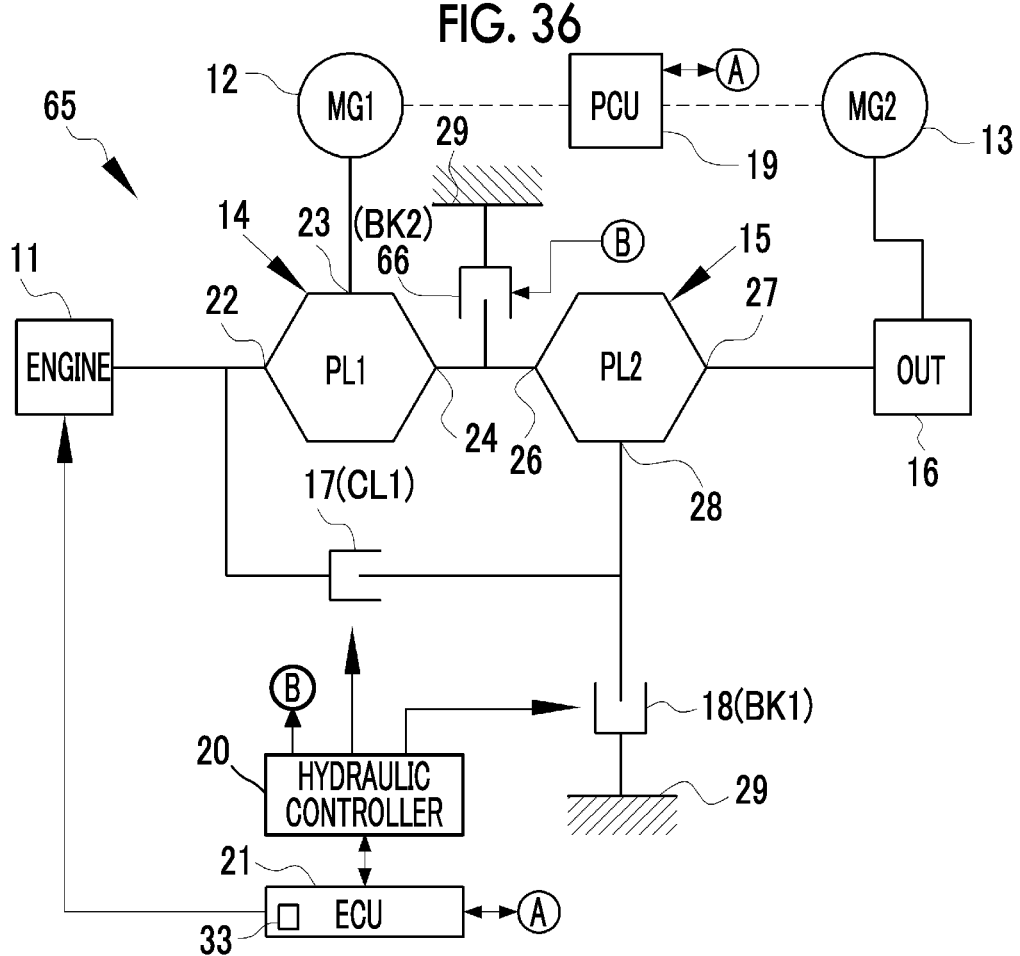
FIG. 36 is a block diagram showing a drive system according to a ninth embodiment of the present disclosure.

Next, a drive system of a ninth embodiment of the present disclosure will be described. FIG. 36 is a block diagram schematically illustrating the drive system 65 of the ninth embodiment. As shown in FIG. 36, the drive system 65 is provided with a second brake mechanism (BK2) 66, as compared with the drive system 10 shown in FIG. 1. The second brake mechanism 66 selectively fixes the first output element 24 (one example of the second input element 26) to the fixed member 29. In FIG. 36, the same reference numerals are assigned to the same or similar members as those described above with reference to FIG. 1, and detailed description of these elements will not be provided. The hydraulic controller 20 of the ninth embodiment shown in FIG. 36 individually controls supply of hydraulic pressures to the first clutch mechanism 17, first brake mechanism 18, and the second brake mechanism 66, in response to command values generated from the ECU 21. The PCU 19, hydraulic controller 20, ECU 21, engine-controller 33, etc. are examples of controllers.

Figure 37:
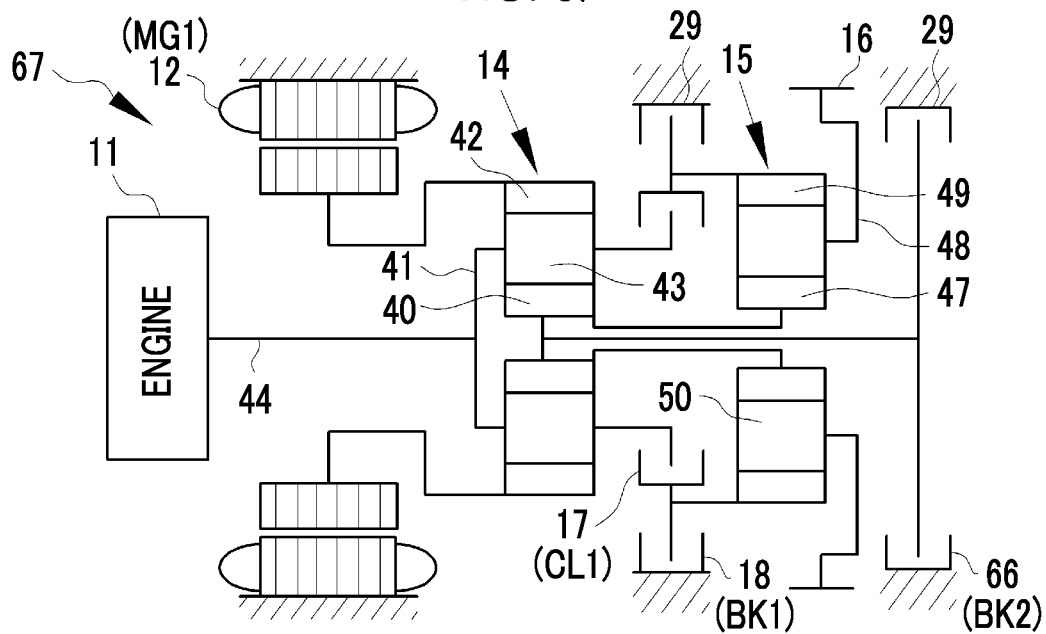
FIG. 37 is a skeleton diagram showing one example of the drive system shown in FIG. 36.

FIG. 37 is a skeleton diagram specifically illustrating one example of the drive system 65 shown in FIG. 36. A drive system 67 shown in FIG. 37 is provided by adding the second brake mechanism 66 to the drive system 60 shown in FIG. 18. The second brake mechanism 66 selectively fixes the first sun gear 40 as one example of the first output element 24 to the fixed member 29. In FIG. 37, the same reference numerals are assigned to the same or similar members as those described above with reference to FIG. 2 and FIG. 18, and detailed description of these members will not be provided.

Figures 38, 39:
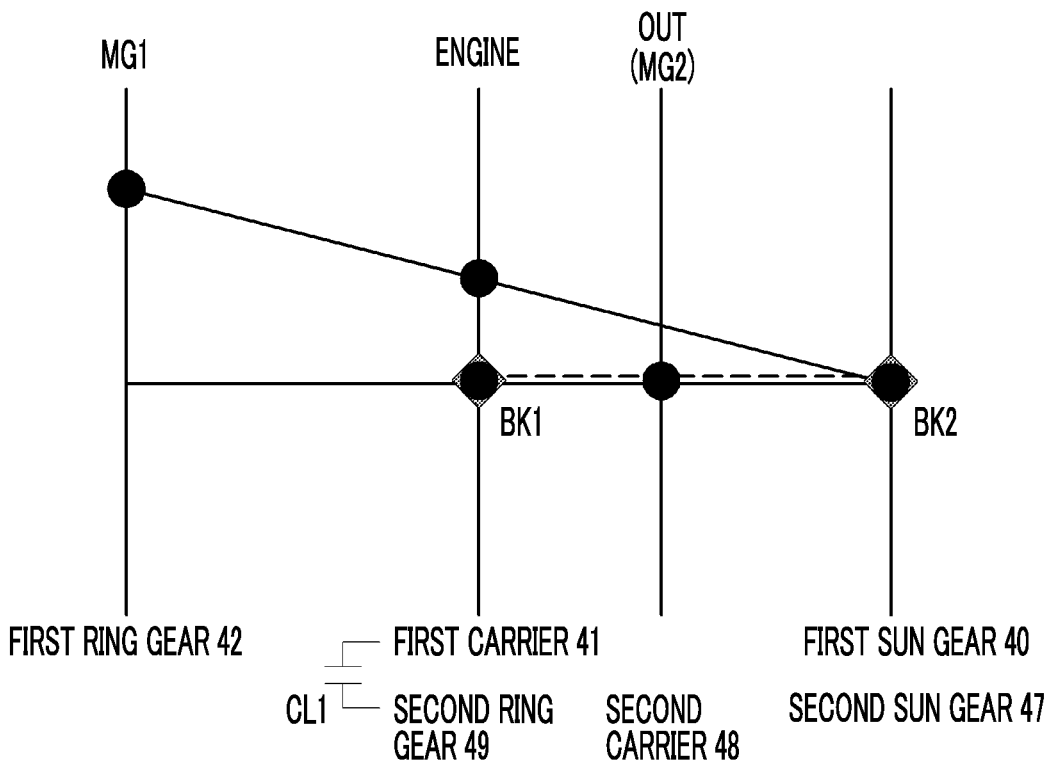
FIG. 38 is a view indicating traveling modes that can be set for the drive system shown in FIG. 37.
FIG. 39 is a nomographic chart showing operating conditions of a fifth traveling mode indicated in FIG. 38.

FIG. 38 indicates traveling modes that can be set for the drive system 67 shown in FIG. 37. As shown in FIG. 38, the drive system 67 can be placed in any one of the first traveling mode through the seventh traveling mode, by changing the engagement states of the first clutch mechanism (CL1) 17, first brake mechanism (BK1) 18, and the second brake mechanism (BK2) 66. Each of the first traveling mode through the seventh traveling mode is set by causing the ECU 21 to control the first clutch mechanism 17, first brake mechanism 18, second brake mechanism 66, engine 11, first motor 12, and the second motor 13. The first traveling mode, second traveling mode, sixth traveling mode and the seventh traveling mode are examples of hybrid traveling modes. The third traveling mode and the fourth traveling mode are examples of EV modes. The fifth traveling mode is one example of parking mode. The first traveling mode through the fourth traveling mode are the same as or similar to the first traveling mode through the fourth traveling mode described above with reference to FIG. 19, and therefore, detailed description of these modes will not be provided.

FIG. 39 is a nomographic chart showing operating conditions of the fifth traveling mode shown in FIG. 38. As shown in FIG. 39, the fifth traveling mode, which is a parking mode, is set by engaging the first brake mechanism 18 and the second brake mechanism 66. In the second planetary gear mechanism 15, when the fifth traveling mode is set, the second sun gear 47 as one example of the second input element 26 and the second ring gear 49 as one example of the second reaction-force element 28 are inhibited from rotating, so that the second carrier 48 (the output gear 16) as one example of the second output element 27 is inhibited from rotating. The operating conditions in the case where the fifth traveling mode is set is the same as or similar to the operating conditions of the fifth traveling mode described above with reference to FIG. 33, and therefore, will not be described in detail.

Figure 40:
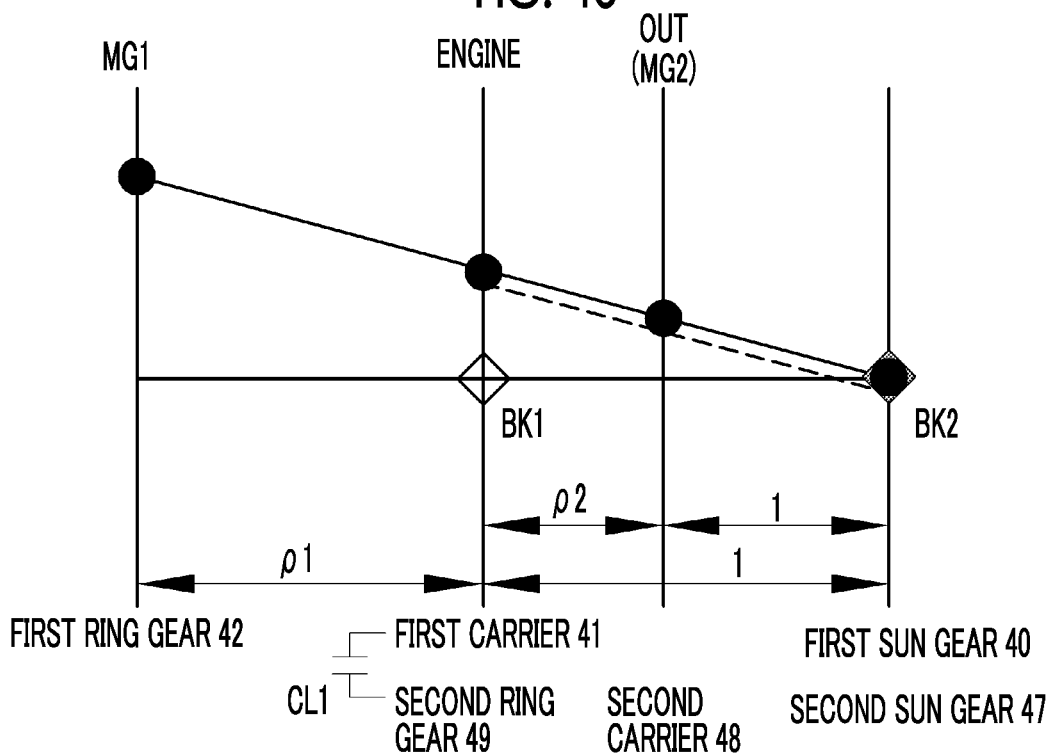
FIG. 40 is a nomographic chart showing operating conditions of a sixth traveling mode indicated in FIG. 38.

FIG. 40 is a nomographic chart showing operating conditions of the sixth traveling mode shown in FIG. 38. The sixth traveling mode is set by engaging the first clutch mechanism 17 and the second brake mechanism 66. As shown in FIG. 40, in the sixth traveling mode, the first clutch mechanism 17 is engaged, so that the first carrier 41 and the second ring gear 49 are coupled to each other; therefore, the first planetary gear mechanism 14 and the second planetary gear mechanism 15 form a composite planetary gear mechanism. In the composite planetary gear mechanism, rotation of the first sun gear 40 and the second sun gear 47 is inhibited by the second brake mechanism 66. In the first planetary gear mechanism 14, the output torque of the engine 11 is received by the first carrier 41, and torque produced by the first motor 12 can be applied to the first ring gear 42. The output torque of the engine 11 is directly transmitted to the second ring gear 49 of the second planetary gear mechanism 15 via the first carrier 41. In the second planetary gear mechanism 15, the second ring gear 49 is coupled to the output shaft 44 of the engine 11 via the first clutch mechanism 17, so that the second ring gear 49 rotates along with the engine 11, and the second sun gear 47 is inhibited from rotating by the second brake mechanism 66. As a result, the second carrier 48 rotates in the positive direction, with the torque transmitted from the second ring gear 49. Namely, a part of the output torque of the engine 11 can be distributed to the first motor 12 in the first planetary gear mechanism 14, and another part of the output torque is distributed to the second carrier 48 of the second planetary gear mechanism 15 and delivered from the output gear 16. Since the first traveling mode is a hybrid mode, the second motor 13 can be driven as a motor, using electric power generated by the first motor 12, for example.

Figure 41:
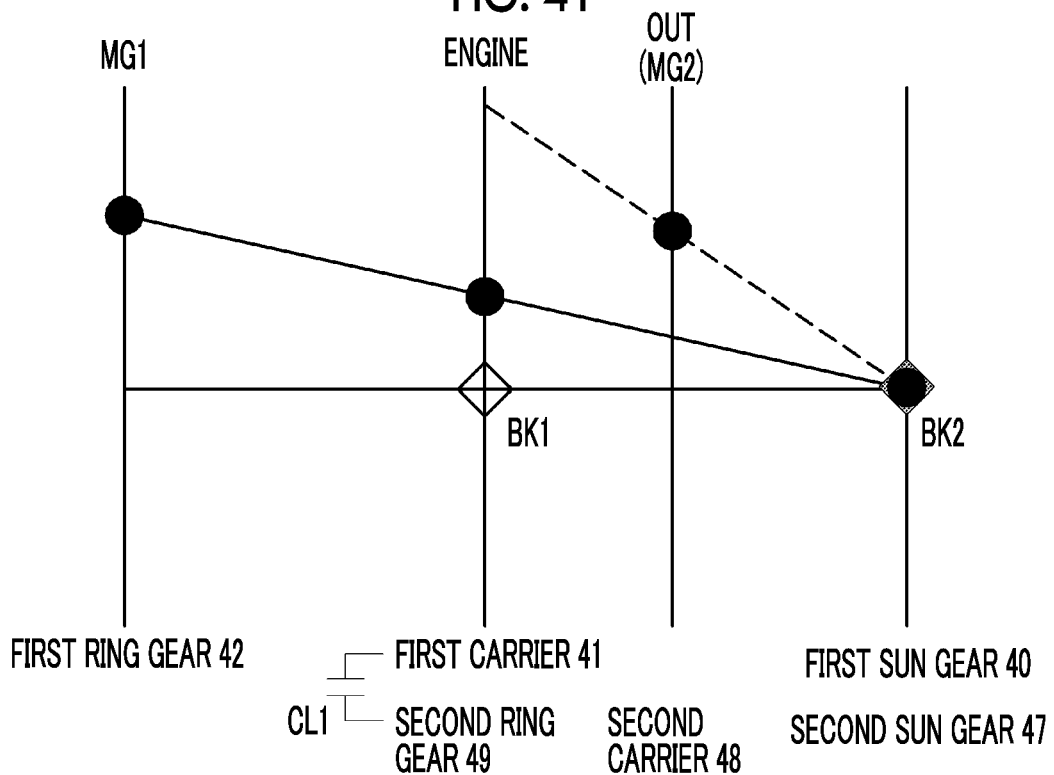
FIG. 41 is a nomographic chart showing operating conditions of a seventh traveling mode indicated in FIG. 38.

FIG. 41 is a nomographic chart showing operating conditions of the seventh traveling mode shown in FIG. 38. The seventh traveling mode is a series hybrid mode, and is set by engaging the second brake mechanism 66. As shown in FIG. 41, when the seventh traveling mode is set, rotation of the first sun gear 40 is inhibited by the second brake mechanism 66, and the first planetary gear mechanism 14 is disassociated or disconnected from the second planetary gear mechanism 15 by the first clutch mechanism 17, to function as an independent mechanism. Thus, the driving force produced by the engine 11 is transmitted only to the first ring gear 42 via the first carrier 41. To the first ring gear 42, negative torque produced by the first motor 12 that functions as a generator is applied. The second motor 13 is driven as a motor, using electric power generated by the first motor 12. The driving force produced by the second motor 13 is transmitted from the second drive gear 56 to the drive wheels 37 via the driven gear 53. On the other hand, the output gear 16 that meshes with the driven gear 53 and the second carrier 48 integral with the output gear 16 rotate in the positive direction, using torque transmitted from the second motor 13. However, in the second planetary gear mechanism 15, rotation of the second sun gear 47 is inhibited by the second brake mechanism 66, and the first clutch mechanism 17 is released; therefore, the second ring gear 49 idles, and no torque is transmitted to the first planetary gear mechanism 14.

Thus, in the case of the drive system 67, three traveling modes, i.e., the fifth traveling mode through the seventh traveling mode can be additionally set, by providing the drive system 60 shown in FIG. 18 with the second brake mechanism 66. The structure and functions peculiar to the ninth embodiment as described above with reference to FIG. 36 through FIG. 41, for example, the structure further including the second brake mechanism 66 that selectively fixes the first output element 24 to the fixed member 29, and its functions, may also be applied to other embodiments.

Figure 42:
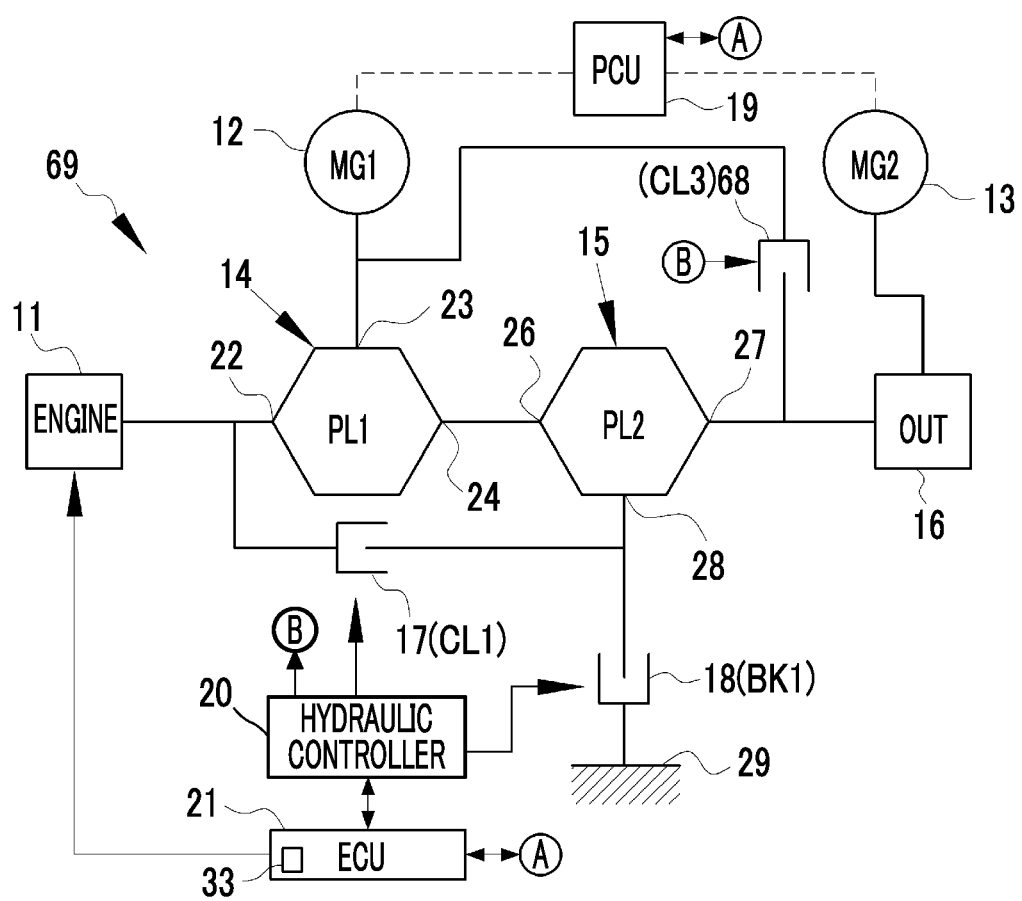
FIG. 42 is a block diagram showing a drive system according to a tenth embodiment of the present disclosure.

Next, a drive system of a tenth embodiment of the present disclosure will be described. FIG. 42 is a block diagram illustrating the drive system 69 of the tenth embodiment. As compared with the drive system 63 shown in FIG. 31, the drive system 69 shown in FIG. 42 is not provided with the second clutch mechanism 64, but is additionally provided with a third clutch mechanism (CL3) 68 instead. The third clutch mechanism 68 selectively couples the first reaction-force element 23 with the second output element 27. In FIG. 42, the same reference numerals are assigned to the same or similar members as those described above with reference to FIG. 1, and detailed description of these members will not be provided. The hydraulic controller 20 of the tenth embodiment shown in FIG. 42 individually controls supply of hydraulic pressures to the first clutch mechanism 17, first brake mechanism 18, and the third clutch mechanism 68, in response to command values generated from the ECU 21. The PCU 19, hydraulic controller 20, ECU 21, engine-ECU 33, etc. are examples of controllers.

Figures 43, 44:
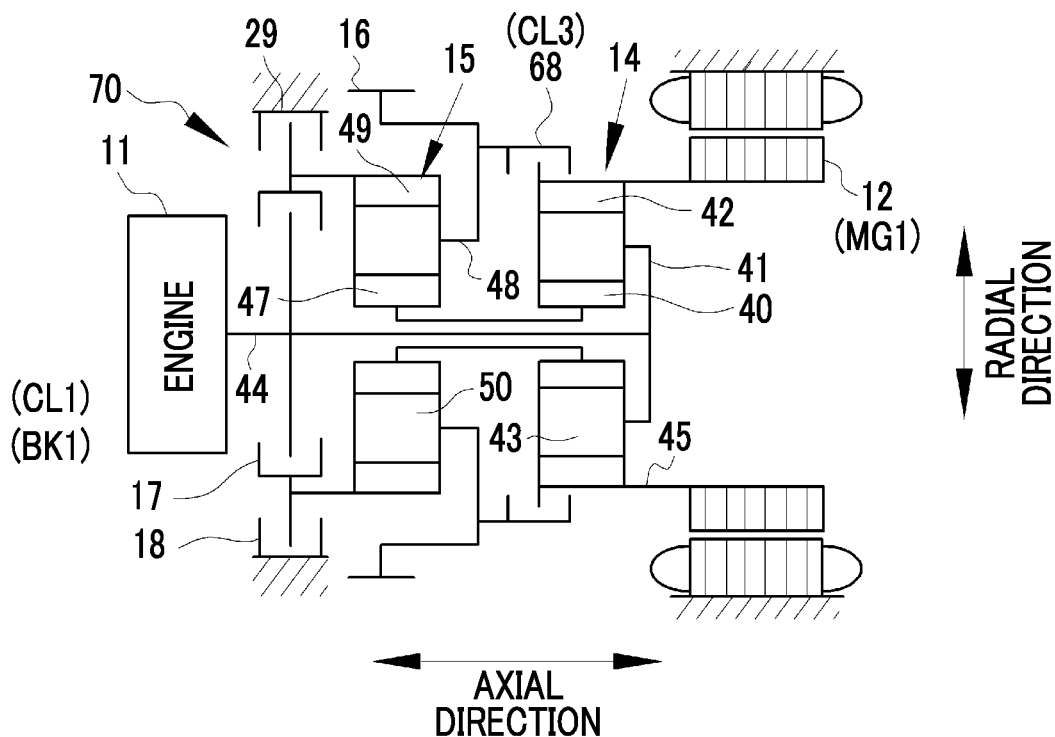
FIG. 43 is a skeleton diagram showing one example of the drive system shown in FIG. 42.
FIG. 44 is a view indicating traveling modes that can be set for the drive system shown in FIG. 43.

FIG. 43 is a skeleton diagram specifically illustrating one example of the drive system 69 shown in FIG. 42. A drive system 70 shown in FIG. 43 is substantially provided by adding the third clutch mechanism 68 to the drive system 60 shown in FIG. 18. Also, the drive system 70 shown in FIG. 43 is different from the drive system 60 shown in FIG. 18 in the arrangement of the first clutch mechanism 17, first brake mechanism 18, third clutch mechanism 68, engine 11, first motor 12, and the second motor 13. Namely, the first clutch mechanism 17 and the first brake mechanism 18 are disposed between the engine 11 and the second planetary gear mechanism 15 in the axial direction, such that they are radially aligned with each other. The first planetary gear mechanism 14 is located on one side of the second planetary gear mechanism 15 opposite to the engine 11 as viewed in the axial direction, and the first motor 12 is located on one side of the first planetary gear mechanism 14 opposite to the second planetary gear mechanism 15 in the axial direction.

In FIG. 43, the same reference numerals are assigned to the same or similar members as those described above with reference to FIG. 18.

FIG. 44 indicates traveling modes that can be set for the drive system 70 shown in FIG. 43. As shown in FIG. 44, the drive system 70 can be placed in any one of the first traveling mode through the seventh traveling mode, by changing the engagement states of the first clutch mechanism (CL1) 17, first brake mechanism (BK1) 18, and the third clutch mechanism (CL3) 68. Each of the first traveling mode through the seventh traveling mode is set by causing the ECU 21 to control the first clutch mechanism 17, first brake mechanism 18, third clutch mechanism 68, engine 11, first motor 12, and the second motor 13. The first traveling mode, second traveling mode, fifth traveling mode, and sixth traveling mode are examples of hybrid traveling modes. The third traveling mode, fourth traveling mode, and seventh traveling mode are examples of EV modes. The operating conditions of the first traveling mode through the fourth traveling mode are the same as or similar to those of the first traveling mode through the fourth traveling mode described above with reference to FIG. 19, and therefore, detailed description will not be provided.

Figure 45:
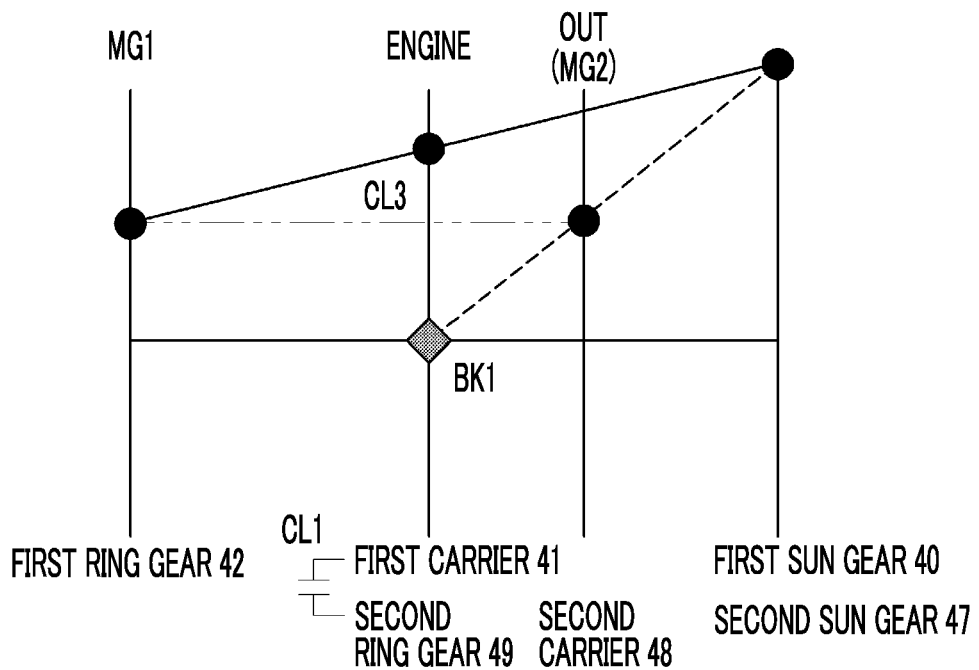
FIG. 45 is a nomographic chart showing operating conditions of a fifth traveling mode indicated in FIG. 43.

FIG. 45 is a nomographic chart showing operating conditions of the fifth traveling mode indicated in FIG. 44. As shown in FIG. 45, the fifth traveling mode is a hybrid mode, and is set when the first brake mechanism 18 and the third clutch mechanism 68 are respectively engaged. With the third clutch mechanism 68 thus engaged in the fifth traveling mode, the first ring gear 42 of the first planetary gear mechanism 14 and the second carrier 48 of the second planetary gear mechanism 15 are coupled to each other. Also, rotation of the second ring gear 49 is inhibited by the first brake mechanism 18. Namely, in the first planetary gear mechanism 14, the output torque of the engine 11 is transmitted to the first carrier 41 so as to rotate the first carrier 41 in the positive direction, and negative torque produced by the first motor 12 that functions as a generator is applied to the first ring gear 42, so that the first sun gear 40 rotates in the positive direction, in the same or similar manner as the operating conditions of the second traveling mode as described above with reference to FIG. 21. The output torque of the engine 11 is split by the first planetary gear mechanism 14 to the first motor 12 side and the first sun gear 40 side. In the second planetary gear mechanism 15, rotation of the second ring gear 49 is inhibited by the first brake mechanism 18, so that positive torque is transmitted from the first sun gear 40 to the second sun gear 47. Therefore, the second planetary gear mechanism 15 functions as a speed reducer, and the second carrier 48 and the output gear 16 integral with the second carrier 48 rotate at a lower rotational speed than the engine 11 and the second sun gear 47. The second carrier 48 and the output gear 16 integral with the second carrier 48 are constantly rotated at the same rotational speed as the first ring gear 42 by means of the third clutch mechanism 68.

Figure 46:
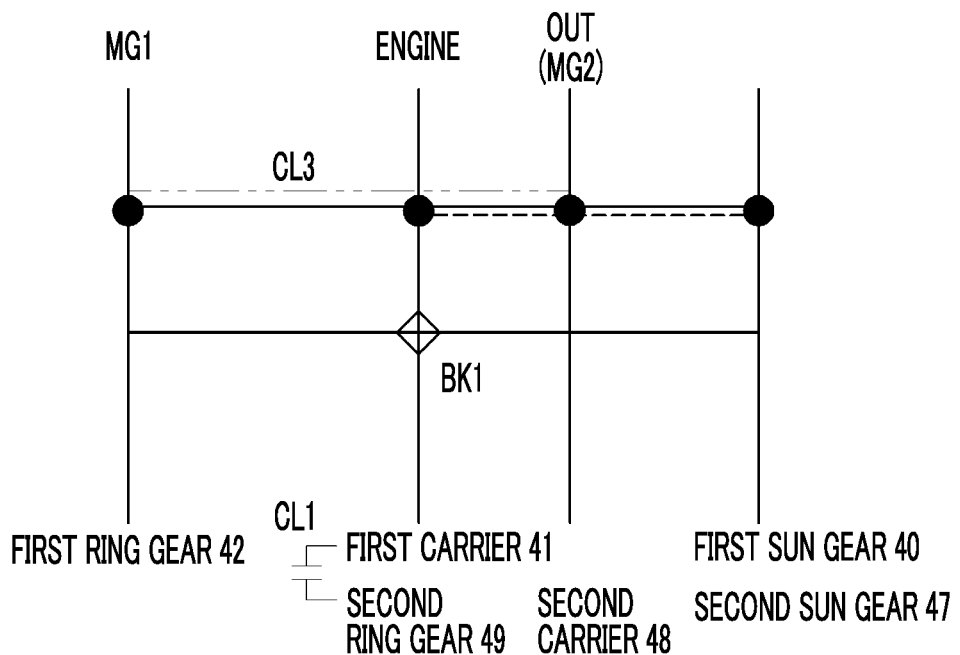
FIG. 46 is a nomographic chart showing operating conditions of a sixth traveling mode indicated in FIG. 43.

FIG. 46 is a nomographic chart showing operating conditions of the sixth traveling mode indicated in FIG. 44. As shown in FIG. 46, the sixth traveling mode is set when the first clutch mechanism 17 and the third clutch mechanism 68 are respectively engaged. The composite planetary gear mechanism functions as a speed change mechanism in which the speed ratio of direct coupling, which is "1:1" is set as each of the ratio of the rotational speeds of the engine 11 and the rotor 45 of the first motor 12, and the ratio of the rotational speeds of the engine 11 and the output gear 16. The operation in the case where the drive system 70 is placed in the sixth traveling mode is the same as or similar to the operation in the sixth traveling mode described above in FIG. 34, and therefore, detail description will not be provided.

Figure 47:
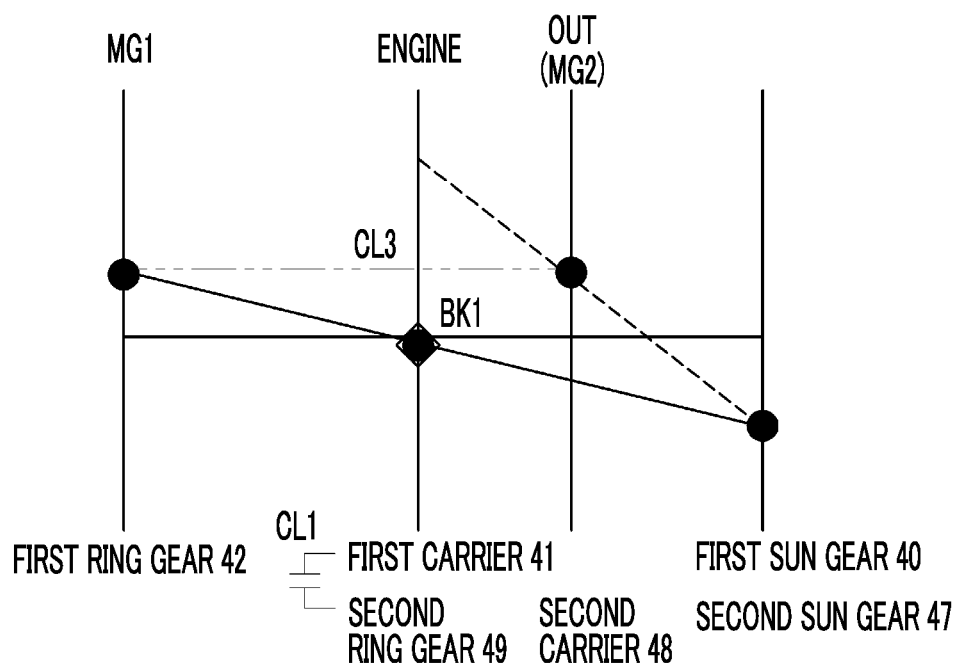
FIG. 47 is a nomographic chart showing operating conditions of a seventh traveling mode indicated in FIG. 43.

FIG. 47 is a nomographic chart showing operating conditions of the seventh traveling mode indicated in FIG. 44. As shown in FIG. 47, the seventh traveling mode is set by engaging the third clutch mechanism 68. In the seventh traveling mode, which is one example of EV mode, operation of the engine 11 is stopped, and the vehicle travels using driving force of both the first motor 12 and the second motor 13. The first motor 12 is driven so as to function as a motor, and transmits rotation in the positive direction to the first ring gear 42. With the third clutch mechanism 86 engaged, the first ring gear 42 and the second carrier 48 are coupled to each other. Therefore, the second carrier 48 and the output gear 16 integral with the second carrier 48 rotate at the same rotational speed as the rotor 45 of the first motor 12. The driving force produced by the second motor 13 is transmitted to the driven gear 53, and the driven gear 53 transmits the driving force corresponding to the driving force produced by the first motor 12 and the driving force produced by the second motor 13, to the drive wheels 37.

Thus, in the case of the drive system 70, three traveling modes, i.e., the fifth traveling mode through the seventh traveling mode, can be additionally set, by further providing the drive system 60 shown in FIG. 18, for example, with the third clutch mechanism 68. Also, as compared with the drive system 67 shown in FIG. 37, the fifth traveling mode through the seventh traveling mode set for the drive system 70 are different from the fifth through seventh traveling modes indicated in FIG. 38. The structure and functions peculiar to the tenth embodiment as described above with reference to FIG. 42 through FIG. 47, for example, the structure further including the third clutch mechanism 68 that selectively couples the first reaction-force element 23 with the second output element 27, and its functions, can also be applied to other embodiments.

Figure 48:
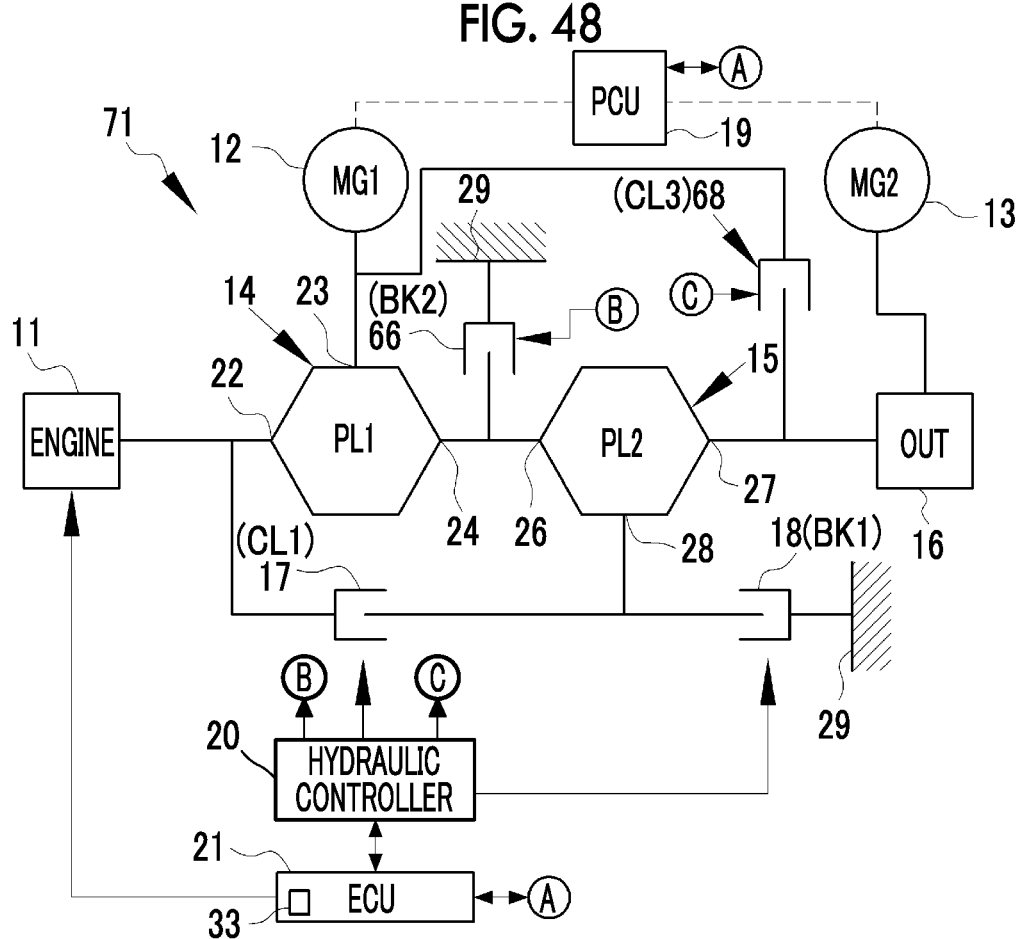
FIG. 48 is a block diagram showing a drive system according to an eleventh embodiment of the present disclosure.

Next, a drive system of an eleventh embodiment of the present disclosure will be described. FIG. 48 is a block diagram schematically illustrating the drive system 71 of the eleventh embodiment. As shown in FIG. 48, the drive system 71 includes the second brake mechanism 66 shown in FIG. 36, and the third clutch mechanism 68 shown in FIG. 42, in addition to the first clutch mechanism 17 and the first brake mechanism 18. The second brake mechanism 66 selectively fixes the first output element 24 (one example of the second input element 26) to the fixed member 29. The third clutch mechanism 68 selectively couples the first reaction-force element 23 with the second output element 27. In FIG. 48, the same reference numerals are assigned to the same or similar members as those described above with reference to FIG. 1, FIG. 36 and FIG. 42, and detailed description of these members will not be provided. The hydraulic controller 20 of the eleventh embodiment shown in FIG. 48 individually controls supply of hydraulic pressures to the first clutch mechanism 17, first brake mechanism 18, second brake mechanism 66, and the third clutch mechanism 68, in response to command values generated from the ECU 21. The PCU 19, hydraulic controller 20, ECU 21, engine-ECU 33, etc. are examples of controllers.

Figure 49:
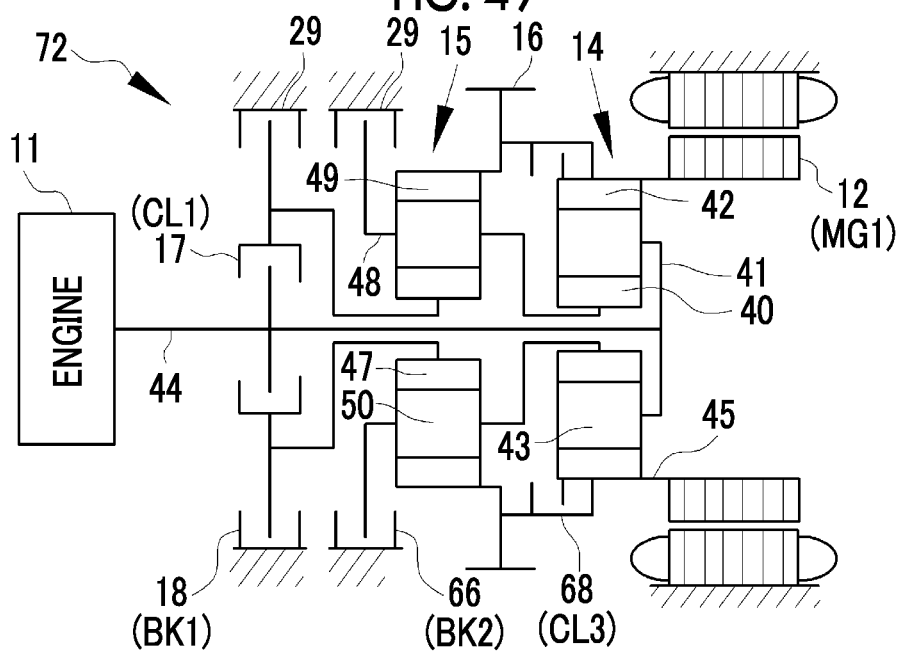
FIG. 49 is a skeleton diagram showing one example of the drive system shown in FIG. 48.

FIG. 49 is a skeleton diagram specifically illustrating another example of the drive system 71 shown in FIG. 48. A drive system 72 shown in FIG. 49 is provided by changing coupling conditions and arrangement or locations of the first planetary gear mechanism 14, second planetary gear mechanism 15, first clutch mechanism 17, and the first brake mechanism 18 in the tenth embodiment as described above with reference to FIG. 44. Namely, the coupling conditions of the input elements, output elements and reaction-force elements that constitute the first planetary gear mechanism 14 and the second planetary gear mechanism 15 of the drive system 72 are the same as or similar to those of the input elements, output elements and reaction-force elements that constitute the first planetary gear mechanism 14 and the second planetary gear mechanism 15 of the drive system 34 shown in FIG. 2. Also, the coupling conditions of the first clutch mechanism 17 and the first brake mechanism 18 of the drive system 72 are the same as or similar to those of the first clutch mechanism 17 and the first brake mechanism 18 of the drive system 34 shown in FIG. 2. The drive system 72 is different from the drive system 34 in that the first planetary gear mechanism 14 and the second planetary gear mechanism 15 of the drive system 72 are disposed on the same axis as the center axis of rotation of the engine 11, and the second planetary gear mechanism 15 is disposed between the engine 11 and the first planetary gear mechanism 14. The first motor 12 is disposed on one side of the first planetary gear mechanism 14 opposite to the second planetary gear mechanism 15. The first brake mechanism 18, second brake mechanism 66, and the first clutch mechanism 17 are disposed between the engine 11 and the second planetary gear mechanism 15. The third clutch mechanism 68 is disposed between the first planetary gear mechanism 14 and the second planetary gear mechanism 15.

FIG. 50 indicates traveling modes that can be set for the drive system 72 shown in FIG. 49. As shown in FIG. 50, the drive system 72 can be placed in any one of the first traveling mode through the eleventh traveling mode, by changing the engagement states of the first brake mechanism (BK1) 18, first clutch mechanism (CL1) 17, second brake mechanism (BK2) 66, and the third clutch mechanism (CL3) 68. Each of the first traveling mode through the eleventh traveling mode is set by causing the ECU 21 to control the first brake mechanism 18, first clutch mechanism 17, second brake mechanism 66, third clutch mechanism 68, engine 11, first motor 12, and the second motor 13. The operating conditions of the first traveling mode through the fifth traveling mode indicated in FIG. 50 are the same as or similar to the operating conditions of the traveling modes indicated in FIG. 32, and therefore, detailed description of these modes will not be provided.

Figure 51:
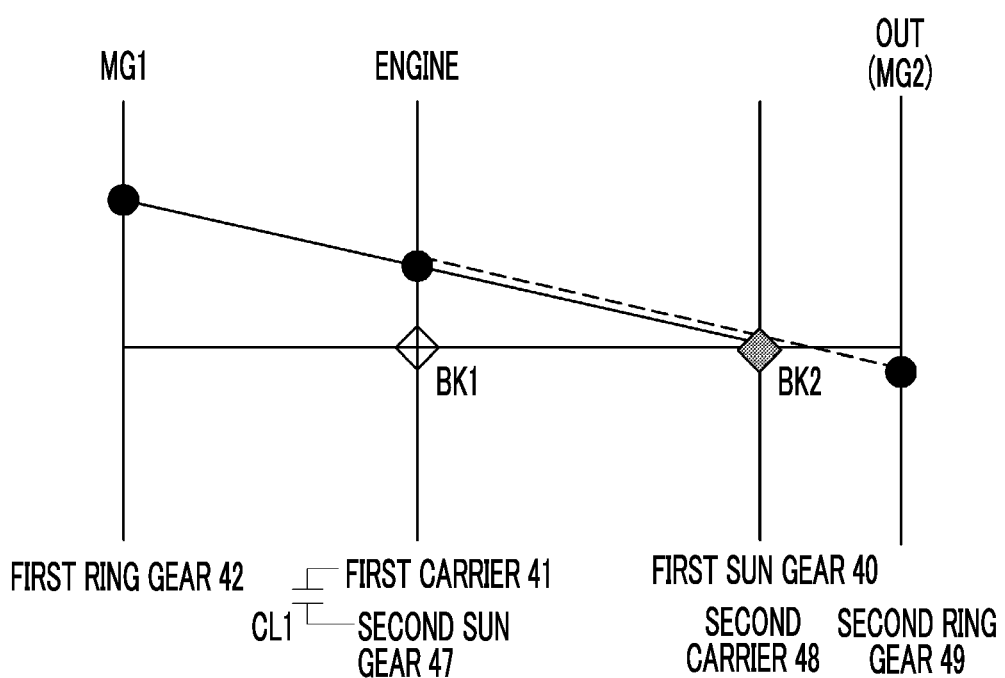
FIG. 51 is a nomographic chart showing operating conditions of a sixth traveling mode indicated in FIG. 50.

FIG. 51 is a nomographic chart showing operating conditions of the sixth traveling mode indicated in FIG. 50. As shown in FIG. 51, the sixth traveling mode is set by engaging the first clutch mechanism 17 and the second brake mechanism 66. In this case, the first carrier 41 and the second sun gear 47 are coupled with each other through engagement of the first clutch mechanism 17, and rotation of the first sun gear 40 and the second carrier 48 is inhibited by the second brake mechanism 66, so that a composite planetary gear mechanism is formed. In the first planetary gear mechanism 14, the driving force produced by the engine 11 is transmitted to the first carrier 41, and rotation of the first sun gear 40 is stopped; therefore reaction force for causing the first motor 12 to function as a generator is applied to the first ring gear 42. In the second planetary gear mechanism 15, the driving force produced by the engine 11 is transmitted to the second sun gear 47, and rotation of the second carrier 48 is stopped; therefore, the second ring gear 49 rotates in the negative rotation. In the meantime, the second motor 13 produces driving force for rotation in the negative direction. The driving force produced by the second motor 13 is transmitted to the driven gear 53, and is added to the driving force transmitted from the engine 11, at the driven gear 53. The resulting driving force is then transmitted to the drive wheels 37. In this case, the vehicle travels backward.

Figure 52:
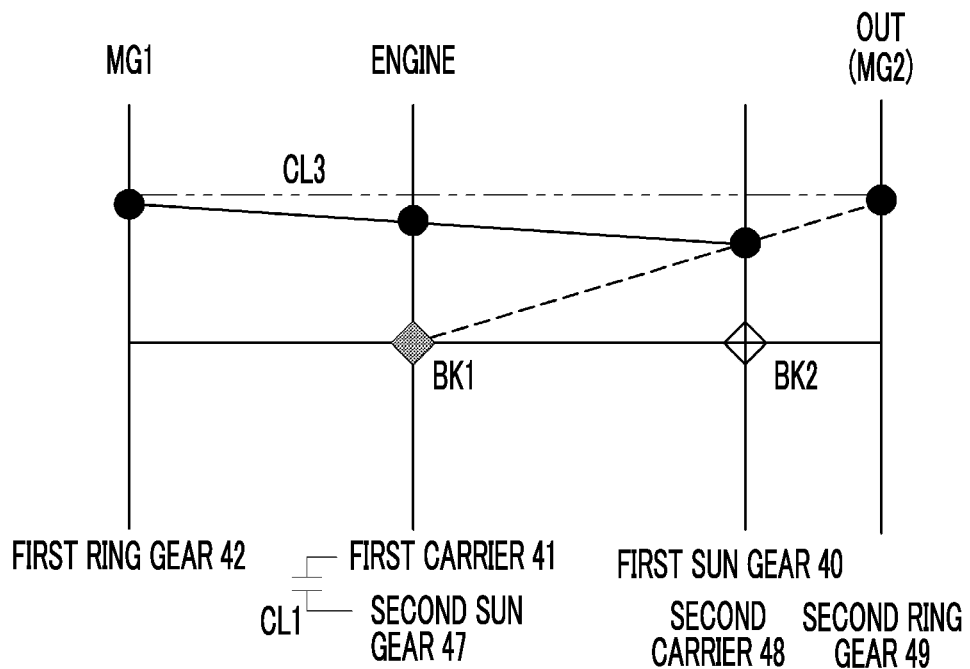
FIG. 52 is a nomographic chart showing operating conditions of an eighth traveling mode indicated in FIG. 50.

FIG. 52 is a nomographic chart showing operating conditions of the eighth traveling mode indicated in FIG. 50. As shown in FIG. 52, the eighth traveling mode is a hybrid mode, and is set by engaging the first brake mechanism 18 and the third clutch mechanism 68. In this case, rotation of the second sun gear 47 is inhibited by the first brake mechanism 18 that is in the engaged state, and the first ring gear 42 and the second ring gear 49 are coupled to each other via the third clutch mechanism 68. In the first planetary gear mechanism 14, the driving force produced by the engine 11 is transmitted to the first carrier 41, and the first sun gear 40 is coupled to the second carrier 48; therefore, the reaction force for causing the first motor 12 to function as a generator is applied to the first ring gear 42. In the second planetary gear mechanism 15, the driving force produced by the engine 11 is transmitted to the second carrier 48 so that the second carrier 48 rotates in the positive direction, and rotation of the second sun gear 47 is inhibited; therefore, the driving force is transmitted to the second ring gear 49 and the output gear 16 integral with the second ring gear 49 so as to rotate them in the positive direction. With the first brake mechanism 18 fixed, the second ring gear 49 is directly coupled to the first ring gear 42. The first motor 12 and the second ring gear 49 are rotated at a higher rotational speed than that of the engine 11. Namely, as indicated in the columns of the eighth traveling mode in FIG. 50, the ENG speed ratio is "SPEED UP", and the MG1 speed ratio is "DIRECT COUPLING". In this case, too, the output torque of the engine 11 is split to the first motor 12 side and the output gear 16 side. The second motor 13 produces driving force for rotation in the positive direction. The driving force delivered from the second motor 13 is transmitted to the driven gear 53, and is added to the driving force transmitted from the engine 11, at the driven gear 53. The resulting driving force is then transmitted to the drive wheels 37.

Figure 53:
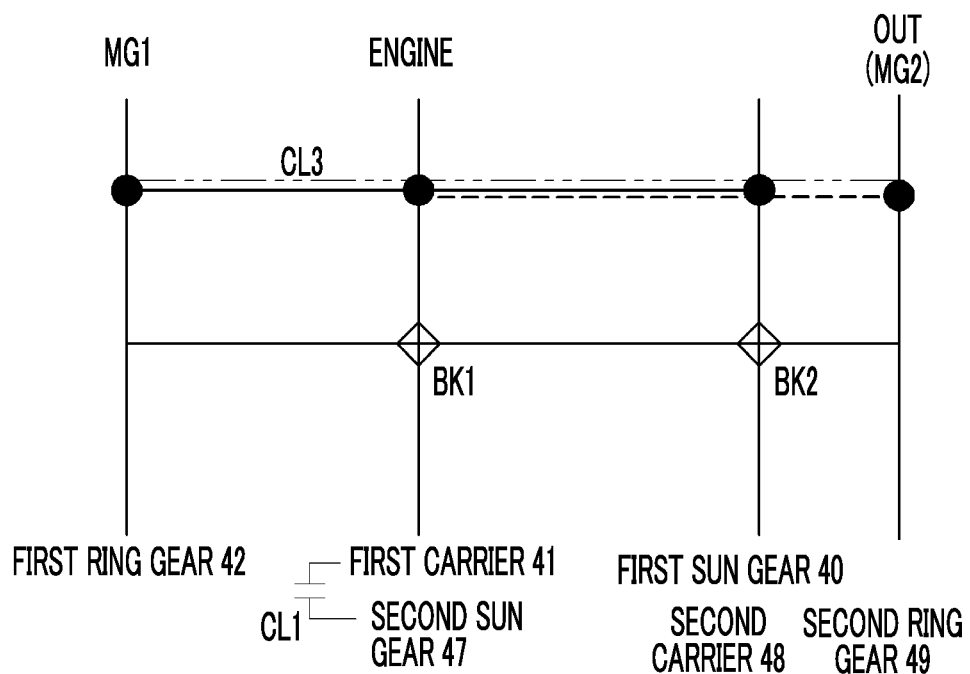
FIG. 53 is a nomographic chart showing operating conditions of a ninth traveling mode indicated in FIG. 50.

FIG. 53 is a nomographic chart showing operating conditions of the ninth traveling mode indicated in FIG. 50. As shown in FIG. 53, the ninth traveling mode is a hybrid mode, and is set by engaging the first clutch mechanism 17 and the third clutch mechanism 68. The operating conditions of the ninth traveling mode are the same as or similar to those of the sixth traveling mode as described above with reference to FIG. 46, and therefore, will not be described in detail.

Figure 54:
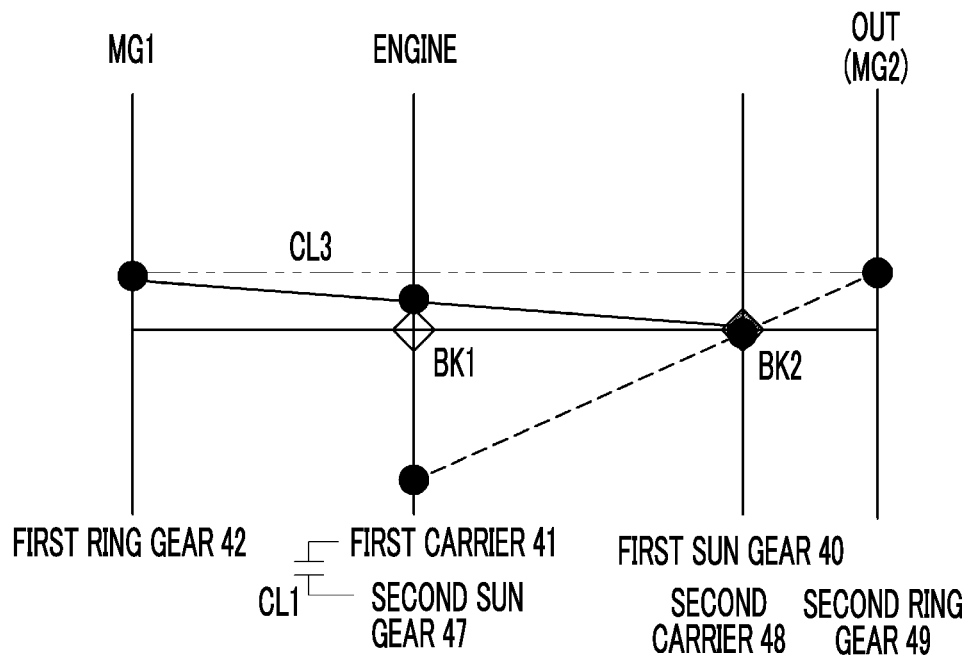
FIG. 54 is a nomographic chart showing operating conditions of an eleventh traveling mode indicated in FIG. 50.

FIG. 54 is a nomographic chart showing operating conditions of the eleventh traveling mode indicated in FIG. 50. As shown in FIG. 54, the eleventh traveling mode is a hybrid mode, and is set by engaging the second brake mechanism 66 and the third clutch mechanism 68. In this case, rotation of the first sun gear 40 and the second carrier 48 is inhibited by the second brake mechanism 66 that is in the engaged state, and the first ring gear 42 is coupled to the second ring gear 49 and the output gear 16 integral with the second ring gear 49 via the third clutch mechanism 68. In the first planetary gear mechanism 14, the driving force produced by the engine 11 is transmitted to the first carrier 41, and rotation of the first sun gear 40 is inhibited; therefore, the reaction force for causing the first motor 12 to function as a generator is applied to the first ring gear 42. In the second planetary gear mechanism 15, the driving force produced by the engine 11 is transmitted to the second ring gear 49 and the output gear 16 integral with the gear 49, via the first carrier 41, so as to rotate them in the positive direction. The first motor 12 and the second ring gear 49 are rotated at a higher rotational speed than the rotational speed of the engine 11. Namely, as indicated in the columns of the eleventh traveling mode in FIG. 50, the ENG speed ratio is "SPEED UP", and the MG1 speed ratio is "DIRECT COUPLING". In this case, too, the output torque of the engine 11 is split to the first motor 12 side and the output gear 16 side. In the second planetary gear mechanism 15, the second sun gear 47 rotates idle in the negative direction, since the first brake mechanism 18 is released, as compared with the eighth traveling mode as describe above with reference to FIG. 55. The second motor 13 produces driving force for rotation in the positive direction. The driving force produced by the second motor 13 is transmitted to the driven gear 53, and is added to the driving force transmitted from the engine 11, at the driven gear 53. The resulting driving force is then transmitted to the drive wheels 37.

Figure 55:
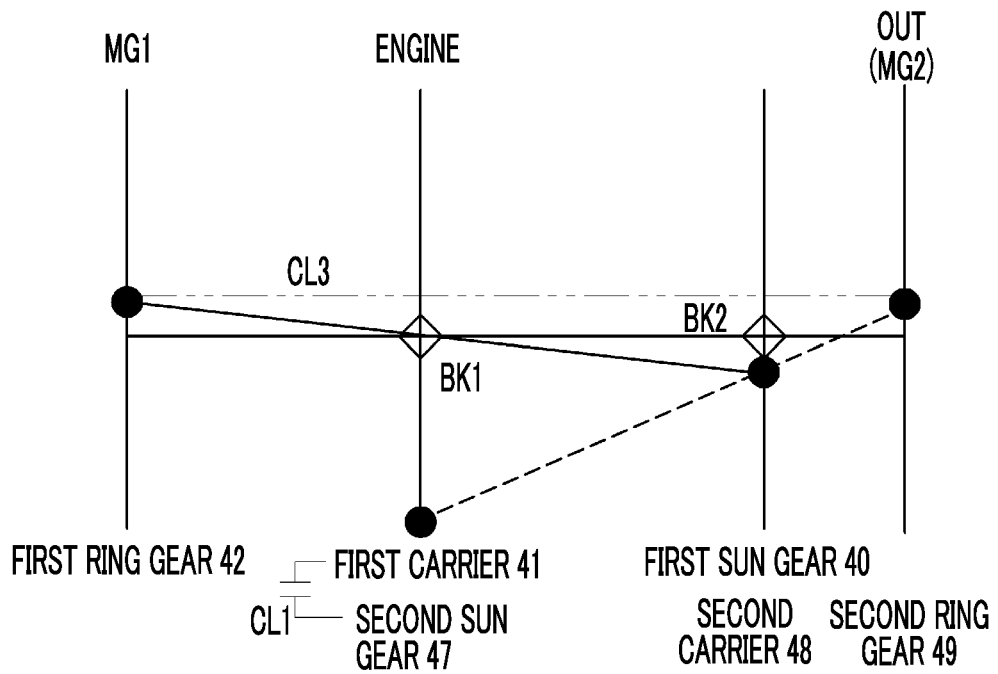
FIG. 55 is a nomographic chart showing operating conditions of a tenth traveling mode indicated in FIG. 50.

FIG. 55 is a nomographic chart showing operating conditions of the tenth traveling mode as described above in FIG. 50. As shown in FIG. 55, the tenth traveling mode is a both-motor drive mode as one type of EV mode, and is set by engaging only the third clutch mechanism 68. When the tenth traveling mode is set, the first motor 12 is driven as a motor, and the driving force produced by the first motor 12 is directly transmitted from the first ring gear 42 to the second ring gear 49. In the second planetary gear mechanism 15, since the first brake mechanism 18 and the second brake mechanism 66 are respectively released, the second sun gear 47 and the second carrier 48 idle, and do not function to transmit torque to the first planetary gear mechanism 14. The speed ratio as the ratio of the rotational speed of the rotor 45 of the first motor 12 to that of the output gear 16 is "1:1", which is the speed ratio of direct coupling. Thus, the driving force produced by the first motor 12 is transmitted to the output gear 16 at the same rotational speed. To the drive wheels 37, the driving force corresponding to the driving force produced by the first motor 12 and the driving force produced by the second motor 13 is transmitted via the driven gear 53.

Figure 56:
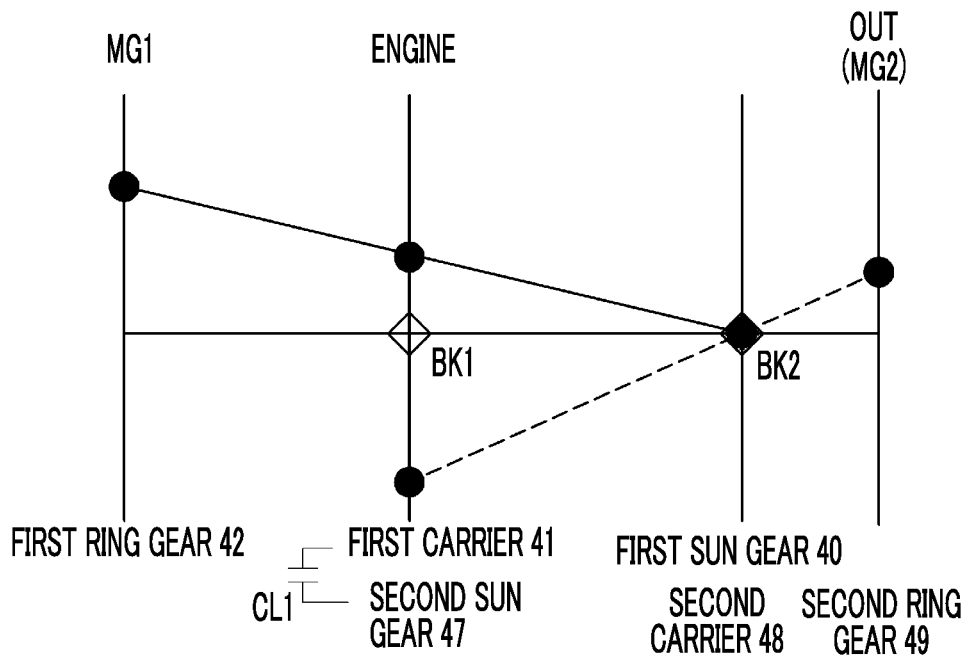
FIG. 56 is a nomographic chart showing operating conditions of a seventh traveling mode indicated in FIG. 50.

FIG. 56 is a nomographic chart showing operating conditions of the seventh traveling mode indicated in FIG. 50. As shown in FIG. 56, the seventh traveling mode is a series hybrid mode, and is set by engaging only the second brake mechanism 66. In the first planetary gear mechanism 14, the driving force produced by the engine 11 is transmitted to the first carrier 41, and rotation of the first sun gear 40 is inhibited; therefore, the reaction force that causes the first motor 12 to function as a generator is applied to the first ring gear 42. The second motor 13 is driven as a motor, using electric power generated by the first motor 12. The torque produced by the second motor 13 is transmitted to the drive wheels 37. Also, a part of the torque produced by the second motor 13 is transmitted to the output gear 16 and the second ring gear 49. Since the first brake mechanism 18 is released and the second sun gear 47 idles, the second planetary gear mechanism 15 does not function to transmit the torque received from the output gear 16 to the first planetary gear mechanism 14.

Thus, in the case of the drive system 71, four additional traveling modes, i.e., the eighth traveling mode through the eleventh traveling mode, can be set by providing the drive system 65 shown in FIG. 36, for example, with the third clutch mechanism 68. The structure and functions peculiar to the eleventh embodiment as described above with reference to FIG. 48 through FIG. 56, for example, the structure further including the second brake mechanism 66 and the third clutch mechanism 68, and its functions, can also be applied to other embodiments.

Figure 57:
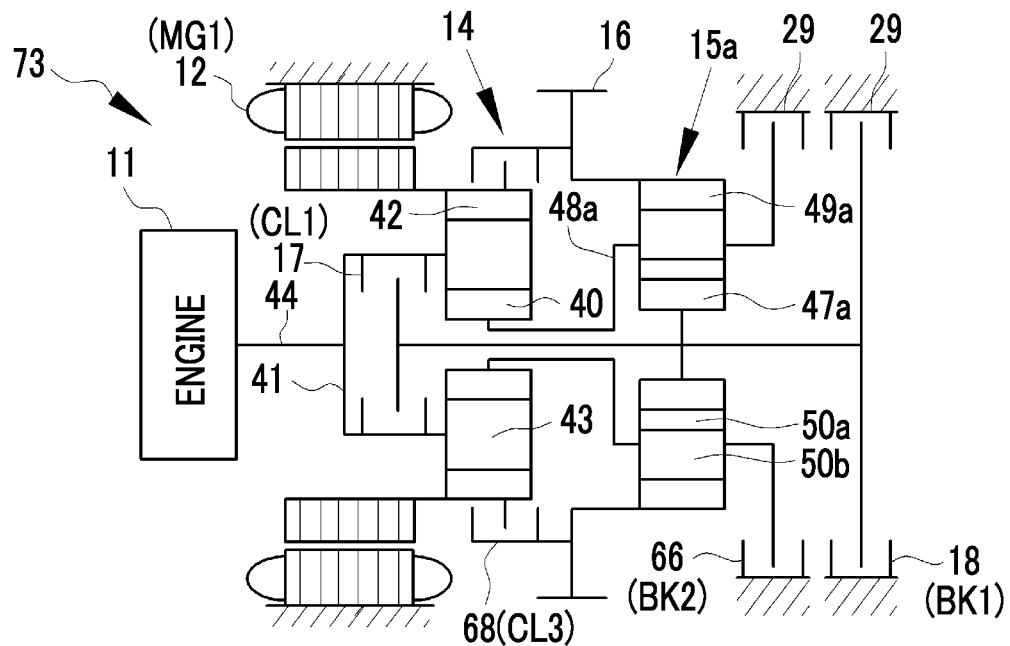
FIG. 57 is a skeleton diagram showing a drive system according to a twelfth embodiment of the present disclosure.

Next, a drive system of a twelfth embodiment will be described. FIG. 57 is a skeleton diagram specifically illustrating a drive system 73 as one example of the drive system 71 shown in FIG. 48. The first planetary gear mechanism 14 of the drive system 73 shown in FIG. 57 consists of the first carrier 41 as one example of the first input element 22, first ring gear 42 as one example of the first reaction-force element 23, and the first sun gear 40 as one example of the first output element 24. The first carrier 41 of the first planetary gear mechanism 14 rotates while holding the first pinions 43 that mesh with the first sun gear 40 and the first ring gear 42. The drive system 73 has a second planetary gear mechanism 15a in the form of a double pinion planetary gear mechanism. The second planetary gear mechanism 15a has a second carrier 48a that rotates while holding second pinions 50a that mesh with a second sun gear 47a, and third pinions 50b that mesh with the second pinions 50a and a second ring gear 49a. The second planetary gear mechanism 15a of the double pinion type as described above consists of the second carrier 48a as one example of the second input element 26, second sun gear 47a as one example of the second reaction-force element 28, and the second ring gear 49a as one example of the second output element 27.

The first clutch mechanism 17 selectively couples the first carrier 41 with the second sun gear 47a. The third clutch mechanism 68 selectively couples the first ring gear 42 with the second ring gear 49a. The first brake mechanism 18 selectively fixes the second sun gear 47a to the fixed member 29. The second brake mechanism 66 selectively fixes the second carrier 48a to the fixed member 29.

While the double pinion second planetary gear mechanism 15a is used in the drive system 73 shown in FIG. 57, a single pinion second planetary gear mechanism may be used in place of the double pinion second planetary gear mechanism 15a. In this case, the first brake mechanism 18 selectively fixes the second sun gear of the single pinion second planetary gear mechanism to the fixed member 29. The first clutch mechanism 17 selectively couples the first carrier 41 with the second sun gear of the single pinion second planetary gear mechanism. The third clutch mechanism 68 selectively couples the first ring gear 42 with the second carrier of the single pinion second planetary gear mechanism. The second brake mechanism 66 selectively fixes the second ring gear of the single pinion second planetary gear mechanism to the fixed member 29.

FIG. 58 indicates traveling modes that can be set for the drive system 73 shown in FIG. 57. As shown in FIG. 58, the drive system 73 is able to set any one of the first traveling mode through the eleventh traveling mode, by changing the engagement states of the first brake mechanism (BK1) 18, first clutch mechanism (CL1) 17, second brake mechanism (BK2) 66, and the third clutch mechanism (CL3) 68. Each of the first traveling mode through the eleventh traveling mode is set by causing the ECU 21 to control the first brake mechanism 18, first clutch mechanism 17, second brake mechanism 66, third clutch mechanism 68, engine 11, first motor 12, and the second motor 13. The first traveling mode, second traveling mode, sixth traveling mode, seventh traveling mode, eighth traveling mode, ninth traveling mode, and eleventh traveling mode are examples of hybrid traveling modes. The third traveling mode, fourth traveling mode, and tenth traveling mode are examples of EV modes. The fifth traveling mode is one example of parking mode. The operating conditions of the first traveling mode through the seventh traveling mode are the same as or similar to those of the first traveling mode through the seventh traveling mode indicated in FIG. 32, and therefore, detailed description of these modes will not be provided.

The eighth traveling mode, ninth traveling mode, and eleventh traveling mode are examples of hybrid traveling modes. The eighth traveling mode is set by engaging the first brake mechanism 18 and the third clutch mechanism 68. A nomographic chart representing the rotational speeds of rotating elements that constitute the double pinion second planetary gear mechanism 15a is determined by the rotational speeds of respective rotating elements, i.e., the second ring gear 49a (output gear 16), second carrier 48a, and the second sun gear 47a. With the third clutch mechanism 68 engaged, the second ring gear 49a is rotated at the same rotational speed as the first motor 12. As a result, the MG1 speed ratio representing the ratio of the rotational speed of the output gear 16 and that of the rotor 45 of the first motor 12 becomes equal to "1:1", which is the speed ratio of direct coupling. Since rotation of the second sun gear 47a is inhibited, and the second carrier 48a and the first sun gear 40 rotate at the same rotational speed, the second ring gear 49a and the output gear 16 integral with the second ring gear 49a are rotated at a lower speed than the rotational speed of the engine 11. Thus, when the eighth traveling mode is set, the ENG speed ratio representing the ratio of the rotational speed of the output shaft 44 of the engine 11 and that of the output gear 16 becomes a speed ratio indicating speed reduction.

The ninth traveling mode is set by engaging the first clutch mechanism 17 and the third clutch mechanism 68. With the first clutch mechanism 17 and the third clutch mechanism 68 engaged, the output shaft 44 of the engine 11, first carrier 41, and the second ring gear 49a (the output gear 16) are coupled to each other, and the torque produced by the engine 11 is directly transmitted to the output gear 16, so that the drive system 73 is placed in a directly coupling state. The tenth traveling mode is one example of EV mode in which the vehicle travels using the driving force produced by both of the first motor 12 and the second motor 13, and is set by engaging only the third clutch mechanism 68.

Figure 59:
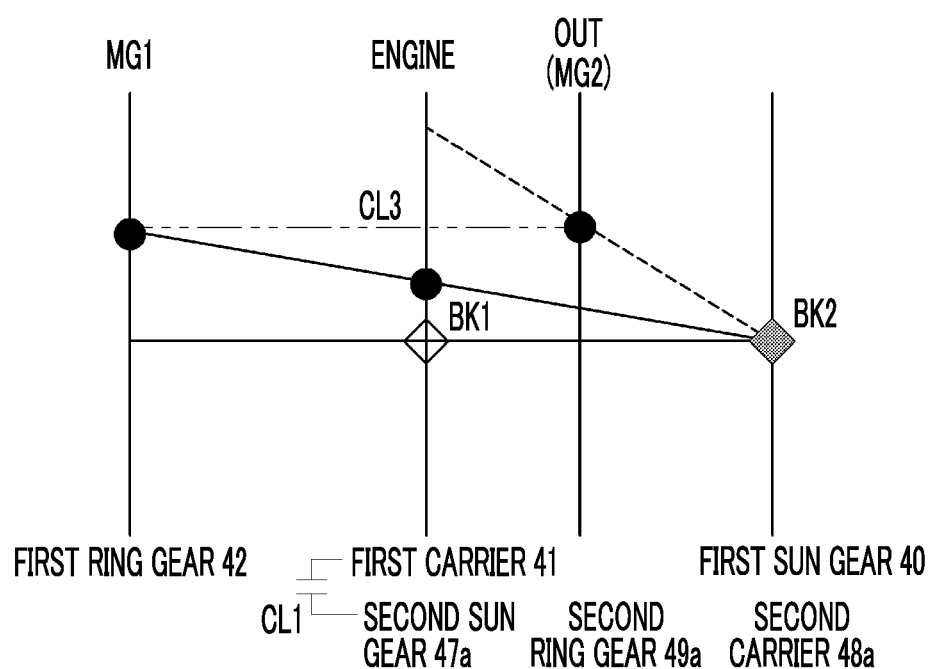
FIG. 59 is a nomographic chart showing operating conditions of an eleventh traveling mode indicated in FIG. 58.

FIG. 59 is a nomographic chart showing operating conditions of the eleventh traveling mode indicated in FIG. 58. As shown in FIG. 59, the eleventh traveling mode is one example of hybrid traveling mode, and is set when the second brake mechanism 66 is engaged, and the third clutch mechanism 68 is engaged. The operating conditions of the eleventh traveling mode are the same as or similar to those of the seventh traveling mode as described above with reference to FIG. 47, and therefore, detailed description will not be provided. The eleventh traveling mode is different from the seventh traveling mode in that rotation of the first sun gear 40 and the second carrier 48a is inhibited by the second brake mechanism 66. When the drive system 73 is placed in the eleventh traveling mode, the first ring gear 42 and the second carrier 48 are coupled to each other by the third clutch mechanism 68, so that the second ring gear 49a and the first ring gear 42 rotate at the same rotational speed. Therefore, "DIRECT COUPLING" is written in the column of the MG1 speed ratio in the eleventh traveling mode indicated in FIG. 58. Also, when the drive system 73 is placed in the eleventh traveling mode, the rotational speed of the second ring gear 49a is constantly higher than that of the engine 11; therefore, "SPEED UP" is written in the column of the ENG speed ratio.

In the case of the drive system 74, the same or similar traveling modes as those described with reference to FIG. 50 can be set by modifying the drive system 72 shown in FIG. 49, for example, such that the second carrier of the double pinion planetary gear mechanism (the second ring gear in the case of the single pinion planetary gear mechanism) provides one example of the second input element 26, and the second ring gear of the double pinion planetary gear mechanism (the second carrier in the case of the single pinion planetary gear mechanism) provides one example of the second output element 27. The structure and functions peculiar to the twelfth embodiment as described above with reference to FIG. 57 to FIG. 59 can also be applied to other embodiments.

As described above, in the case of the drive system 72 shown in FIG. 49 and the drive system 73 shown in FIG. 57, the fifth traveling mode through the eleventh traveling mode can be set by providing the drive system 34 shown in FIG. 2 with the second brake mechanism 66 and the third clutch mechanism 68. Namely, the fifth traveling mode through the seventh traveling mode can be set by providing the second brake mechanism 66 as described above with reference to FIG. 38. Also, the seventh traveling mode through the tenth traveling mode can be set by providing the third clutch mechanism 68, as described above with reference to FIG. 43 and FIG. 44. In the case of the drive system 72 of the eleventh embodiment shown in FIG. 49 and the drive system 73 of the twelfth embodiment shown in FIG. 57, the eleventh traveling mode can be further set, in addition to the fifth traveling mode through the tenth traveling mode, due to a synergistic effect provided by the second brake mechanism 66 and the third clutch mechanism 68.

Each of the above-described embodiments is a mere example of the present disclosure, and the structure and functions peculiar to one of the embodiments can also be applied to other embodiments. Also, this disclosure is not limited to the above-described embodiments, but may be changed as needed without departing from the object. For example, while the present disclosure is applied to a hybrid vehicle of FF (Front-engine, Front-drive) type in the above-described embodiments, the present disclosure is not limitedly applied to this type of vehicle, but may be applied to a hybrid vehicle of FR (Front-engine, Rear-drive) type or 4WD (four-Wheel-Drive) type.

What is claimed is:

1. A drive system for a hybrid vehicle, the drive system comprising:
   an internal combustion engine;
   a first motor configured to generate electric power, using power produced by the internal combustion engine;
   a second motor configured to operate with electric power generated by the first motor, so as to produce driving force;
   an output part configured to deliver driving force for driving the hybrid vehicle to which the driving force produced by the second motor is added, the power produced by the internal combustion engine being split into a first portion directed to the first motor and a second portion directed to the output part;
   a first planetary gear mechanism including a first input element, a first reaction-force element, and a first output element, the first planetary gear mechanism being configured to perform differential operation by the first input element, the first reaction-force element, and the first output element, the first input element being configured to receive driving force produced by the internal combustion engine, the first reaction-force element being coupled to the first motor;
   a second planetary gear mechanism including a second input element, a second output element, and a second reaction-force element, the second planetary gear mechanism being configured to perform differential operation by the second input element, the second output element, and the second reaction-force element, the second input element being coupled to the first output element, the second output element being coupled to the output part;
   a first clutch mechanism configured to selectively couple the first input element with the second reaction-force element; and
   a first brake mechanism provided between the second reaction-force element and a fixed member, the first brake mechanism being configured to selectively inhibit rotation of the second reaction-force element.

2. The drive system according to claim 1, wherein
   the first planetary gear mechanism is a single pinion planetary gear mechanism including a first sun gear, a first ring gear, and a first carrier,
   the second planetary gear mechanism is a single pinion planetary gear mechanism including a second sun gear, a second ring gear, and a second carrier,
   the first ring gear is disposed concentrically with the first sun gear,
   the first carrier is configured to rotate while holding a first pinion that meshes with the first sun gear and the first ring gear,
   the second ring gear is disposed concentrically with the second sun gear,
   the second carrier is configured to rotate while holding a second pinion that meshes with the second sun gear and the second ring gear,
   the first sun gear provides the first output element,
   the first carrier provides the first input element,
   the first ring gear provides the first reaction-force element,
   the second sun gear provides the second reaction-force element,
   the second carrier provides the second input element,
   the second ring gear provides the second output element.

3. The drive system according to claim 1, wherein
   the first planetary gear mechanism is a double pinion planetary gear mechanism including a first sun gear, a first ring gear, and a first carrier,
   the second planetary gear mechanism is a single pinion planetary gear mechanism including a second sun gear, a second ring gear, and a second carrier,
   the first ring gear is disposed concentrically with the first sun gear,
   the first carrier is configured to rotate while holding a first pinion that meshes with the first sun gear, and a second pinion that meshes with the first pinion and the first ring gear,
   the second ring gear is disposed concentrically with the second sun gear,
   the second carrier is configured to rotate while holding a third pinion that meshes with the second sun gear and the second ring gear,
   the first sun gear provides the first output element,
   the first carrier provides the first reaction-force element,
   the first ring gear provides the first input element,
   the second sun gear provides the second reaction-force element,
   the second carrier provides the second input element, and
   the second ring gear providing the second output element.

4. The drive system according to claim 1, wherein
   the first planetary gear mechanism is a single pinion planetary gear mechanism including a first sun gear, a first ring gear, and a first carrier, the second planetary gear mechanism is a double pinion planetary gear mechanism including a second sun gear, a second ring gear, and a second carrier,
the first ring gear is disposed concentrically with the first sun gear,
the first carrier is configured to rotate while holding a first pinion that meshes with the first sun gear and the first ring gear,
the second ring gear is disposed concentrically with the second sun gear,
the second carrier is configured to rotate while holding a second pinion that meshes with the second sun gear, and a third pinion that meshes with the second pinion and the second ring gear,
the first sun gear provides the first output element,
the first carrier provides the first input element,
the first ring gear provides the first reaction-force element,
the second sun gear provides the second reaction-force element, and
the second carrier provides the second output element, the second ring gear providing the second input element.

5. The drive system according to claim 1, wherein
the first planetary gear mechanism is a double pinion planetary gear mechanism including a first sun gear, a first ring gear, and a first carrier,
the second planetary gear mechanism is a double pinion planetary gear mechanism including a second sun gear, a second ring gear, and a second carrier,
the first ring gear is disposed concentrically with the first sun gear,
the first carrier is configured to rotate while holding a first pinion that meshes with the first sun gear, and a second pinion that meshes with the first pinion and the first ring gear,
the second ring gear is disposed concentrically with the second sun gear,
the second carrier is configured to rotate while holding a third pinion that meshes with the second sun gear, and a fourth pinion that meshes with the third pinion and the second ring gear,
the first sun gear provides the first output element,
the first carrier provides the first reaction-force element,
the first ring gear provides the first input element,
the second sun gear provides the second reaction-force element,
the second carrier provides the second output element, and
the second ring gear provides the second input element.

6. The drive system according to claim 1, wherein
the first planetary gear mechanism is a single pinion planetary gear mechanism including a first sun gear, a first ring gear, and a first carrier,
the second planetary gear mechanism is a single pinion planetary gear mechanism including a second sun gear, a second ring gear, and a second carrier,
the first ring gear is disposed concentrically with the first sun gear,
the first carrier is configured to rotate while holding a first pinion that meshes with the first sun gear and the first ring gear,
the second ring gear is disposed concentrically with the second sun gear,
the second carrier is configured to rotate while holding a second pinion that meshes with the second sun gear and the second ring gear,
the first sun gear provides the first output element,
the first carrier provides the first input element,
the first ring gear provides the first reaction-force element,
the second carrier provides the second input element,
the second sun gear provides the second output element, and
the second ring gear provides the second reaction-force element.

7. The drive system according to claim 1, wherein
the first planetary gear mechanism is a single pinion planetary gear mechanism including a first sun gear, a first ring gear, and a first carrier,
the second planetary gear mechanism is a single pinion planetary gear mechanism including a second sun gear, a second ring gear, and a second carrier,
the first ring gear is disposed concentrically with the first sun gear,
the first carrier is configured to rotate while holding a first pinion that meshes with the first sun gear and the first ring gear,
the second ring gear is disposed concentrically with the second sun gear,
the second carrier is configured to rotate while holding a second pinion that meshes with the second sun gear and the second ring gear,
the first sun gear provides the first output element,
the first carrier provides the first input element,
the first ring gear provides the first reaction-force element,
the second ring gear provides the second reaction-force element,
the second sun gear provides the second input element, and
the second carrier provides the second output element.

8. The drive system according to claim 1, wherein
the first planetary gear mechanism is a single pinion planetary gear mechanism including a first sun gear, a first ring gear, and a first carrier,
the second planetary gear mechanism is a single pinion planetary gear mechanism including a second sun gear, a second ring gear, and a second carrier,
the first ring gear is disposed concentrically with the first sun gear,
the first carrier is configured to rotate while holding a first pinion that meshes with the first sun gear and the first ring gear,
the second ring gear is disposed concentrically with the second sun gear,
the second carrier is configured to rotate while holding a second pinion that meshes with the second sun gear and the second ring gear,
the first carrier provides the first output element,
the first ring gear provides the first input element,
the first sun gear provides the first reaction-force element,
the second carrier provides the second reaction-force element,
the second sun gear provides the second input element, and
the second ring gear provides the second output element.

9. The drive system according to claim 8, further comprising:
a controller configured to:
control the internal combustion engine, the first motor, the second motor, the first clutch mechanism, and the first brake mechanism, and
engage the first brake mechanism, and further cause the internal combustion engine and the second motor to produce driving force for traveling the hybrid vehicle backward.

10. The drive system according to claim 1, wherein
the first planetary gear mechanism is a single pinion planetary gear mechanism including a first sun gear, a first ring gear, and a first carrier,
the second planetary gear mechanism is a double pinion planetary gear mechanism including a second sun gear, a second ring gear, and a second carrier,
the first ring gear is disposed concentrically with the first sun gear,
the first carrier is configured to rotate while holding a first pinion that meshes with the first sun gear and the first ring gear,
the second ring gear is disposed concentrically with the second sun gear,
the second carrier is configured to rotate while holding a second pinion that meshes with the second sun gear and a third pinion that meshes with the second pinion and the second ring gear,
the first sun gear provides the first output element,
the first carrier provides the first input element,
the first ring gear provides the first reaction-force element,
the second sun gear provides the second reaction-force element,
the second carrier provides the second input element, and
the second ring gear provides the second output element.

11. The drive system according to claim 1, further comprising:
a second brake mechanism configured to selectively fix the first output element to the fixed member.

12. The drive system according to claim 11, further comprising:
a controller configured to:
control the internal combustion engine, the first motor, the second motor, the first clutch mechanism, the first brake mechanism, and the second brake mechanism, and
engage the first brake mechanism and the second brake mechanism so as to inhibit rotation of drive wheels of the hybrid vehicle.

13. The drive system according to claim 11, further comprising:
a third clutch mechanism configured to selectively couple the first reaction-force element with the second output element.

14. The drive system according to claim 13, further comprising:
a controller configured to:
control the internal combustion engine, the first motor, the second motor, the first clutch mechanism, the first brake mechanism, the second brake mechanism, and the third clutch mechanism, and
engage the first brake mechanism and the second brake mechanism so as to inhibit rotation of drive wheels of the hybrid vehicle.

15. The drive system according to claim 1, further comprising:
a third clutch mechanism configured to selectively couple the first reaction-force element with the second output element.

16. The drive system according to claim 1, further comprising:
a controller configured to:
control the internal combustion engine, the first motor, the second motor, the first clutch mechanism, and the first brake mechanism, and
engage the first clutch mechanism and the first brake mechanism, and further stop operation of the internal combustion engine so as to cause the first motor and the second motor to produce driving force for traveling the hybrid vehicle forward.

17. The drive system according to claim 1, further comprising:
a second clutch mechanism configured to selectively couple the second output element with the second reaction-force element.

18. The drive system according to claim 17, further comprising:
a controller configured to:
control the internal combustion engine, the first motor, the second motor, the first clutch mechanism, the first brake mechanism, and the second clutch mechanism, and
engage the first brake mechanism and the second clutch mechanism so as to inhibit rotation of drive wheels of the hybrid vehicle.

* * * * *